(12) United States Patent
Seto et al.

(10) Patent No.: US 7,043,271 B1
(45) Date of Patent: May 9, 2006

(54) RADIO COMMUNICATION SYSTEM

(75) Inventors: Ichiro Seto, Fuchu (JP); Yasushi Murakami, Yokohama (JP); Osamu Shibata, Kawasaki (JP); Hidehiro Matsuoka, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 728 days.

(21) Appl. No.: 09/660,467

(22) Filed: Sep. 12, 2000

(30) Foreign Application Priority Data

| Sep. 13, 1999 | (JP) | ................................. 11-259137 |
| Sep. 13, 1999 | (JP) | ................................. 11-259346 |
| Sep. 13, 1999 | (JP) | ................................. 11-259355 |
| Sep. 24, 1999 | (JP) | ................................. 11-271124 |

(51) Int. Cl.
 *H04M 1/00* (2006.01)
(52) U.S. Cl. ........................ 455/562.1; 455/561; 398/58
(58) Field of Classification Search ................ 455/561, 455/562.1, 277.1, 277.2, 272, 63.4, 25, 132, 455/134, 524, 525; 398/58, 41, 43
See application file for complete search history.

(56) References Cited

U.S. PATENT DOCUMENTS

| 4,725,844 A | 2/1988 | Goodwin et al. |
| 5,424,864 A * | 6/1995 | Emura ........................ 398/116 |
| 5,442,811 A | 8/1995 | Kobayashi et al. |

(Continued)

FOREIGN PATENT DOCUMENTS

EP 0 391 597 10/1990

(Continued)

OTHER PUBLICATIONS

U.S. Appl. No. 09/310,198, Unknown.

(Continued)

*Primary Examiner*—Edward F. Urban
*Assistant Examiner*—Sam Bhattacharya
(74) *Attorney, Agent, or Firm*—Oblon, Spivak, McClelland, Maier & Neustadt, P.C.

(57) ABSTRACT

There is disclosed a radio communication system in which a constitution of a base station and further a control station can be simplified. A radio communication system according to the present invention converts a received signal received by a plurality of antenna elements in a base station to a signal of different frequency band, and then conflates the converted signal in order to generate sub-carrier wave multiplex signal. The signal is converted to an optical signal, and then the optical signal is transmitted to a control station via an optical fiber. Or the control station performs weighting to phase of the transmitted signal transmitted from a plurality of antennas of a base station, and then performs frequency conversion to different frequency band, and then conflates the converted signal in order to generate the sub-carrier wave multiplex signal. The signal is converted to an optical signal, and then an optical signal is transmitted to the base station side via the optical fiber. The control station and the base station divides the received sub-carrier wave multiplex signal by each frequency band, and then the frequency of the divided signals are converted to the same frequency band in order to generate the transmitted/received signal of each antenna element. By such a constitution, it is possible to reduce constituent of the optical transmission components to the minimum and to simplify the constitution of the base station. Furthermore, it is possible to maintain the relative phase difference and the relative intensity of the transmitted/received signal of each antenna element. Because of this, it is possible to estimate an arrival direction of the received signal and to control radiation beam pattern of the transmitted signal.

13 Claims, 39 Drawing Sheets

U.S. PATENT DOCUMENTS

| | | | | |
|---|---|---|---|---|
| 5,697,083 A | * | 12/1997 | Sano | 455/276.1 |
| 5,838,474 A | * | 11/1998 | Stilling | 398/116 |
| 5,936,569 A | | 8/1999 | Stahle et al. | |
| 5,936,754 A | * | 8/1999 | Ariyavisitakul et al. | 398/28 |
| 5,937,116 A | | 8/1999 | Seto | |
| 6,091,364 A | | 7/2000 | Murakami et al. | |

FOREIGN PATENT DOCUMENTS

| | | |
|---|---|---|
| EP | 0 685 973 | 12/1995 |
| EP | 0 843 380 | 5/1998 |
| GB | 2 255 881 | 11/1992 |
| GB | 2 331 667 | 5/1999 |
| JP | 9-23209 | 1/1997 |
| JP | 9-70062 | 3/1997 |
| JP | 9-215047 | 8/1997 |
| JP | 10-145286 | 5/1998 |
| JP | 10-248087 | 9/1998 |

OTHER PUBLICATIONS

U.S. Appl. No. 09/243,121, filed Feb. 3, 1999, pending.
U.S. Appl. No. 09/329,574, filed Jun. 10, 1999, pending.
U.S. Appl. No. 09/660,467, filed Sep. 12, 2000, pending.

* cited by examiner

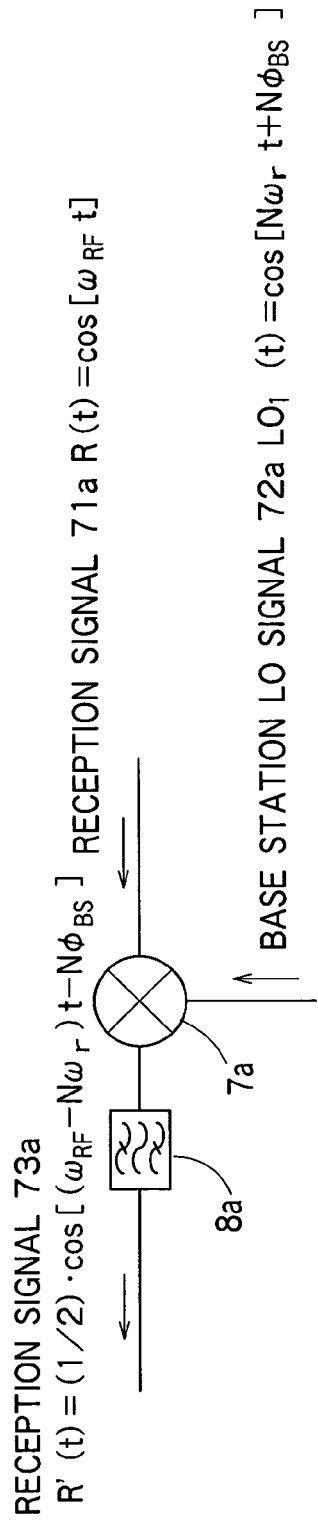

RECEPTION SIGNAL 73a
$R'(t) = (1/2) \cdot \cos[(\omega_{RF} - N\omega_r)t - N\phi_{BS}]$ RECEPTION SIGNAL 71a $R(t) = \cos[\omega_{RF} t]$ BASE STATION LO SIGNAL 72a $LO_1(t) = \cos[N\omega_r t + N\phi_{BS}]$

F I G. 6A

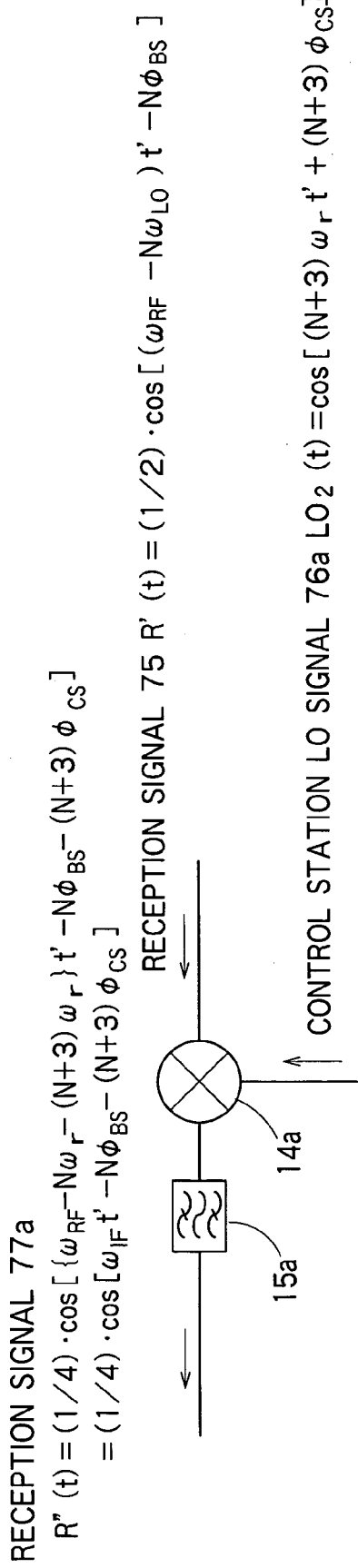

RECEPTION SIGNAL 77a
$R''(t) = (1/4) \cdot \cos[\{\omega_{RF} - N\omega_r - (N+3)\omega_r\}t' - N\phi_{BS} - (N+3)\phi_{CS}]$
$= (1/4) \cdot \cos[\omega_{IF} t' - N\phi_{BS} - (N+3)\phi_{CS}]$ RECEPTION SIGNAL 75 $R'(t) = (1/2) \cdot \cos[(\omega_{RF} - N\omega_{LO})t' - N\phi_{BS}]$ CONTROL STATION LO SIGNAL 76a $LO_2(t) = \cos[(N+3)\omega_r t' + (N+3)\phi_{CS}]$

F I G. 6B

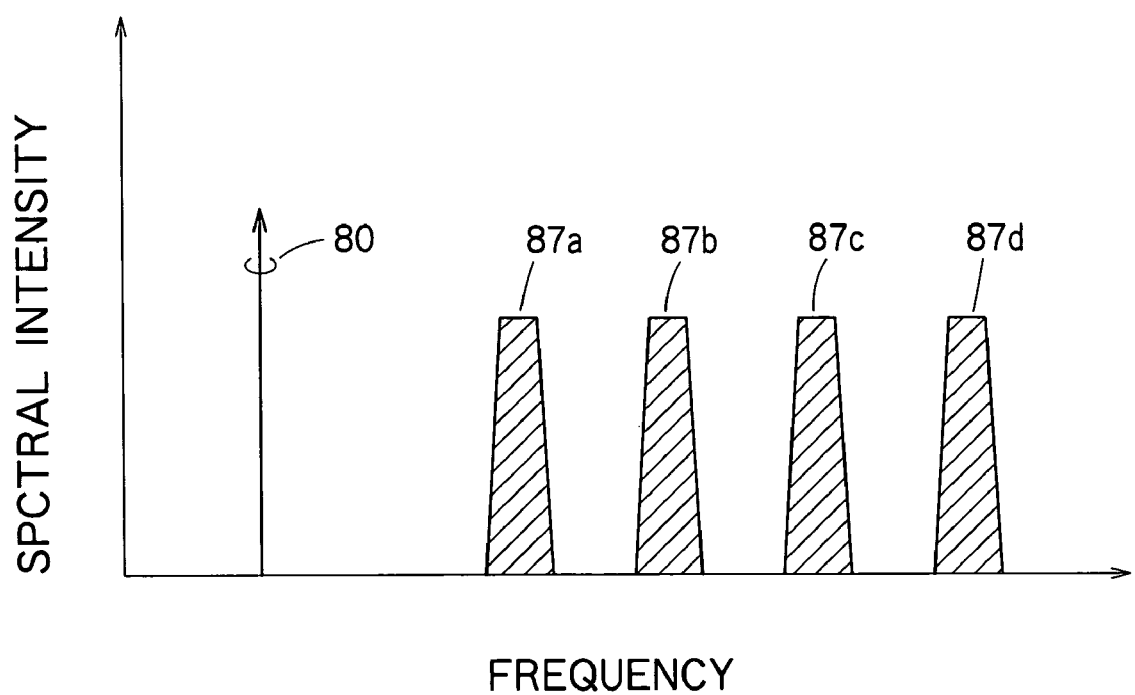
F I G. 10

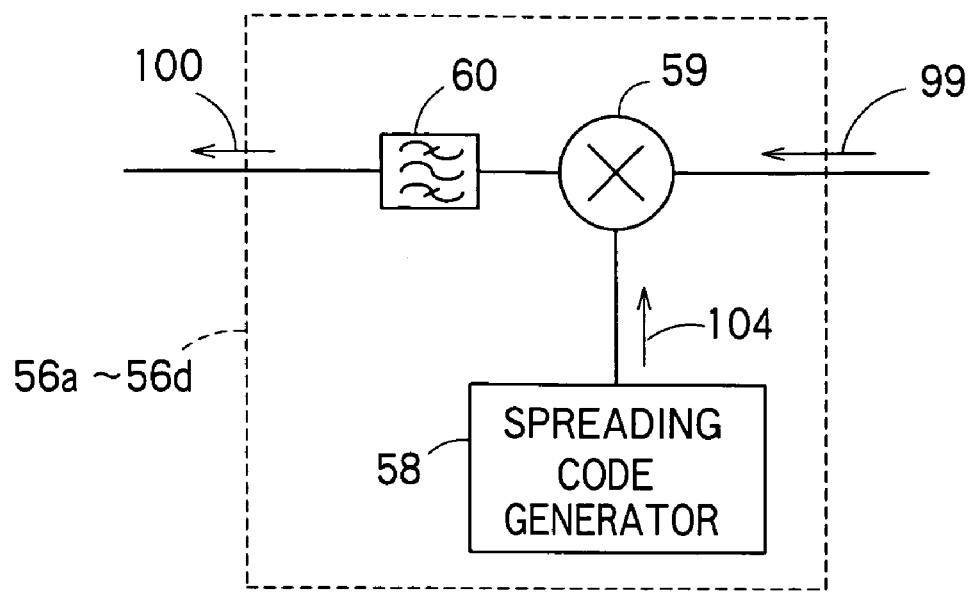
F I G. 15A
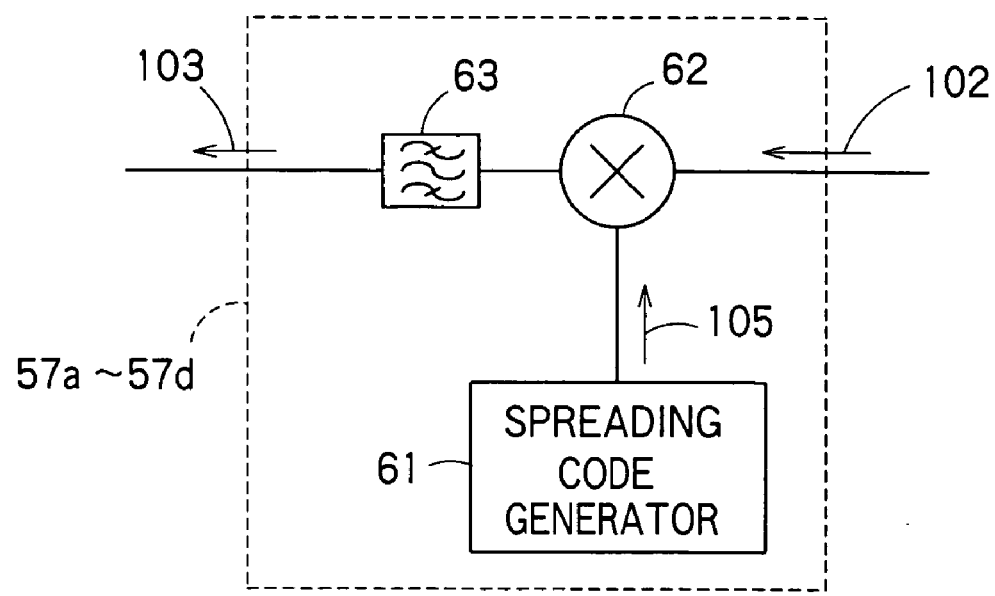
F I G. 15B

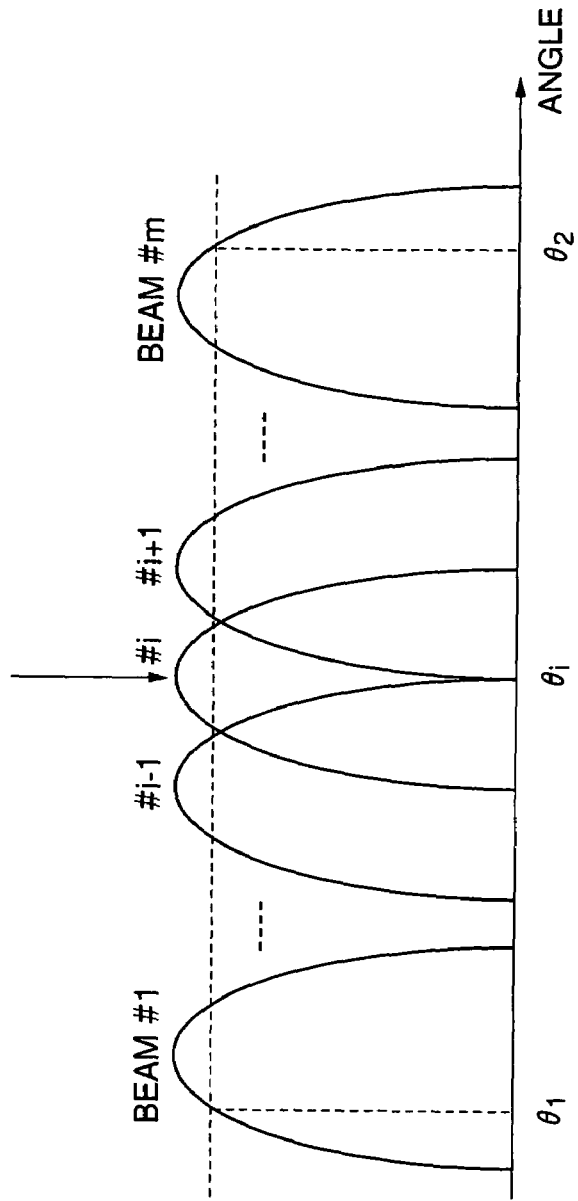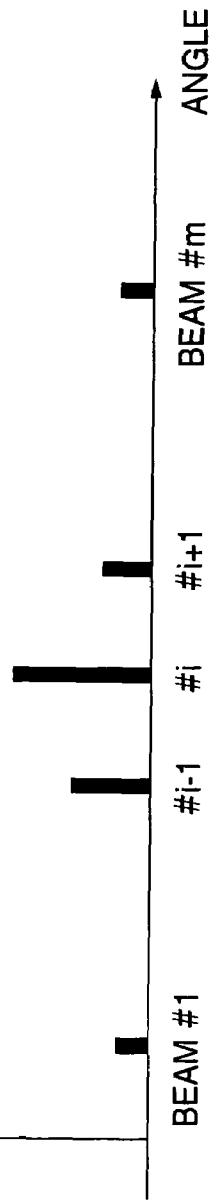
FIG.27A
FIG.27B

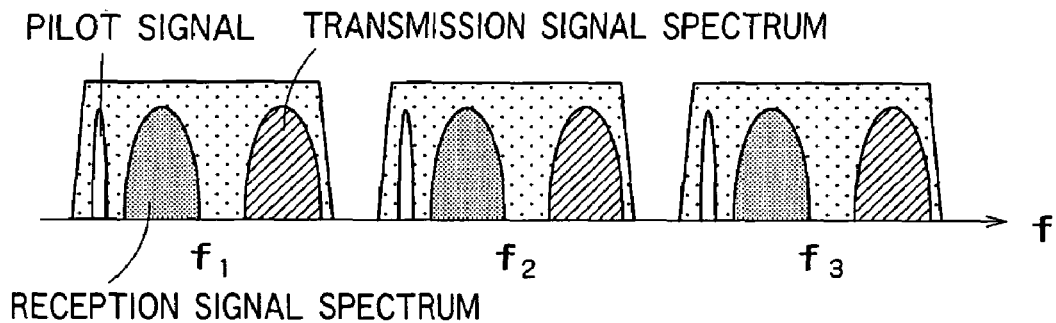
F I G. 35
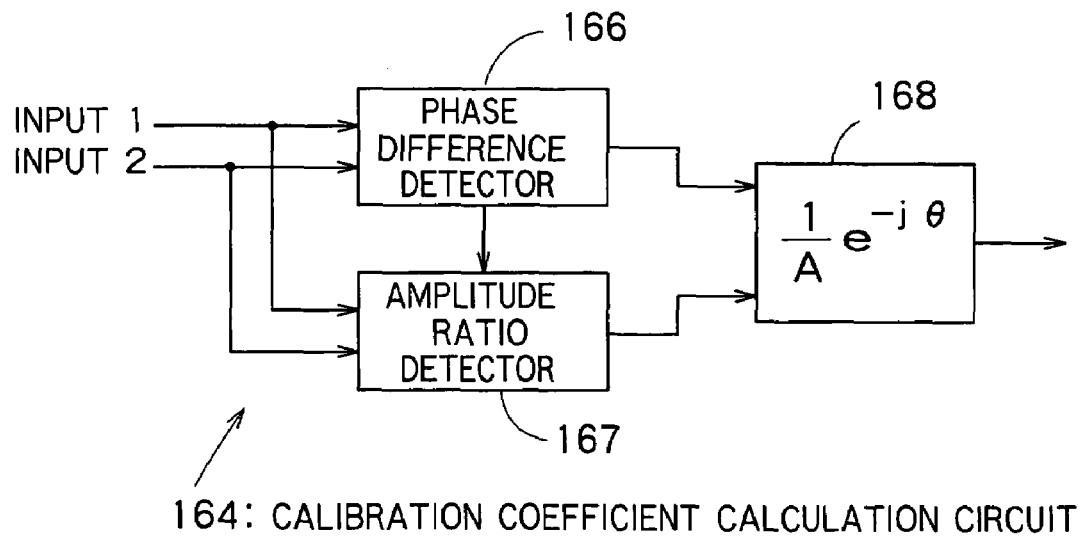
F I G. 36

RADIO COMMUNICATION SYSTEM

BACKGROUND OF THE INVENTION

1. Field of the Invention

The present invention relates to a radio communication system which is constituted of a base station equipped with a variable beam-pattern array antenna such as an adaptive array antenna, and a control station connected to the base station via an optical fiber and which is provided with a function of controlling the variable beam-pattern array antenna on the side of the control station.

2. Related Background Art

Much attention has been paid to a radio on fiber (ROF) technique of connecting a base station and a control station for mobile communication represented by cellular phones and intelligent transport systems (ITS) to each other by an optical fiber in order to perform signal transmission. According to the ROF technique, a radio signal is transmitted from the base station to the control station via an optical fiber, and a modulator/demodulator, a controller and the like are collectively contained in the control station in order to simplify and miniaturize a constitution of base station. Therefore, it is possible to arrange a plurality of base stations along a road, in an underground shopping center, in a tunnel, and the like.

Moreover, in order to solve problems such as tightness of a frequency band in the base station, and an interference wave, an adaptive antenna capable of varying directivity has been noted. The adaptive antenna is provided with an array antenna having a plurality of antenna elements, and the radiation beam-pattern of the antenna can be changed by transmitted signals transmitted from the respective antenna elements.

A beam calculation circuit in the control station derives a radiation pattern of a radio signal to a subscriber from the base station, and the radiation pattern of the radio signal to the base station from the subscriber, and changes the radiation beam-pattern of the adaptive antenna in an adaptive manner in accordance with movement and position of the subscriber.

Several reports on a radio communication system, in which the base station is provided with this type of adaptive antenna and which is connected to the control station by using the ROF technique, have been published (e.g., Japanese Patent Application Laid-open No. 145286/1998).

FIGS. 1 and 2 are block diagrams schematically showing a constitution of the radio communication system utilizing the ROF technique. In consideration of a transmission/reception function as the radio communication system, it is most important to transmit the radio signal received by each antenna element to the control station from the base station while a relative phase difference and a relative intensity difference are maintained.

Therefore, in the conventional system, a transmitted/received signal of each antenna element is converted to a optical signal, and then transmitted between the base station and the control station by multiplexing a wavelength, or by allotting a specific optical fiber to each antenna element.

In the conventional system utilizing the ROF technique, however, as shown in FIGS. 1 and 2, a pair of an electric/optical converter and an optical/electric converter are allotted to each antenna element line, and the base station and control station require pairs of optical transmitter/receiver by the number of antenna elements.

Therefore, elements constituting optical transmitters of the base station and the control station largely increase, the constitution is complicated and an apparatus becomes large-sized. Moreover, when wavelength multiplexing transmission is performed, an optical multiplexer, an optical branching filter, a wavelength control function of a light source, and other constitutions are further necessary.

On the other hand, if the optical fiber is provided by each antenna element, the number of optical fibers for connecting the base station to the control station largely increases, and accordingly the constitutions of optical transmitters such as the optical/electric converter and the electric/optical converter become complicated and large-sized.

Thus, in the conventional radio communication system, provided with the adaptive antenna, for utilizing the ROF technique to perform the signal transmission, since there are many constituting elements for the optical transmitter, the constitution is complicated, it is difficult to miniaturize the base station and control station, and cost cannot be reduced.

SUMMARY OF THE INVENTION

The present invention has been developed in consideration of these respects, and an object thereof is to provide a radio communication system in which a constitution of a base station and a control station can be simplified and miniaturized without deteriorating a transmission quality.

Moreover, another object of the present invention is to provide a reliable radio communication system which can easily and precisely adjust phase and amplitude of a transmitted signal transmitted to a base station from a control station without complicating a constitution.

To attain the aforementioned objects, there is provided an up link from a terminal side to an infrastructure side in a radio communication system comprising a base station for performing radio communication with a radio communication terminal; and a control station connected to the base station via an optical transmission line, said base station comprising:

a variable beam-pattern array antenna which comprises a plurality of antenna elements and which can change directivity in accordance with a position of said radio communication terminal;

base station side frequency conversion means configured to subject received signals received from said radio communication terminal via said plurality of antenna elements to frequency conversion to different bands;

sub-carrier multiplexing signal generation means configured to combine a plurality of signals subjected to the frequency conversion by said base station side frequency conversion means to generate a sub-carrier multiplexing signal; and base station side transmission means configured to transmit said sub-carrier multiplexing signal to said control station via said optical transmission line, said control station comprising:

control station side frequency conversion means configured to branch said sub-carrier multiplexing signal transmitted from said base station via said optical transmission line to signals received by said plurality of antenna elements, and performing the frequency conversion to obtain the signals of the same frequency band for each of the branched signals;

beam calculation means configured to obtain a weighting coefficient to control directivity of said plurality of antenna elements;

weighting means configured to perform weighting based on said weighting coefficient; and received signal generation means configured to generate the received signal by combining said branched signals that frequency is converted by said control station side frequency conversion means and weighting is performed.

Moreover, there is provided a down link from an infrastructure side to a terminal side in a radio communication system comprising: a base station comprising a variable beam-pattern array antenna which comprises a plurality of antenna elements and which can change directivity in accordance with a position of a radio communication terminal; and a control station connected to the base station via an optical transmission line, said control station comprising:

control station side branching means configured to branch a signal correlated with a transmitted signal transmitted to said radio communication terminal from said variable beam-pattern array antenna for said plurality of antenna elements;

weighting means configured to weight based on a weight control signal for the signals of the respective antenna elements relating to the transmitted signal transmitted from said variable beam-pattern array antenna to said radio communication terminal;

control station side frequency conversion means configured to convert frequency to respective different bands;

sub-carrier multiplexing signal generation means configured to combine the respective signals converted to the different bands subjected to the frequency conversion by said control station side frequency conversion means to generate a sub-carrier multiplexing signal; and transmission means configured to transmit said sub-carrier multiplexing signal to said base station via said optical transmission line, said base station comprising:

base station side branching means configured to branch said sub-carrier multiplexing signal transmitted from said control station via said optical transmission line for said plurality of antenna elements; and base station side frequency conversion means configured to subject the respective signals branched by said base station side branching means to the signals of the same frequency band, wherein said plurality of antenna elements transmit the respective signals subjected to the frequency conversion by said base station side frequency conversion means to said radio communication terminal.

According to the present invention, since the signals received by the plurality of antenna elements are converted to the sub-carrier multiplexing signal, and transmitted optically between the control station and the base station, the constitution of the signal transmitter between the base station and the control station can be simplified.

According to the present invention, each of a transmitter and a receiver can transmit a signal by one piece of the optical fiber, respectively. Because of this, only one pair of an electric/optical converter and a optical/electric converter is necessary to each of the transmitter and the receiver without depending on the number of the antenna elements. Accordingly, the following advantageous effects are obtained.

First, it is possible to reduce the number of the optical fiber more than that of a conventional fiber multiple system. Furthermore, the optical transmitter of the present invention does not need an optical multiplexer unit and an optical demultiplexer, different from the wave length multiple system, and the electric/optical converter does not need a wave length control circuit. It is possible to reduce a constitution of the optical transmission parts more than the radio communication system using the conventional fiber multiplex and wavelength division multiplex systems because the system on the present invention requires one pair of the electric/optical converter and the optical/electric converter, simplifies and miniaturizes constitutions of the control station and the base station to a large degree. It is possible to reduce cost of the base station by reducing the number of optical transmission components that cost is higher than electrical components.

Furthermore, according to the present invention, applying phase-locked loop techniques or transmission of said sub-carrier multiplexing signal with local oscillator signals to the above-mentioned radio communication systems, it is possible to maintain in principle relative phase difference of the transmitted/received signal of the antenna element provided with the base station, even if the effective length changes by the peripheral temperature's change. Therefore, it is possible to estimate arrival direction of the received signal in the beam calculation circuit of the control station side. It is possible to control beam pattern forming of the array antenna of the base station side. That is, it is unnecessary to dispose the beam calculation circuit and the control circuit on the base station side. It is possible to constitute of passive components and to miniaturize the overall constitution. Even when a large number of base stations provided with these advantages are arranged in a broad area, a highly reliable and highly stable radio communication system can be provided.

In the above-mentioned radio communication system according to the present invention, there is a system of applying a beam forming network and level detecting means. The radio communication system of applying such a system comprising:

a base station provided with a variable directional array antenna whose directivity changes by an electric signal for supplying power to a plurality of antenna elements; and a control station provided with a signal calculation circuit for performing weighting of electric signal applied to said plurality of antenna elements, said base station being connected to said control station via an optical transmission line, wherein the electric signal for supplying the power to said plurality of antenna elements is transmitted to said base station from said control station via said optical transmission line, and the signal transmitted via said optical transmission line is constituted by multiplexing an electric signal obtained by subjecting the electric signal for supplying the power to said plurality of antenna elements to frequency conversion to different frequencies by a plurality of local oscillator outputs different in frequency from one another.

Moreover, there is a radio communication system comprising:

a base station provided with an array antenna including a plurality of antenna elements; and a control station provided with a beam forming network for deriving a desired signal from a received signal of said variable directional array antenna, said base station being connected to said control station via an optical transmission line, wherein an electric signal received by said plurality of antenna elements is transmitted to said control station from said base station via said optical transmission line, and the signal transmitted via said optical transmission line is constituted by multiplexing an electric signal obtained by subjecting the electric signal received by said plurality of antenna elements to frequency conversion to different frequencies by a plurality of local oscillator outputs different in frequency from one another.

Moreover, there is provided a radio communication system comprising a base station for performing radio communication with a radio communication terminal; and a control station connected to the base station via an optical transmission line, wherein said base station comprises:

a plurality of antenna elements different in directivity from one another;

first optical/electric conversion means configured to convert a first optical signal transmitted from said control station via said optical transmission line to an electric signal;

separation means configured to separate the electric signal converted by the first optical/electric conversion means to a transmitted signal for said radio communication terminal and an antenna selection signal for selecting said plurality of antenna elements;

antenna control means configured to select any one of said plurality of antenna elements based on said antenna selection signal to control the antenna element;

transmission means configured to transmit the transmitted signal for said radio communication terminal to the radio communication terminal via said antenna element;

first frequency multiplexing means configured to subject signals correlated with respective received signals received from said radio communication terminal via said antenna element to frequency multiplexing; and first electric/optical conversion means configured to optically modulate the signal subjected to the frequency multiplexing by the frequency multiplexing means to generate a second optical signal, and transmitting the second optical signal to said control station via said optical transmission line, and said control station comprises:

second optical/electric conversion means configured to convert said second optical signal transmitted from said base station to the electric signal;

demultiplex means configured to divide the electric signal converted by said second optical/electric conversion means to said plurality of frequency signals before multiplexing;

weighting means configured to weight the signals correlated with the respective frequency signals divided by said demultiplex means with respect to a phase and/or a signal intensity;

combiner means configured to synthesize the respective signals weighted by said weighting means;

demodulation means configured to demodulate the received signal based on the signal synthesized by said combiner means;

level detection means configured to detect a maximum intensity and/or an intensity distribution of the signals correlated with the respective frequency signals divided by said demultiplex means, and generating said antenna selection signal based on the detection result;

second frequency multiplexing means configured to multiplex the transmitted signal for said radio communication terminal with said antenna selection signal; and second electric/optical conversion means configured to optically modulate the signal multiplexed by said second frequency multiplexing means to generate said first optical signal, and transmitting the first optical signal to said base station via said optical transmission line.

According to the present invention having the beam forming network, when the received signal is transmitted from the base station to the control station, a maximum intensity and/or an intensity distribution of the received signal in the base station or the control station are detected, and based on the detecting result, the radiation beam-pattern of the transmitted signal addressed to the radio communication terminal is controlled. Because of this, it is unnecessary to transmit the received signal while maintaining the relative phase difference from the base station to the control station, thereby simplifying and miniaturizing constitutions of the base station and the control station.

Furthermore, when the control station generates a control signal for controlling directivity of the transmitted signal addressed to the radio communication terminal in the base station, if the control signal is transmitted to the base station by multiplexing the transmitted signal addressed to the radio communication terminal, it is possible to simplify the constitution of the transmitter.

Moreover, when the base station generates a control signal for controlling directivity of the transmitted signal addressed to the radio communication terminal, the control station may send only the transmitted signal addressed to the radio communication terminal. Because of this, it is possible to simplify the constitution of the transmitter.

Furthermore, when only necessary received signal is transmitted from the base station to the control station based on the maximum intensity and/or the intensity distribution, it is possible to reduce the number of the received signal transmitted to the control station, and to simplify the constitution of the receiver.

Moreover, the radio communication system according to the present invention also includes means configured to compensate the relative phase difference between the antenna elements in the base station. There is a radio communication system including the means comprising a radio communication terminal; a base station for performing radio communication with the radio communication terminal; and a control station connected to the base station via an optical transmission line, said base station comprising:

an array antenna comprising a plurality of antenna elements; and feedback means configured to feed respective transmitted signals corresponding to said antenna elements transmitted from said control station via said optical transmission line back to said control station via said optical transmission line, said control station comprising:

comparing detection means configured to compare at least two signals among said respective transmitted signals fed back from said feedback means, and detecting a phase difference and/or an amplitude fluctuation amount; and compensation means configured to compensate for the respective transmitted signals corresponding to said plurality of antenna elements based on the phase difference and/or the amplitude fluctuation amount detected by said comparing detection means.

According to the present invention, since the transmitted signal transmitted to the base station from the control station is fed back to the control station, and the phase and amplitude of the transmitted signal are adjusted based on the comparison result of the transmitted signal with the fed back signal, or the comparison result of two of the fed back signals, the phase difference and amplitude fluctuation amount generated during propagation of the transmitted signal in the control station and base station can easily and precisely be calibrated.

Moreover, according to the present invention, since a calibration processing can be performed even during communication, the communication is not interrupted by the calibration.

As mentioned above, the radio communication system according to the present invention can reduce the number of the electric/optical converters and the optical/electric converters of the control station and the base station to a large degree. Accordingly, it is possible to miniaturize the constitutions of the base station and the control station. By reduction of the optical components, it is possible to reduce cost of the radio communication system. By such an advantage, it is possible to allocate many base stations, thereby enlarging the communication area.

Furthermore, the radio communication system according to the present invention can restrain fluctuation of the relative phase difference between the antenna elements even if an effective length changes by fluctuation of the peripheral temperature in the optical fiber of the transmitted line possibly arranged outside. Because of this, it is possible to stabilize operation of the system and to realize the radio communication system with high reliability.

BRIEF DESCRIPTION OF THE DRAWINGS

FIG. 6A is a diagram showing input/output signals of a multiplier and a band pass filter, and FIG. 6B is a diagram showing the input/output signals of the multiplier and band pass filter.

FIG. 10 is a frequency spectrum diagram of a sub-carrier multiplexing signal generated by a coupler.

FIG. 15A is a block diagram showing a detailed constitution of a spread spectrum unit, and FIG. 15B is a block diagram showing a detailed constitution of a de-spread spectrum unit.

FIGS. 27A and 27B are diagrams showing properties of beams formed by a beam forming network.

FIG. 35 is a frequency spectrum diagram of a signal subjected to antenna element multiplexing in a combiner.

FIG. 36 is a block diagram showing a detailed constitution of a calibration coefficient calculation circuit.

FIG. 43 is a block diagram of the radio communication system in which FIG. 41 is modified.

DETAILED DESCRIPTION OF THE PREFERRED EMBODIMENTS

A radio communication system according to the present invention will concretely be described hereinafter with reference to the drawings. Additionally, in the following embodiments, in order to show a principle phase state and signal intensity state, dispersions of gain, loss, transmittance, and group speed by solid differences of microwave components such as an amplifier, a multiplier, and a filter inserted into each antenna element line and a delay difference by a line length are ignored.

First Embodiment

Figure 3:
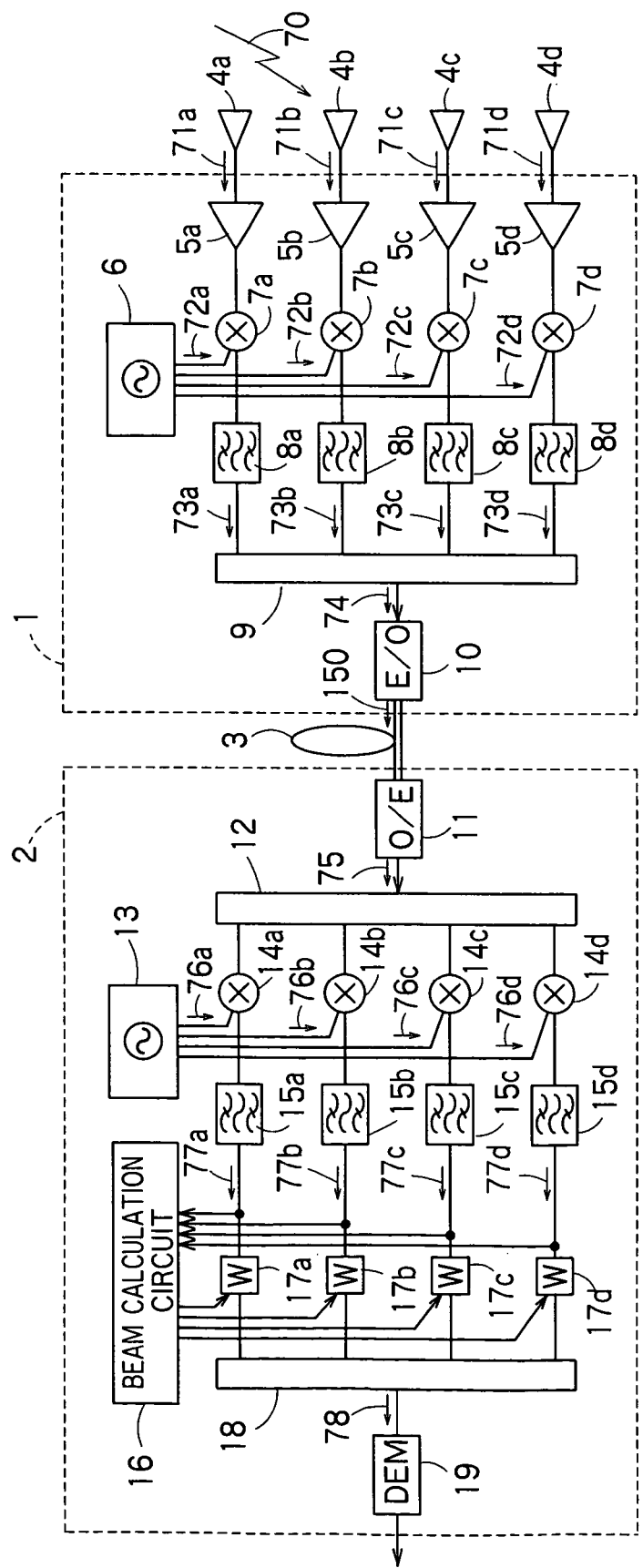
FIG. 3 is a block diagram schematically showing a first embodiment of the radio communication system according to the present invention.

FIG. 3 is a block diagram schematically showing a constitution of a first embodiment of the radio communication system according to the present invention. The radio communication system of FIG. 3 is constituted of a base station 1 and a control station 2, and the stations are connected to each other via an optical fiber 3.

The base station 1 has array antennas 4a to 4d constituted of four antenna elements, low noise amplifiers 5a to 5d, a base station local oscillator (first local oscillator) 6, multipliers (base station side frequency conversion means) 7a to 7d, band pass filters 8a to 8d, a coupler (sub-carrier multiplexing signal generation means) 9, and an electric/optical converter (E/O converter: base station side transmission means) 10.

The control station 2 has an optical/electric converter (O/E converter) 11, a divider 12, a control station local oscillator (second local oscillator) 13, multipliers (control station side frequency conversion means) 14a to 14d, band pass filters 15a to 15d, a beam calculation circuit (beam calculation means) 16, weighting circuits (weighting means) 17a to 17d, a coupler (received signal generation means) 18, and a demodulator 19.

In the base station 1, a radio signal 70 from a subscriber (not shown) is received by the array antennas 4a to 4d. In the present embodiment, a case in which the number of elements of the array antennas 4 is four (the respective elements 4a to 4d are shown in FIG. 3) will be described, but the number of elements is not particularly limited. Received signals 71a to 71d received by the respective array antennas 4a to 4d are represented by an equation (1).

$$R_a(t) = \sqrt{P_a} \cos(\omega_{RF} t + \phi_m(t) + \phi_a) \quad (1)$$
$$R_b(t) = \sqrt{P_b} \cos(\omega_{RF} t + \phi_m(t) + \phi_b)$$
$$R_c(t) = \sqrt{P_c} \cos(\omega_{RF} t + \phi_m(t) + \phi_c)$$
$$R_d(t) = \sqrt{P_d} \cos(\omega_{RF} t + \phi_m(t) + \phi_d)$$

In the equation (1), the radio signal 70 is a phase modulation signal such as quadriphase-shift keying (QPSK), and a phase modulation term is $\phi_m(t)$. Additionally, t denotes time, $\omega$ denotes a signal angular frequency, $\phi$ denotes each signal relative phase, P denotes each signal relative intensity, and signal types are distinguished by affixed characters. Affixed characters a to d show that signals are related with respective antenna elements a to d. As shown in the equation (1), the respective received signals 71a to 71d change in phase and amplitude in accordance with an arrival direction of the radio signal 70.

The received signals 71a to 71d are inputted to the multipliers 7a to 7d via the low noise amplifiers 5a to 5d. The multipliers 7a to 7d multiply signals passing through the low noise amplifiers 5a to 5d by base station LO signals 72a to 72d outputted from the base station local oscillator 6, and convert down the frequency. The base station LO signals 72a to 72d are represented by equation (2).

$$LOI_a(t) = \sqrt{P_{1L}} \cos(\omega_{1a} t + \phi_{1a}) \quad (2)$$
$$LOI_b(t) = \sqrt{P_{1L}} \cos(\omega_{1b} t + \phi_{1b})$$
$$LOI_c(t) = \sqrt{P_{1L}} \cos(\omega_{1c} t + \phi_{1c})$$
$$LOI_d(t) = \sqrt{P_{1L}} \cos(\omega_{1d} t + \phi_{1d})$$

The base station LO signals 72a to 72d are, as shown in the equation (2), equal to one another in power and different from one another in frequency. By performing multiplication with the base station LO signals 72a to 72d, the received signals 71a to 71d are converted to signals of a low frequency band with frequencies different from each other.

The outputs of the multipliers 7a to 7d are inputted to the band pass filters 8a to 8d, and desired band received signals 73a to 73d are extracted. The received signals 73a to 73d are represented by equation (3).

$$R'_a(t) = \frac{1}{2} \times \sqrt{P_a P_{1L}} \cos\{(\omega_{RF} - \omega_{1a})t + \phi_m(t) + \phi_a - \phi_{1a}\} \quad (3)$$
$$R'_b(t) = \frac{1}{2} \times \sqrt{P_b P_{1L}} \cos\{(\omega_{RF} - \omega_{1b})t + \phi_m(t) + \phi_b - \phi_{1b}\}$$
$$R'_c(t) = \frac{1}{2} \times \sqrt{P_c P_{1L}} \cos\{(\omega_{RF} - \omega_{1c})t + \phi_m(t) + \phi_c - \phi_{1c}\}$$
$$R'_d(t) = \frac{1}{2} \times \sqrt{P_d P_{1L}} \cos\{(\omega_{RF} - \omega_{1d})t + \phi_m(t) + \phi_d - \phi_{1d}\}$$

The received signals 73a to 73d passing through the band pass filters 8a to 8d are combined by the coupler 9, and a sub-carrier multiplexing signal 74 is generated. The generated sub-carrier multiplexing signal 74 is inputted to the electric/optical converter 10, converted to a optical signal 150, and transmitted to the control station 2 via the optical fiber 3.

The optical signal transmitted to the control station 2 via the optical fiber 3 is converted to a received signal 75 by the optical/electric converter 11 such as a photo detector (PD). The received signal 75 is distributed by the number of antenna elements by the divider 12, and subsequently inputted to the multipliers 14a to 14d.

The multipliers 14a to 14d multiply an output signal of the divider 12 by base station LO signals 76a to 76d outputted from the control station local oscillator 13, and perform frequency conversion. The control station LO signals 76a to 76d are, as shown in the equation (4), equal to one another in power, and different from one another in frequency, and by performing multiplication with these signals, the frequency of the received signal 75 subjected to sub-carrier wave multiplexing is again converted to the same frequency band in the control station 2.

$$LO2_a(t) = \sqrt{P_{2L}} \cos(\omega_{2a} t + \phi_{2a})$$
$$LO2_b(t) = \sqrt{P_{2L}} \cos(\omega_{2b} t + \phi_{2b})$$
$$LO2_c(t) = \sqrt{P_{2L}} \cos(\omega_{2c} t + \phi_{2c})$$
$$LO2_d(t) = \sqrt{P_{2L}} \cos(\omega_{2d} t + \phi_{2d})$$
(4)

Outputs of the multipliers 14a to 14d are inputted to the band pass filters 15a to 15d, and desired band received signals 77a to 77d are extracted. The received signals 77a to 77d are represented by equation (5).

$$R''_a(t) = \frac{1}{4} \times \sqrt{P_a P_{1L} P_{2L}} \cos\{(\omega_{RF} - \omega_{1a} - \omega_{2a})t + \phi_m(t) + \phi_a - (\phi_{1a} + \phi_{2a})\}$$

$$R''_b(t) = \frac{1}{4} \times \sqrt{P_b P_{1L} P_{2L}} \cos\{(\omega_{RF} - \omega_{1b} - \omega_{2b})t + \phi_m(t) + \phi_b - (\phi_{1b} + \phi_{2b})\}$$

$$R''_c(t) = \frac{1}{4} \times \sqrt{P_c P_{1L} P_{2L}} \cos\{(\omega_{RF} - \omega_{1c} - \omega_{2c})t + \phi_m(t) + \phi_c - (\phi_{1c} + \phi_{2c})\}$$

$$R''_d(t) = \frac{1}{4} \times \sqrt{P_d P_{1L} P_{2L}} \cos\{(\omega_{RF} - \omega_{1d} - \omega_{2d})t + \phi_m(t) + \phi_d - (\phi_{1d} + \phi_{2d})\}$$
(5)

Here, respective frequencies and phases of the output signals 72a to 72d of the base station local oscillator 6 and the output signals 76a to 76d of the control station local oscillator 13 are set to satisfy conditions of equations (6) and (7)

$$\omega_{IF} = \omega_{RF} - \omega_{1a} - \omega_{2a} = \omega_{RF} - \omega_{1b} - \omega_{2b} = \omega_{RF} - \omega_{1c} - \omega_{2c} = \omega_{RF} - \omega_{1d} - \omega_{2d}$$
(6)

$$k + 2m\pi = \phi_{1a} + \phi_{2a} + 2m_a\pi = \phi_{1b} + \phi_{2b} + 2m_b\pi = \phi_{1c} + \phi_{2c} + 2m_c\pi = \phi_{1d} + \phi_{2d} + 2m_d\pi$$
(7)

When the conditions of the equations (6) and (7) are satisfied, the received signals 77a to 77d represented by the equation (5) are rewritten as in equation (8).

$$R''_a(t) = A\sqrt{P_a} \cos(\omega_{IF} t + \phi_m(t) + \phi_a - k)$$
$$R''_b(t) = A\sqrt{P_b} \cos(\omega_{IF} t + \phi_m(t) + \phi_b - k)$$
$$R''_c(t) = A\sqrt{P_c} \cos(\omega_{IF} t + \phi_m(t) + \phi_c - k)$$
$$R''_d(t) = A\sqrt{P_d} \cos(\omega_{IF} t + \phi_m(t) + \phi_d - k)$$
(8)

As seen from comparison of the equation (1) with the equation (8), the received signals 77a to 77d maintain relative phase differences $\phi_a$ to $\phi_d$ and relative intensities Pa to Pd of the received signals 71a to 71d in the base station 1. Therefore, influences of phase addition and signal intensity fluctuation during propagation of the received signal to the control station 2 from the base station 1 can be ignored.

The beam calculation circuit 16 performs calculation for controlling signal processings such as optimum synthesis based on the received signals 77a to 77d. When it is unnecessary for the radio communication system as an object to obtain the arrival direction of the radio signal 70, the beam calculation circuit 16 may perform only the optimum synthesis. In this case, the condition of equation (7) does not have to be necessarily satisfied.

The beam calculation circuit 16 in the present embodiment partially takes the received signals 77a to 77d, and calculates phase and intensity weights to perform the optimum signal synthesis. Subsequently, based on the calculation results, by controlling the weighting circuits 17a to 17d, adding the phase and signal intensity weights to the received signals 77a to 77d, and combining the respective signals by the multiplexer 18, a received signal 78 is obtained. The received signal 78 is inputted to the demodulator 19, and information from the subscriber is extracted.

The beam calculation circuit 16, in addition to the aforementioned signal processing, based on the relative phase differences $\phi a$ to $\phi d$ and relative intensity differences Pa to Pd, can perform optimum multiplexing control with respect to a delay wave, or restrain an unnecessary wave and an interference wave of the received signal and perform signal-to-interference ratio (SIR) optimum multiplexing. Moreover, the arrival direction of the radio signal 70 can also be obtained by calculation.

In the present embodiment, a transmitter to the subscriber from the base station 1 is not shown, but estimation of the arrival direction of the radio signal 70 in the control station 2 is important for determining the transmission direction of the radio signal to the subscriber from the base station 1, and the calculation result of the beam calculation circuit 16 can be applied to the transmitter.

In principle, when the respective signal intensities of the base station LO signals 72a to 72d and control station LO signals 76a to 76d are constant, it is possible to transmit the signal to the control station 2 while holding the relative intensity difference of the received signal 71a to 71d. Similarly, it is possible to transmit the signal from the control station 2 to the base station 1. Hereinafter, no relative intensity difference is not referred to, and the relative phase difference is noted.

The received signals 71a to 71d of the respective antenna elements 4a to 4d are transmitted to the control station 2 from the base station 1 with different carrier wave frequencies. When the carrier wave frequency is different, the relative phase difference between the antenna element lines changes in accordance with propagation time. Therefore, it is necessary to consider a relation of phase terms of the base station LO signals 72a and 72d and control station LO signals 76a to 76d used in two frequency conversions in total in the base station 1 and control station 2.

Figure 4:
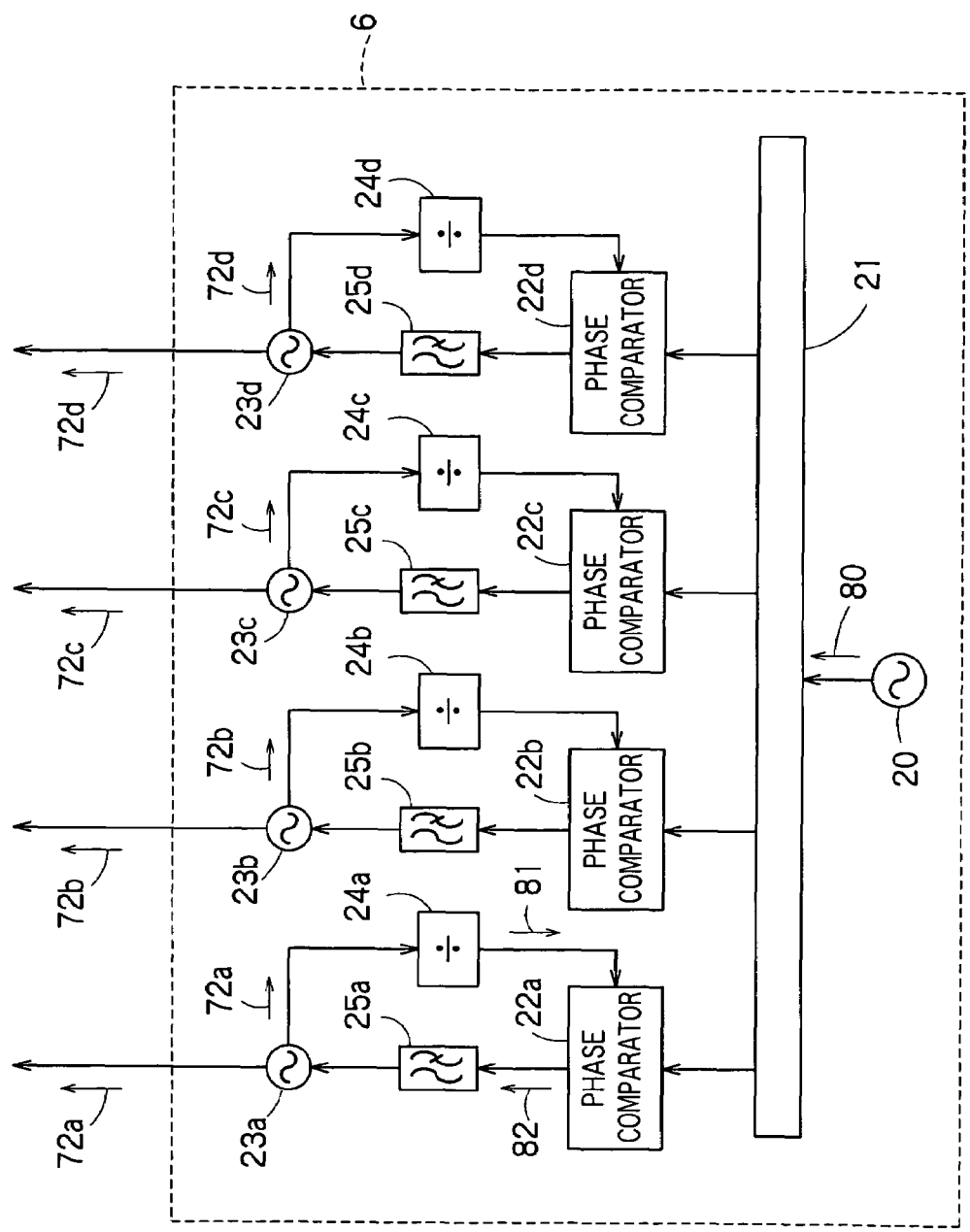
FIG. 4 is a block diagram showing a base station local oscillator.

FIG. 4 is a block diagram showing a constitution of the base station local oscillator 6. As shown in FIG. 4, the base station local oscillator 6 has a reference oscillator 20, distributor 21, phase comparators 22a to 22d, voltage control oscillators (VCO) 23a to 23d, frequency dividers 24a to 24d, and loop filters 25a to 25d.

A highly stable oscillator such as a crystal is used in the reference oscillator 20. An oscillation frequency of an output signal 80 of the reference oscillator 20 is set to fr. The output signal 80 is divided by the number of antenna elements by the distributor 21, and inputted to the phase comparators 22a to 22d.

Signals 81 obtained by dividing frequencies of output signals 72a to 72d from the VCO 23a to 23d, for example, to N, (N+1), . . . , (N+3) are inputted to phase comparators 22a to 22d. The phase comparators 22a to 22d compare the phases of two input signals 80, 81 with each other, and output a phase comparison signal 82. The phase comparison signal 82 is fed back to the VCO 23a to 23d via the loop filters 25a to 25d. By this feedback, the frequencies of the base station LO signals 72a to 72d as outputs of the VCO 23a to 23d are locked in order of N×fr, (N+1)×fr, (N+2)×fr, (N+3)×fr.

Figure 5:
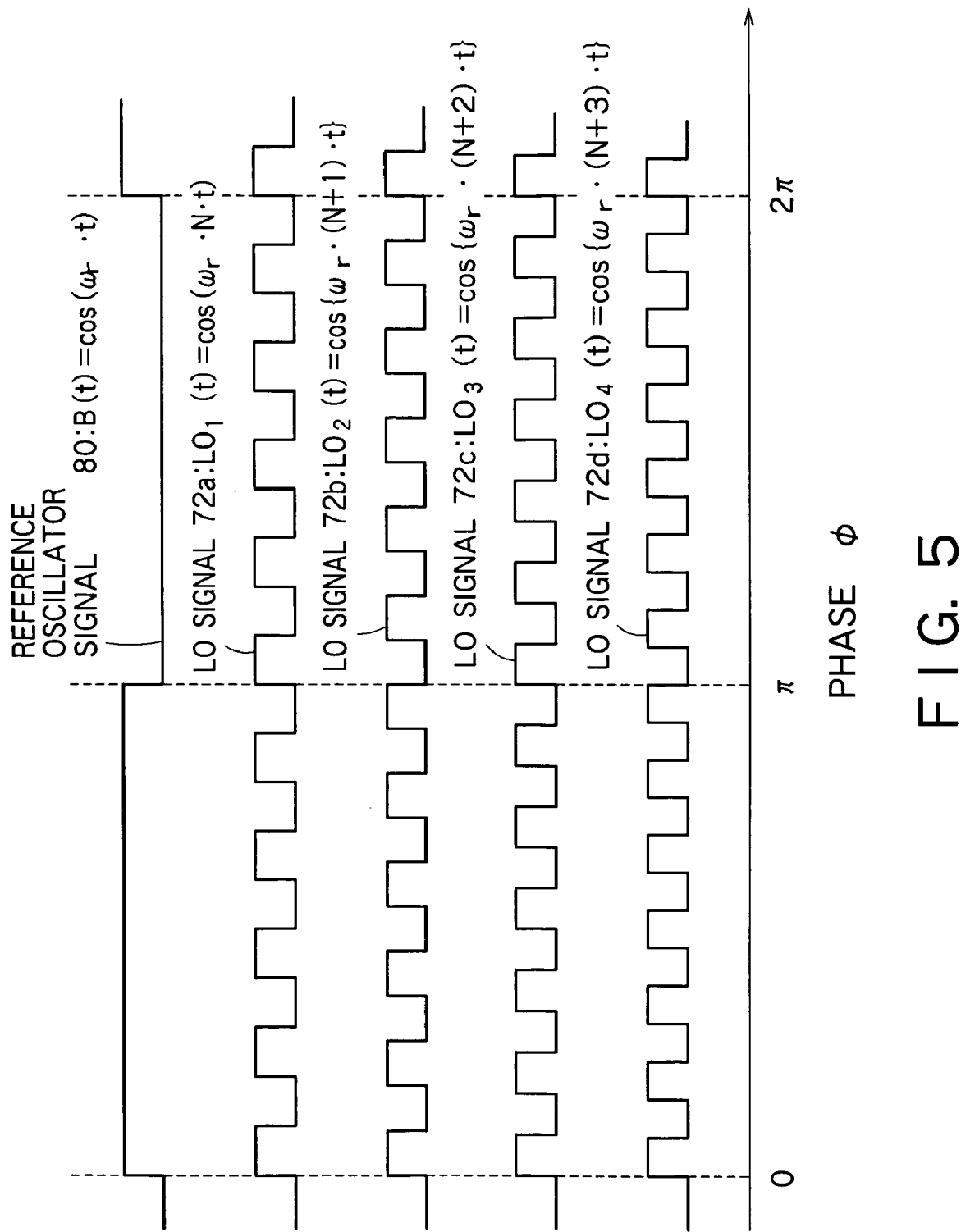
FIG. 5 is a waveform diagram of a base station LO signal.

FIG. 5 is a waveform diagram of the base station LO signals 72a to 72d. The actually outputted oscillation signals 72a to 72d are sinusoidal waves, but here rectangular waves are shown in order to clarify rising and falling phase states, a rising phase is set to zero degree, and a falling phase is set to π degree.

FIG. 5 shows waveforms of the base station LO signals 72a to 72d when the phase comparator 21 outputs the phase comparison signal 82 so that a phase difference between the reference oscillator output signal 80 and the frequency division signal 81 is 0 degree, and the base station LO signals 72a to 72d are represented by equations shown in FIG. 5.

The control station local oscillator 13 on the side of the control station 2 is constituted similarly as the base station local oscillator 6 and generates the control station LO signals 76a to 76d. The oscillation frequency of the reference signal 80 in the control station local oscillator 13 is fr, which is the same as that on the side of the base station 1. Moreover, the frequencies of the control station LO signals 76a to 76d are locked in order of (N+3)×fr, (N+2)×fr, (N+1)×fr, N×fr so that the frequencies of the received signals 77a to 77d coincide with each other.

Here, it is assumed that a phase state of reference signal 80 on the base station 1 side is $\phi_{BS}$, and the phase state of the reference signal 80 on the control station 2 side is $\phi_{CS}$. In order to show a phase change amount to the received signal 77 from the received signal 71, the received signal 71a represented by the equation (1) is rewritten as in equation (9).

$$Ra(t) = \cos[\omega_{RF} t] \quad (9)$$

Moreover, when the phase state of the reference signal 80 is φBS, the base station LO signal 72a of the equation (2) can be rewritten as follows.

$$LO1a(t) = \cos[N\omega_r t + N + \phi_{BS}] \quad (10)$$

FIG. 6A is a diagram showing input/output signals of the multiplier 7a and band pass filter 8a, and FIG. 6B is a diagram showing the input/output signals of the multiplier 14a and band pass filter 15a. From the aforementioned equations (9) and (10), the received signal 73a outputted from the band pass filter 8a can be represented as in equation (11).

$$R'a(t) = (1/2) \times \cos[(\omega_{RF} - N\omega_r)t - N\phi_{BS}] \quad (11)$$

The propagation time of the received signal 73 to the control station 2 from the base station 1 is set to T, and t'=t−T. On the control station 2 side, the received signal 75 transmitted from the base station 1 (here, only the desired band of the line of the antenna element 4a is shown) is multiplied by the control station LO signal 76a. When the phase state of the reference signal 80 on the control station 2 side is $\phi_{CS}$, the control station LO signal 76a can be represented by equation (12).

$$LO2a(t) = \cos[(N+3)\omega_r t' + (N+3)\phi_{CS}] \quad (12)$$

The frequencies of the control station LO signals 76a to 76d are selected to convert the received signals 75a to 75d to the same frequency band. Therefore, briefly, the frequencies of the control station LO signals 76a to 76d may be set to (N+3)ωr, (N+2)ωr, (N+1)ωr, Nω in order.

As described above, the received signal 77a can be represented by equation (13).

$$R'_a(t) = \frac{1}{4} \times \cos[\{\omega_{RF} - N\omega_r - (N+3)\omega_r\}t' - N\phi_{BS} - (N+3)\phi_{BS}] \quad (13)$$

$$= \frac{1}{4} \times \cos[\omega_{IF}t' - N\phi_{BS} - (N+3)\phi_{CS}]$$

$$= \frac{1}{4} \times \cos[\omega_{IF}t - \omega_{IF}T - N\phi_{BS} - (N+3)\phi_{CS}]$$

In the equation (13), an added phase term to the received signal 77a from the received signal 72a is $-\omega_{IF}T - N\phi_{BS} - (N+3)\phi_{CS}$. The added phase terms to the other received signals 77b to 77d can similarly be obtained. When $-\omega_{IF}T$ as a common part to the respective phase terms is omitted, the added phase terms to the received signals 77b to 77d are $-(N+1)\phi_{BS}-(N+2)\phi_{CS}$, $-(N+2)\phi_{BS}-(N+1)\phi_{CS}$, $-(N+3)\phi_{BS}-N\phi_{CS}$ in order. When these added phase terms are equal, the relative phase difference to the respective received signals 71a to 71d are also kept in the received signals 77a to 77d. For this purpose, $\phi_{CS}$ and $\phi_{BS}$ need to satisfy a relation of equation (14).

$$\phi_{CS} = \phi_{BS} \pm 2\pi \quad (14)$$

By satisfying the relation of the equation (14), each added phase term is $-(2N+3)\phi_{BS} \pm 2\pi$, and the relative phase difference added to the received signals 77a to 77d is zero.

Figure 7A:
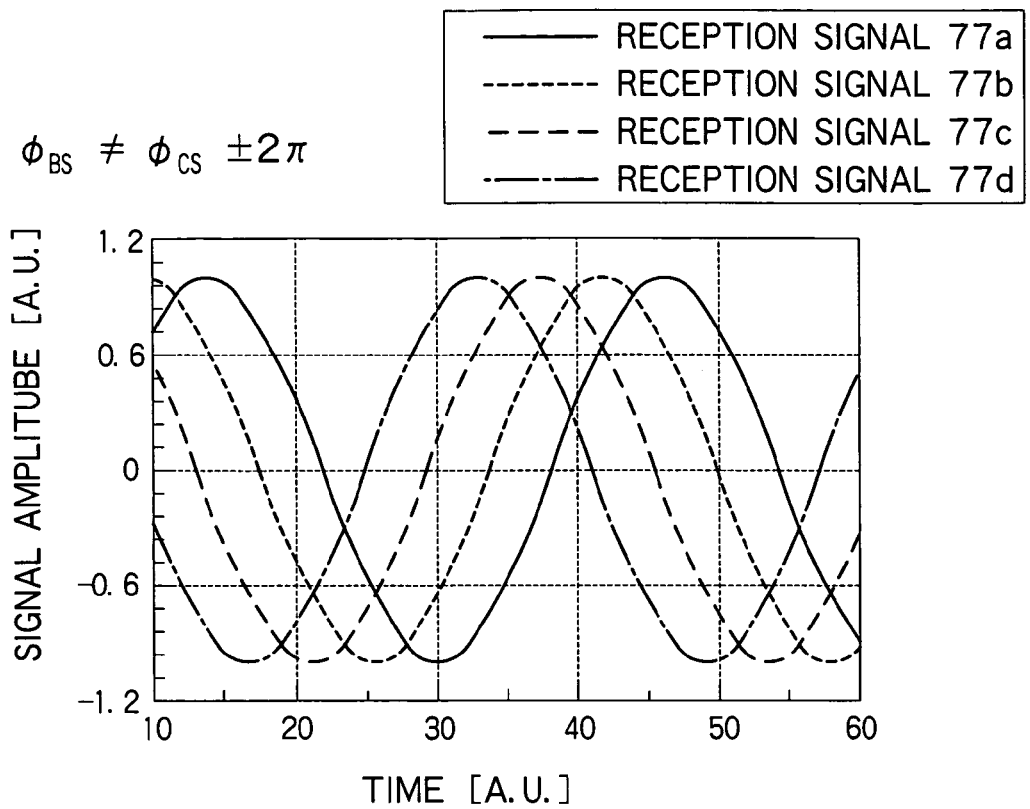
FIG. 7A is a waveform diagram of a received signal when a relation of equation (14) is not satisfied.

Here, to check the influence by the added phase term, the received signals 71a to 71d are sinusoidal signals with a relative phase difference of zero. When the relation of the equation (14) is not satisfied, for the received signals 77a to 77d, as shown in FIG. 7A, the added phase terms in two frequency conversions differ among the lines of the respective antenna elements 4a to 4d, the relation of the relative phase difference collapses, and no waveform is overlapped.

Figure 7B:
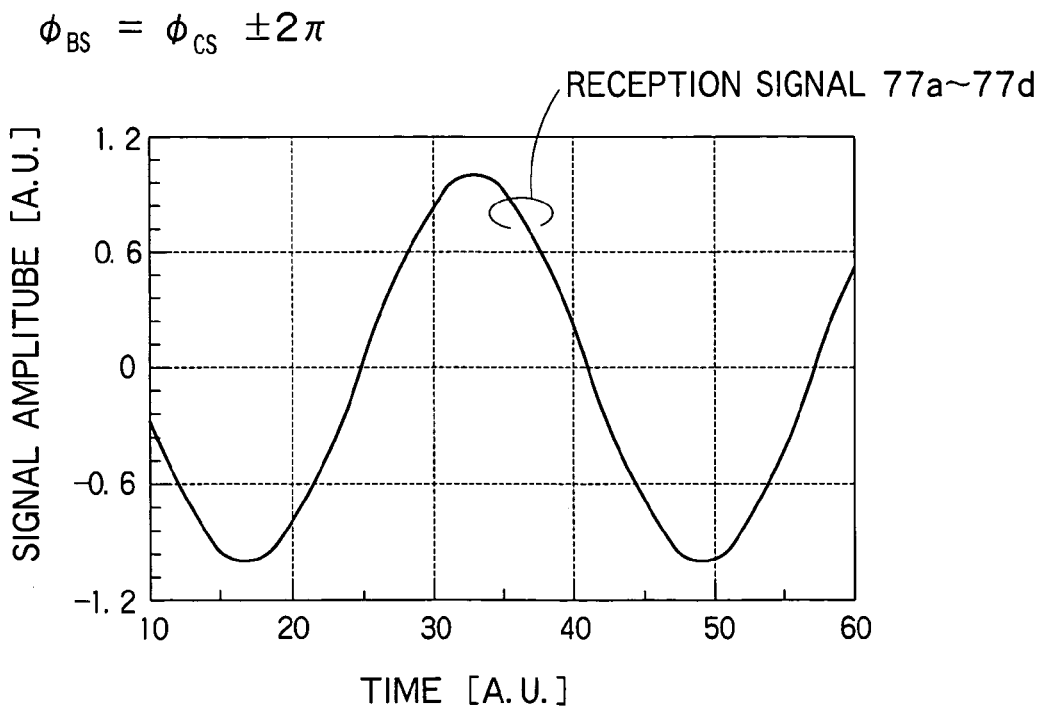
FIG. 7B is a waveform diagram of the received signal when the relation of equation (14) is satisfied.

On the other hand, when the relation of the equation (14) is satisfied, the added phase term by the two frequency conversions is equal. Therefore, when it is supposed that the received signals 71a to 71d are sinusoidal signals with a relative phase difference of zero, the waveform of the received signals 77a to 77d in the control station 2 is as shown in FIG. 7B. In this case, since the added phase term by the two frequency conversions is equal, the waveforms of the received signals 77a to 77d are all coincident.

As described above, in the first embodiment, since the received signals received by the plurality of antenna elements 4a to 4d in the base station 1 are subjected to sub-carrier wave multiplexing and transmitted to the control station 2, the constituting elements of the optical transmitter part can be minimized, and the constitution of the base station 1 can be simplified. Moreover, while the relative phase difference and relative intensity of the respective received signals are maintained, the received signals can be transmitted to the control station 2 from the base station 1, so that high-quality signal reception is possible without being influenced by unnecessary and interference waves.

Second Embodiment

In a second embodiment, a reference signal outputted from the base station local oscillator 6 and a reference signal outputted from the control station local oscillator 13 are shared.

Figure 8:
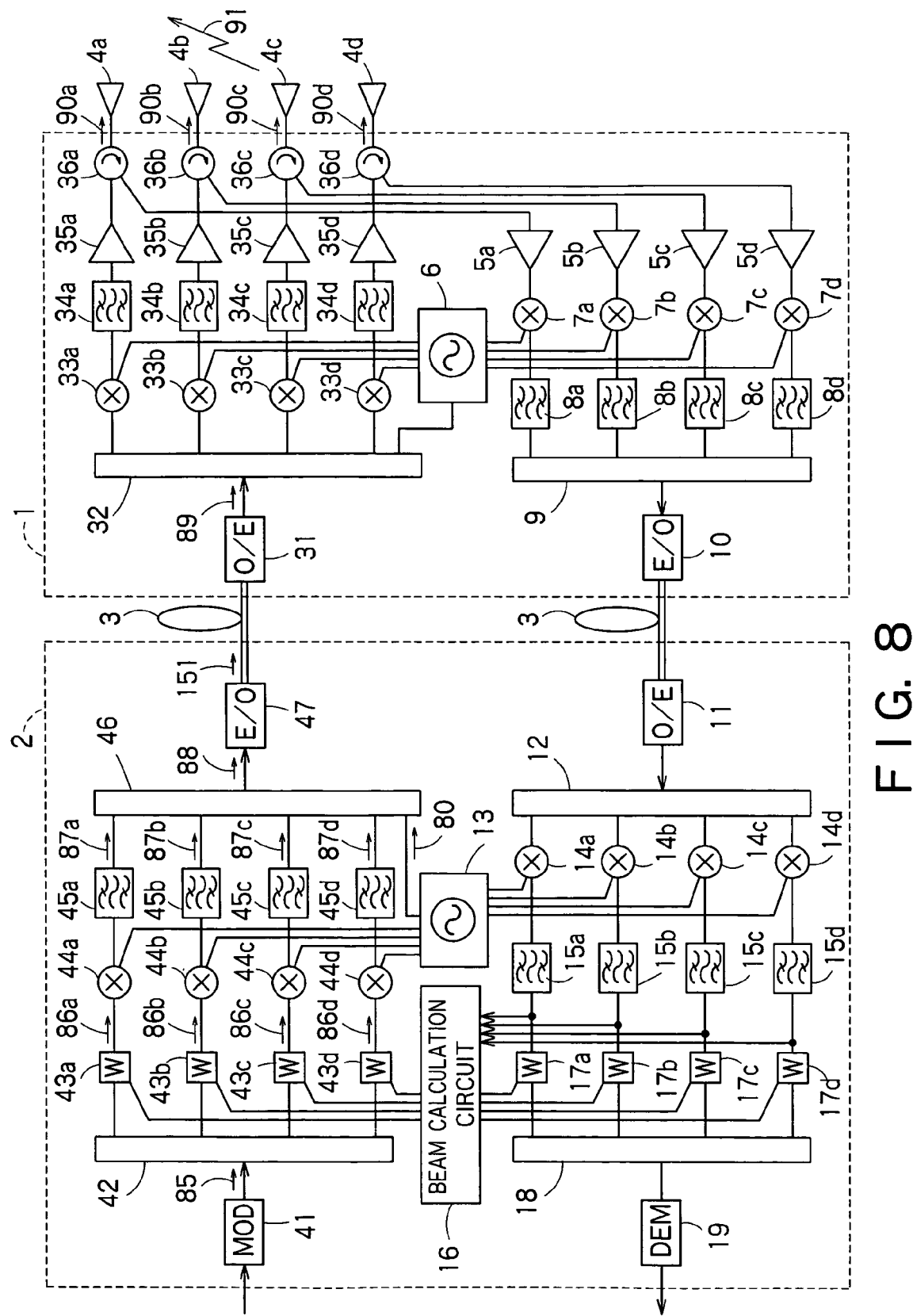
FIG. 8 is a block diagram of a second embodiment of the radio communication system according to the present invention.

FIG. 8 is a block diagram of the second embodiment of the radio communication system according to the present invention. In FIG. 8, constituting parts common to FIG. 3 are denoted by the same reference numerals, and respects different from FIG. 3 will mainly be described hereinafter.

In the radio communication system of FIG. 8, the constitution of a receiver to the control station 2 from the base station 1 is similar to that of the first embodiment except the constitutions of the base station local oscillator 6 and control station local oscillator 13.

The radio communication system of FIG. 8 is characterized in that the constitution of the transmitter to the base station 1 from the control station 2 is newly added, and the base station local oscillator 6 and control station local oscillator 13 use a common reference signal to generate a local oscillator output.

The newly added transmitter in the base station 1 has an optical/electric converter 31, distributor (second branching means) 32, multipliers (fourth frequency conversion means) 33a to 33d, band pass filters 34a to 34d, low noise amplifiers 35a to 35d, and circulators 36a to 36d for switching transmission/reception.

Moreover, the newly added transmitter in the control station 2 has a modulator (MOD) 41, distributor (first branching means) 42, weighting circuits (weighting means) 43a to 43d, multipliers (control station side frequency conversion means) 44a to 44d, band pass filters 45a to 45d, coupler (sub-carrier multiplexing signal generation means) 46, and electric/optical converter (transmission means) 47.

Figure 9:
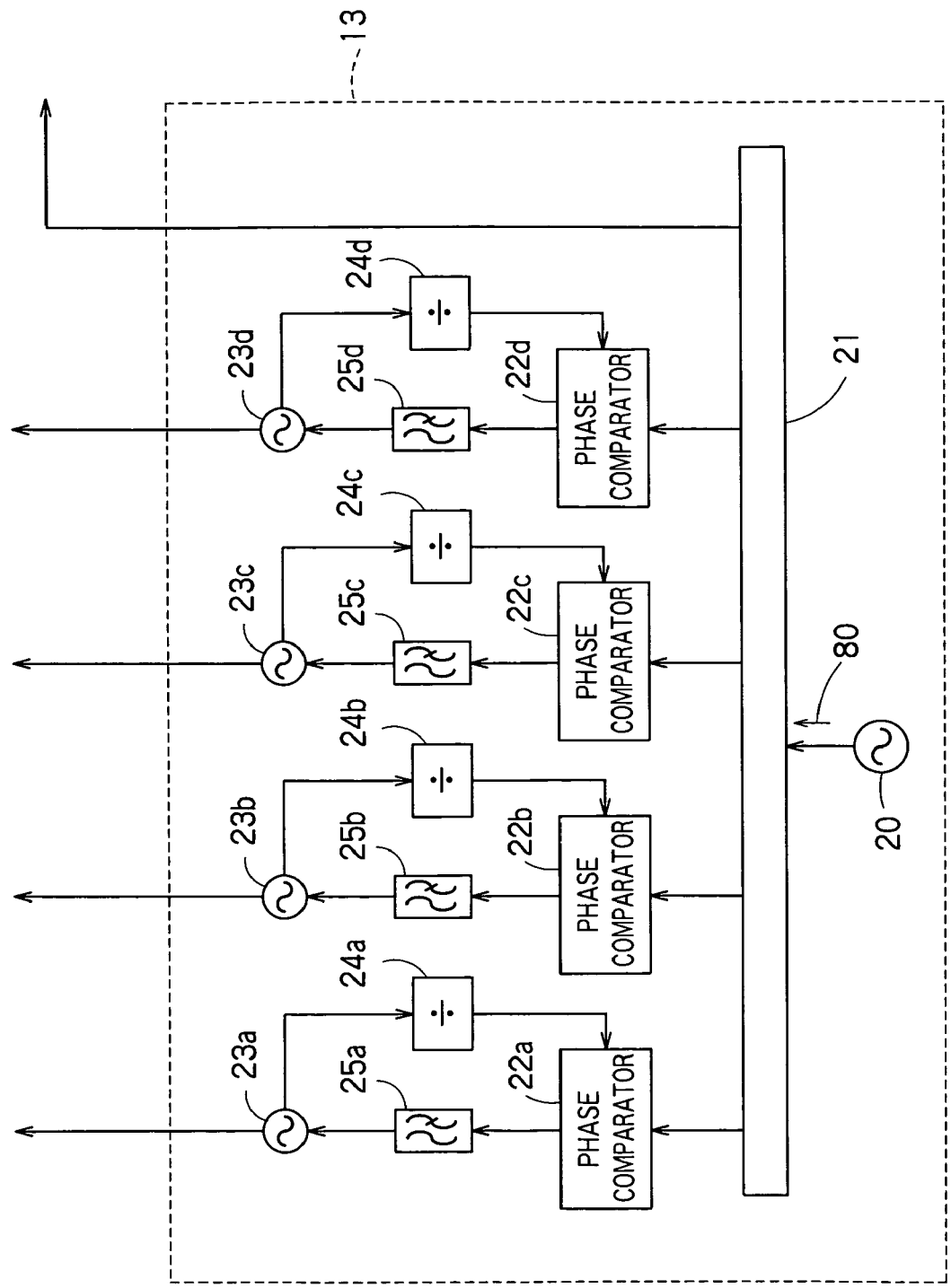
FIG. 9 is a block diagram showing a detailed constitution of a control station local oscillator of FIG. 8.

FIG. 9 is a block diagram showing a detailed constitution of the control station local oscillator 13 of FIG. 8. As shown in FIG. 9, the control station local oscillator 13 has reference oscillator 20 for outputting a reference signal, distributor 21, phase comparators 22a to 22d, voltage control oscillators (VCO) 23a to 23d, frequency dividers 24a to 24d, band pass filters 25a to 25d.

The distributor 21 distributes the reference signal outputted from the reference oscillator 20 more than the number of antenna elements. Subsequently, the reference signal 80 subjected to no signal processing is inputted to the coupler 9 in the control station 2 shown in FIG. 8.

Transmitted signals 87a to 87d transmitted to the base station 1 from the control station 2 will be described later in detail. The reference signal 80 is combined with the transmitted signals 87a to 87d by the coupler 9, and transmitted as a sub-carrier multiplexing signal 88 to the base station 1.

FIG. 10 is a frequency spectrum drawing of the sub-carrier multiplexing signal 88 generated by the coupler 9. The sub-carrier multiplexing signal 88 is converted to a optical signal 151 by the electric/optical converter 10, and optically transmitted to the base station 1 from the control station.

The optical/electric converter 11 in the base station 1 converts the optical signal 151 transmitted from the control station 2 to a received signal 89. The received signal 89 is inputted to the divider 12, and distributed to the antenna element line and base station local oscillator 6.

Figure 11:
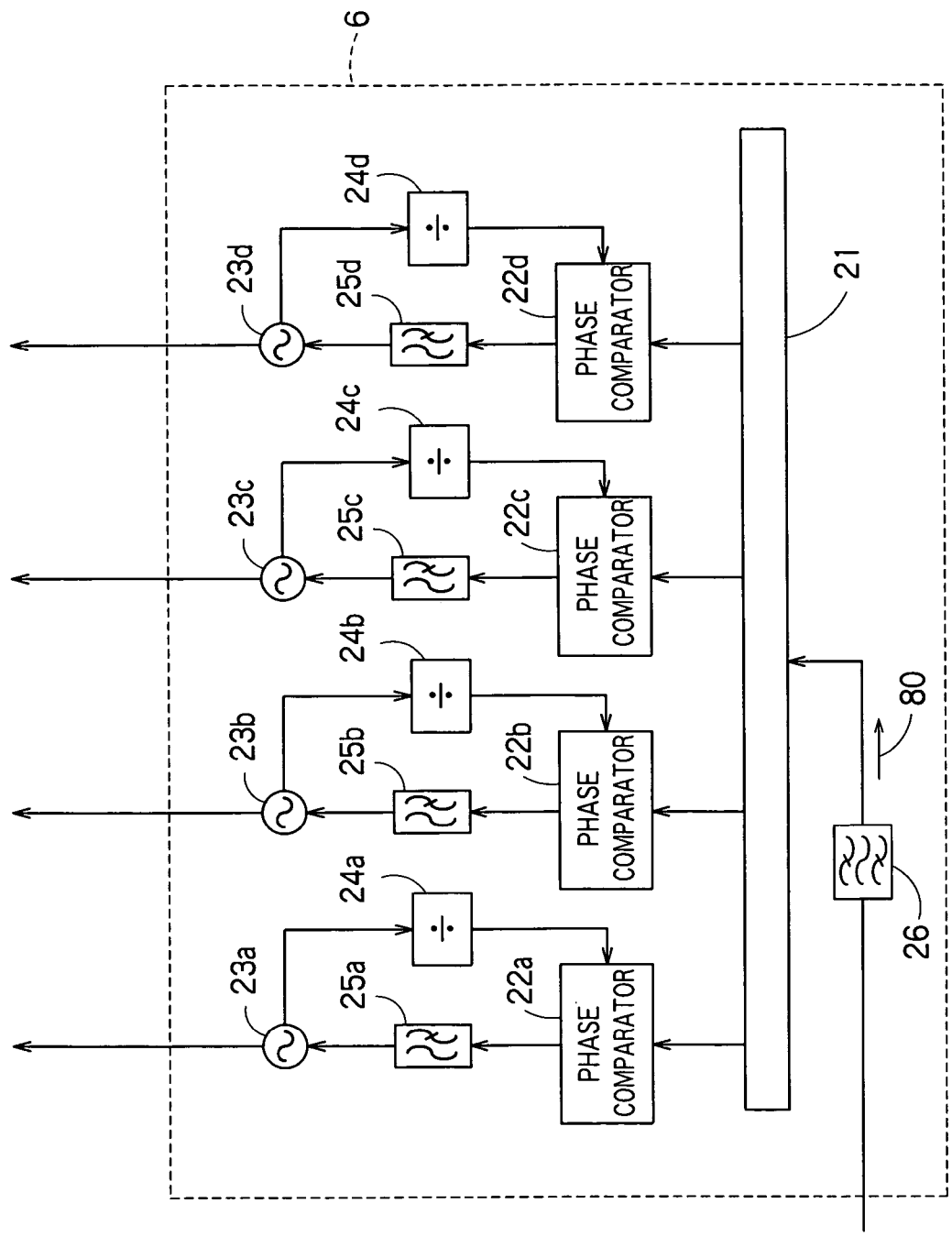
FIG. 11 is a block diagram showing a detailed constitution of a base station local oscillator.

FIG. 11 is a block diagram showing a detailed constitution of the base station local oscillator 6. When the received signal 89 from the distributor 21 of FIG. 9 passes through a band pass filter 26 of FIG. 11, the desired reference signal 80 is obtained. The base station local oscillator 6 generates the base station LO signals 72a to 72d for the respective antenna element lines based on the reference signal transmitted from the control station 2. Thereby, the reference signal 80 of the control station local oscillator 13 and base station local oscillator 6 can be shared.

An operation of the transmitter in the second embodiment will next be described. An intermediate frequency signal $S_{IF}(t)$ as an output from the modulator 26 in the control station 2 is represented by equation (15).

$$S_{IF}(t) = \sqrt{P_{IF}} \cos(\omega_{IF} + \phi_m(t)) \tag{15}$$

In the equation (15), similarly as the first embodiment, it is supposed that radio signals 91 transmitted from the antenna elements 4a to 4d are phase modulation signals such as quadriphase-shift keying (QPSK), phase modulation term is $\phi_m(t)$, intermediate frequency is $\omega_{IF}$, and signal power is $P_{IF}$.

An intermediate frequency signal 85 outputted from the modulator 16 of FIG. 8 is branched by the distributor 42 by the number of antenna elements, and the respective signals are inputted to the weighting circuits 43a to 43d. Moreover, the beam calculation circuit 16 extracts the relative phase difference and relative intensity difference from the received signals 76a to 76d which have the relative phase difference and relative intensity difference equal to those of the received signals 71a to 71d.

The arrival direction of the radio signal 70, that is, a subscriber's position is detected from the extracted information, the transmission direction of the radio signal 91 is determined based on the position, and the corresponding weight is calculated. The weighting circuits 43a to 43d add the amplitude and phase, or the phase weight to the intermediate frequency signal 85 in accordance with the weight control from the beam calculation circuit 16. When the weight is represented by W, output signals 86a to 86d of the weighting circuits 43a to 43d are represented by equation (16).

$$S'_a(t) = \sqrt{W_{pa}P_{IF}} \cos(\omega_{IF}t + \phi_m(t) + W_{\phi a})$$
$$S'_b(t) = \sqrt{W_{pb}P_{IF}} \cos(\omega_{IF}t + \phi_m(t) + W_{\phi b})$$
$$S'_c(t) = \sqrt{W_{pc}P_{IF}} \cos(\omega_{IF}t + \phi_m(t) + W_{\phi c})$$
$$S'_d(t) = \sqrt{W_{pd}P_{IF}} \cos(\omega_{IF}t + \phi_m(t) + W_{\phi d}) \tag{16}$$

The weighting signals 86a to 86d of the equation (16) are multiplied by the control station LO signals 76a to 76d from the control station local oscillator 13 shown in the equation (4) by the multipliers 44a to 44d. Outputs of the multipliers 44a to 44d are inputted to the band pass filters 45a to 45d, the desired band is extracted, and the transmitted signals 87a to 87d arranged in different frequencies are obtained. Equation (17) represents Sa"(t) to Sd"(t) as the obtained transmitted signals 87a to 87d.

$$S''_a(t) = \frac{1}{2} \times \sqrt{W_{Pa}P_{IF}P_{2L}} \cos\{(\omega_{IF} + \omega_{2a})t + \phi_m(t) + W_{\phi a} + \phi_{2a}\}$$
$$S''_b(t) = \frac{1}{2} \times \sqrt{W_{Pb}P_{IF}P_{2L}} \cos\{(\omega_{IF} + \omega_{2b})t + \phi_m(t) + W_{\phi b} + \phi_{2b}\}$$
$$S''_c(t) = \frac{1}{2} \times \sqrt{W_{Pc}P_{IF}P_{2L}} \cos\{(\omega_{IF} + \omega_{2c})t + \phi_m(t) + W_{\phi c} + \phi_{2c}\}$$
$$S''_d(t) = \frac{1}{2} \times \sqrt{W_{Pd}P_{IF}P_{2L}} \cos\{(\omega_{IF} + \omega_{2d})t + \phi_m(t) + W_{\phi d} + \phi_{2d}\} \tag{17}$$

The transmitted signals 87a to 87d are combined with the reference signal 80 from the control station local oscillator 13 by the coupler 9, and the sub-carrier multiplexing signal 88 is obtained. The sub-carrier multiplexing signal 88 is converted to the optical signal 151 in the electric/optical converter 47, and transmitted to the base station 1 via the optical fiber 3.

On the base station 1 side, the optical/electric converter 31 such as PD converts the optical signal to the received signal 89 as the electric signal. The received signal 89 is branched by the divider 32, and inputted to the antenna element line and base station local oscillator 6.

As described above, the base station local oscillator 6 generates the base station LO signals 72a to 72d shown in the equation (2) based on the reference signal 80 on the control station 2 side. In the antenna element line, the received signal 89 is multiplied by the base station LO signals 72a to 72d from the base station local oscillator 6, and the frequencies of the respective received signals are converted to the same radio frequency band $\omega_{RF}$.

Outputs of the multipliers 33a to 33d are inputted to the band pass filters 34a to 34d and the desired band is extracted. Outputs of the band pass filters 34a to 34d are passed through the power amplifiers 35a to 35d and circulators 36a to 36d, and transmitted signals 90a to 90d to be supplied to the antenna elements 4a to 4d are obtained. These transmitted signals 90a to 90d are represented by equation (18).

$$S_a(t) = \frac{1}{4} \times \sqrt{W_{Pa}P_{IF}P_{1L}P_{2L}} \cos\{(\omega_{IF} + \omega_{1a} + \omega_{2a})t + (\phi_m(t) + W_{\phi a}) + (\phi_{1a} + \phi_{2a})\}$$

$$S_b(t) = \frac{1}{4} \times \sqrt{W_{Pb}P_{IF}P_{1L}P_{2L}} \cos\{(\omega_{IF} + \omega_{1b} + \omega_{2b})t + (\phi_m(t) + W_{\phi a}) + (\phi_{1b} + \phi_{2b})\}$$

$$S_c(t) = \frac{1}{4} \times \sqrt{W_{Pc}P_{IF}P_{1L}P_{2L}} \cos\{(\omega_{IF} + \omega_{1c} + \omega_{2c})t + (\phi_m(t) + W_{\phi c}) + (\phi_{1c} + \phi_{2c})\}$$

$$S_d(t) = \frac{1}{4} \times \sqrt{W_{Pd}P_{IF}P_{1L}P_{2L}} \cos\{(\omega_{IF} + \omega_{1d} + \omega_{2d})t + (\phi_m(t) + W_{\phi d}) + (\phi_{1d} + \phi_{2d})\}$$

(18)

Here, the frequencies and phases of the transmitted signals 90a to 90d are set to satisfy conditions of equations (19) and (29) similarly as the first embodiment. By satisfying the constitutions of the base station and control station local oscillators 6, 13 in the receiver described in the first embodiment and the relation of the equation (14), a relation of equation (20) can be obtained.

$$\omega_{RF} = \omega_{IF} + \omega_{1a} + \omega_{2a} = \omega_{IF} + \omega_{1b} + \omega_{2b} = \omega_{IF} + \omega_{1c} + \omega_{2c} = \omega_{IF} + \omega_{1d} + \omega_{2d} \quad (19)$$

$$k + 2m\pi = \phi_{1a} + \phi_{2a} + 2m_a\pi = \phi_{1b} + \phi_{2b} + 2m_b\pi \\ = \phi_{1c} + \phi_{2c} + 2m_c\pi = \phi_{1d} + \phi y + 2m_d\pi \quad (20)$$

Additionally, k denotes a constant, and m, $m_a$ to $m_d$ denote integers.

From the above, the transmitted signals 90a to 90d from the respective antenna elements 4a to 4d can be represented by equation (21).

$$S_a(t) = \sqrt{W_{Pa}P_S} \cos(\omega_{RF}t + \phi_m(t) + W_{\phi a} + k)$$

$$S_b(t) = \sqrt{W_{Pb}P_S} \cos(\omega_{RF}t + \phi_m(t) + W_{\phi b} + k)$$

$$S_c(t) = \sqrt{W_{Pc}P_S} \cos(\omega_{RF}t + \phi_m(t) + W_{\phi c} + k)$$

$$S_d(t) = \sqrt{W_{Pd}P_S} \cos(\omega_{RF}t + \phi_m(t) + W_{\phi d} + k)$$

(21)

In a variable directional array antenna of an adaptive control, it is important to add weights of amplitude and phase to the signals. Moreover, for the phase, a relative phase relation is important, and there is no problem even when a fixed phase component k is included.

The transmitted signals 90a to 90d are subjected to the weighting of amplitude and phase by the beam calculation circuit 16 of the control station 2, and a radiation pattern of the radio signal 91 radiated from the antenna elements 4a to 4d is controlled. When the transmitted signals 90a to 90d radiated from the antenna elements 4a to 4d of the base station 1 are combined in a subscriber's direction in the same phase, the radio signal 91 received by the subscriber is represented by equation (22).

$$S(t) = \sqrt{P_S'} \cos(\omega_s t + \phi_m(t) + k') \quad (22)$$

Character k' denotes a phase constant term including delay by propagation, and Ps' denotes a signal power with loss by propagation.

As described above, in the second embodiment, since the reference signal for the local oscillator output is common to both the base station local oscillator 6 and control station local oscillator 13, the constitution can be simplified, and mutual phase and signal intensity deviations of the local oscillator outputs can be eliminated.

Moreover, during transmission of the transmitted signal to the base station 1 from the control station 2, while the relative phase information and relative intensity information of the transmitted signal are maintained in principle, the transmitted signal can be transmitted to the base station 1 from the control station 2, so that it is unnecessary to dispose the constituting element for performing an active signal processing in the base station 1, the base station 1 can be miniaturized, and the simple constitution can enhance reliability.

In the second embodiment, the constitution of a down link for multiplexing the reference signal 80 with the sub-carrier multiplexing signal 87 and then transmitting it from the control station 2 to the base station 1 has been described. Even in the up link, the reference signal 80 may be multiplexed with the sub-carrier multiplexing signal in order to transmit from the base station 1 to the control station.

Third Embodiment

For the transmitter of the second embodiment, in order to minimize and simplify the constitution of the base station 1, the transmission weighting circuits (second weighting means) 43a to 43d are disposed on the control station 2 side. The transmitted signals 87a to 87d transmitted to the base station 1 side from the control station 2 side differ only in phase and amplitude, different from the received signals 71a to 71d propagated in the radio propagation line of the receiver and influenced by noise, phasing, and the like. Therefore, the constitutions of the weighting circuits 43a to 43d can be simplified.

On the other hand, when the weighting circuits 43a to 43d can be disposed on the base station 1 side, the intermediate frequency signal 85 and the weighting control signal from the beam calculation circuit 16 may be transmitted to the base station 1 side from the control station 2 side, and weighted on the base station 1 side to generate the transmitted signal.

In a third embodiment described hereinafter, the weighting circuits 43a to 43d of the transmitter are disposed on the base station 1 side.

Figure 12:
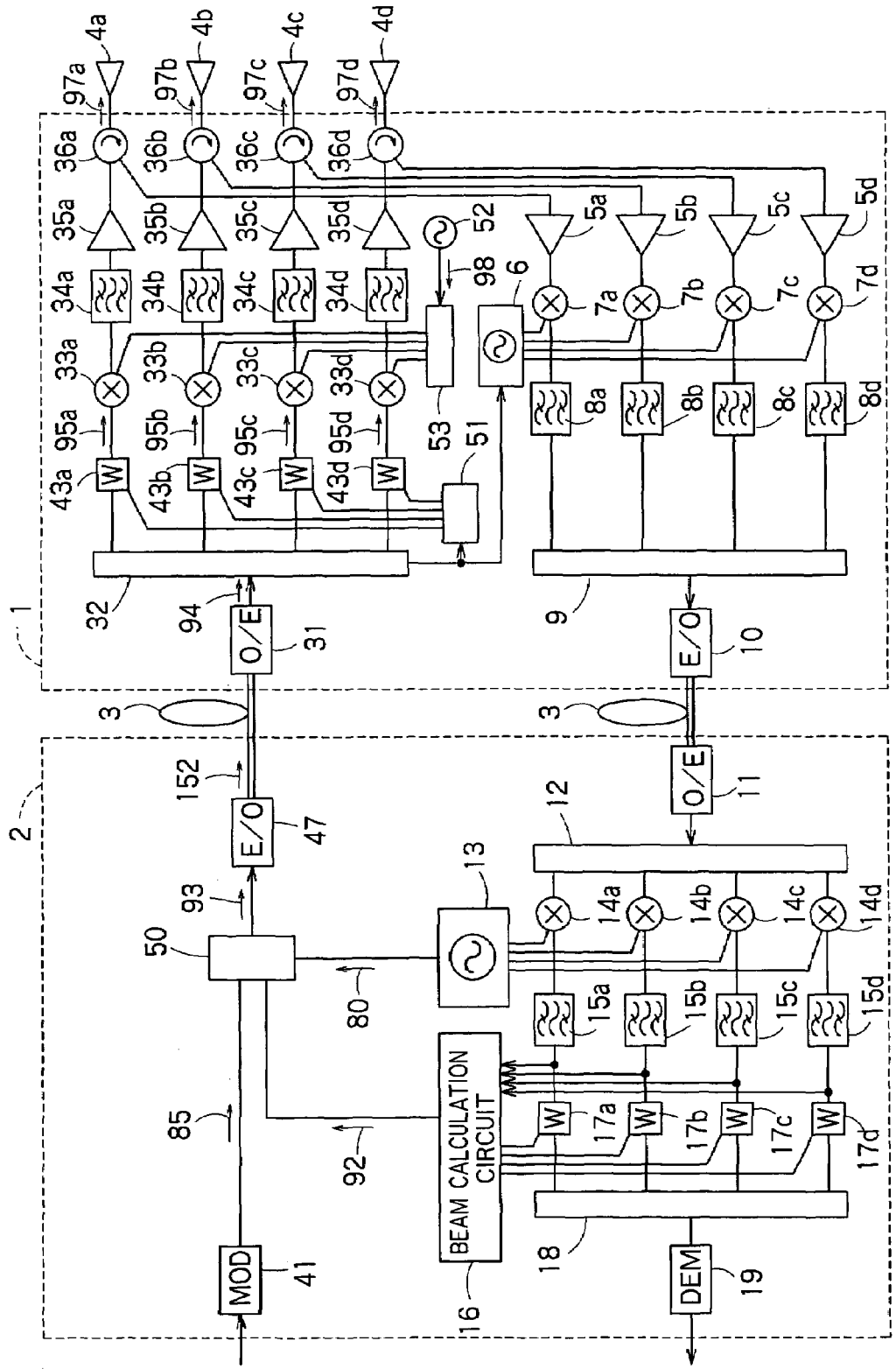
FIG. 12 is a block diagram of a third embodiment of the radio communication system according to the present invention.

FIG. 12 is a block diagram of the third embodiment of the radio communication system according to the present invention. The constitution of the receiver is similar to that of the first and second embodiments, and common constituting parts are denoted with the same reference numerals.

In addition to the constitution of FIG. 8, the base station 1 of FIG. 12 has weighting circuits 43a to 43d and a weight control circuit 51 for performing weight control. Moreover, the control station 2 of FIG. 12 is constituted by removing the weighting circuits 43a to 43d from the constitution of FIG. 8.

Similarly as the first embodiment, the beam calculation circuit 16 estimates the arrival direction of the radio signal 70 based on the phase and amplitude information of the received signals 71a to 71d included in the sub-carrier multiplexing signal 74 from the base station 1. From the estimated result, the radiation beam of the radio signal 91 transmitted to the subscriber from the base station 1 is controlled by the weighting circuits 43a to 43d disposed on the base station 1.

The beam calculation circuit 16 outputs a control signal 92 for controlling the weights of the weighting circuits 17a to 17d on the base station 1 side. An coupler 50 in the control station 2 superposes the weight control signal 92 and the reference signal 80 to the intermediate frequency signal 85 outputted from the modulator 41 similarly as the second embodiment, and outputs a transmitted signal 93.

The weight control signal 92 may take any form, but is typically a digital signal, or a signal obtained by converting the frequency of the digital signal to the predetermined frequency band. The electric/optical converter 47 converts the transmitted signal 93 to a optical signal 152, and transmits the optical signal to the base station 1 side via the optical fiber 3.

On the base station 1 side, the optical/electric converter 31 converts the transmitted optical signal 152 to a received signal 94. The received signal 94 is branched by the divider 32, and inputted to the lines to the antenna elements 4a to 4d, weight control circuit 51, and base station local oscillator 6.

The weight control circuit 51 controls the weighting circuits 43a to 43d based on the weight control signal 92, adds the weight to the amplitude and phase of the transmitted signal 85, and outputs intermediate frequency transmitted signals 95a to 95d.

A transmission side local oscillator 53 generates a base station LO signal 98 as a sinusoidal wave, distributes the signal by the number of antenna elements by a divider 12, and inputs the signals to the respective multipliers (fourth frequency conversion means) 33a to 33d. As not shown, for the base station LO signal 98, the base station LO signal may be generated based on the reference signal 80 as occasion demands.

The multipliers 33a to 33d multiply the intermediate frequency transmitted signals 95a to 95d outputted from the weight control circuit 51 by the base station LO signal 98, and converts up the frequency to the radio frequency band.

Outputs of the multipliers 33a to 33d are inputted to the band pass filters 34a to 34d, the desired band is extracted, and transmitted signals 97a to 97d are obtained via the power amplifiers 35a to 35d and circulators 36a to 36d. The transmitted signals 97a to 97d are inputted to the antenna elements 4a to 4d, and the radiation pattern is changed in accordance with the subscriber's position.

As described above, in the third embodiment, during generation of the transmitted signals to the antenna elements 4a to 4d, since the respective transmitted signals are weighted on the base station 1 side, the transmitted signal 85 transmitted to the base station 1 from the control station 2 may be of one type, and the constitution on the base station 1 side can be simplified.

Moreover, since the frequency band of the base station LO signal 98 is common to the respective antenna elements 4a to 4d, the base station local oscillator 52 may simply branch the reference signal, and the constitution of the base station local oscillator 52 can be simplified. Furthermore, weighting is performed in the vicinity of the antenna elements 4a to 4d, and this prevents a disadvantage that the phase and signal intensity fluctuate by propagation along the transmission path after the weighting.

Fourth Embodiment

In a fourth embodiment, instead of performing the optical transmission by subjecting the transmitted signals from the respective antenna elements or the received signals of the respective antenna elements to sub-carrier wave multiplexing, the signal transmission is performed by a spread spectrum multiplex system.

Figure 13:
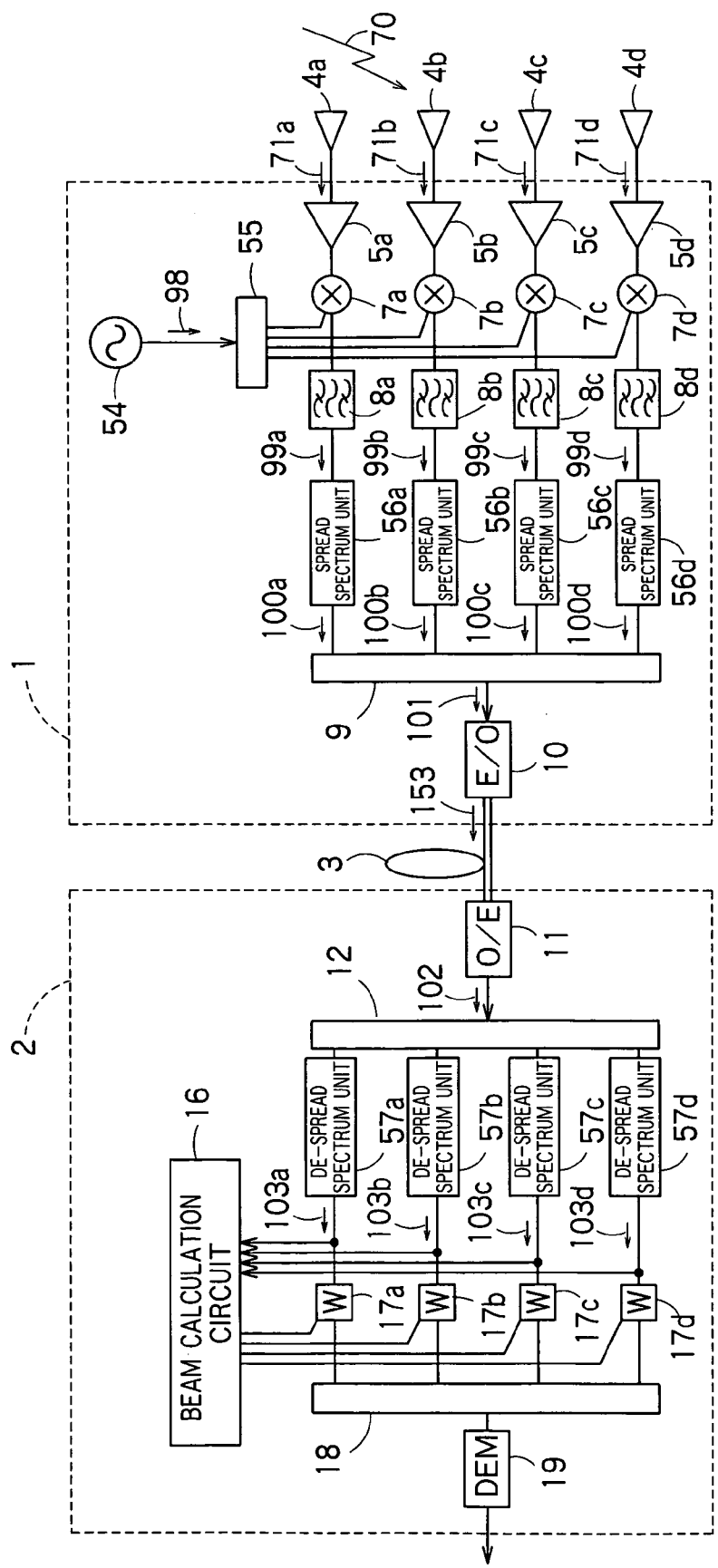
FIG. 13 is a block diagram showing a fourth embodiment of the radio communication system according to the present invention.

FIG. 13 is a block diagram showing a constitution of the fourth embodiment of the radio communication system according to the present invention. In FIG. 13, constituting parts common to the first to third embodiments are denoted by the same reference numerals.

Figure 1:
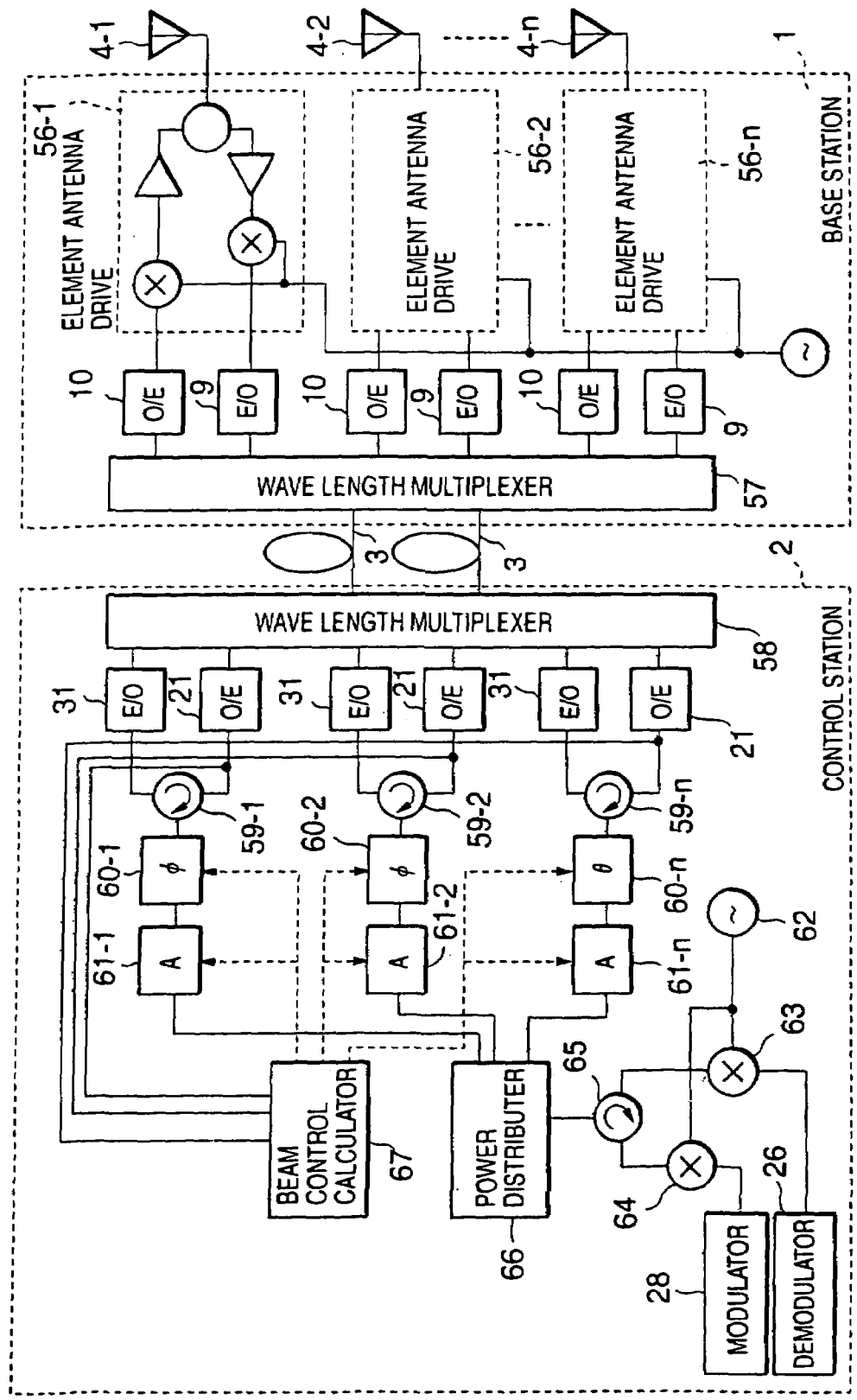
FIG. 1 is a block diagram schematically showing a radio communication system utilizing an ROF technique.
Figure 2:
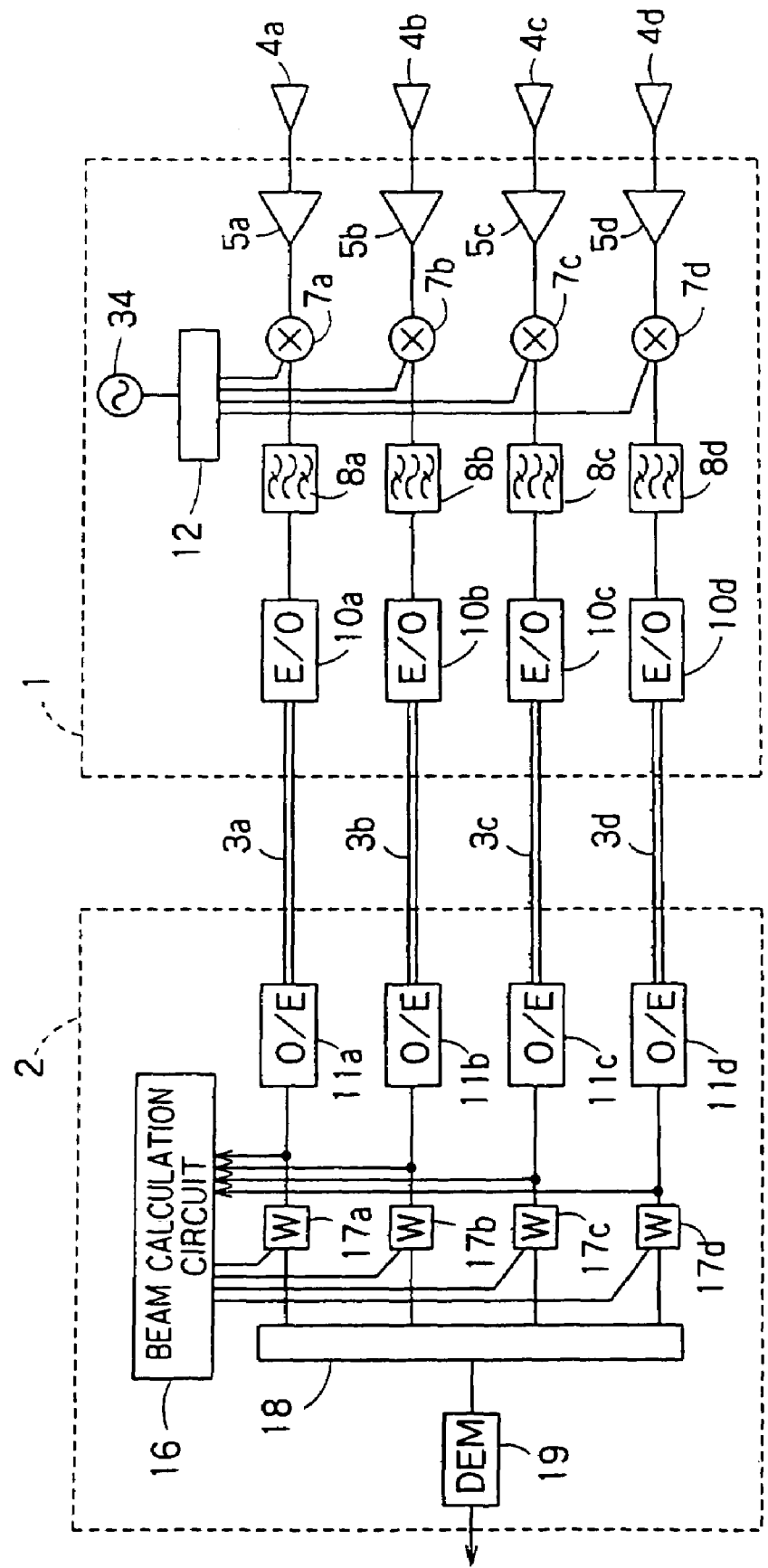
FIG. 2 is a block diagram schematically showing a radio communication system utilizing the ROF technique.

The base station 1 of FIG. 13 is constituted by newly adding, to the base station 1 of FIG. 1, spread spectrum units (first spread spectrum multiple signal generation means) 56a to 56d for performing spread spectrum for the received signals 71a to 71d received at the antenna elements 4a to 4d.

Moreover, the control station 2 of FIG. 13 is provided with de-spread spectrum units (reverse diffusion means) 57a to 57d for performing de-spread spectrum, instead of the multipliers 14a to 14d and band pass filters 15a to 15d in the control station 2 of FIG. 1.

An operation of the radio communication system of FIG. 13 will next be described. The base station 1 receives the radio signal 70 from the subscriber (not shown) via the array antennas 4a to 4d. The received signals 71a to 71d received by the respective antenna elements 4a to 4d are represented by the equation (1) similarly as the first embodiment.

The respective received signals 71a to 71d differ in phase and amplitude in accordance with the arrival direction of the radio signal 70. The received signals 71a to 71d passing through the low noise amplifiers 5a to 5d are multiplied by a base station LO signal 98 outputted and branched by a base station local oscillator 54 in the multipliers 7a to 7d, and subjected to the frequency down conversion.

Received signals 99a to 99d subjected to the frequency down conversion are subjected to spread spectrum by the spread spectrum units 56a to 56d. In the spread spectrum units 56a to 56d, different spreading codes are allotted to the respective antenna element lines. Rectangular codes such as Walsh code are preferable for the diffusion code. The spread spectrum signals 99a to 99d outputted from the spread spectrum units 56a to 56d are multiplexed by the coupler 9, and a spread spectrum multiple signal 100 is obtained.

Figure 14A:
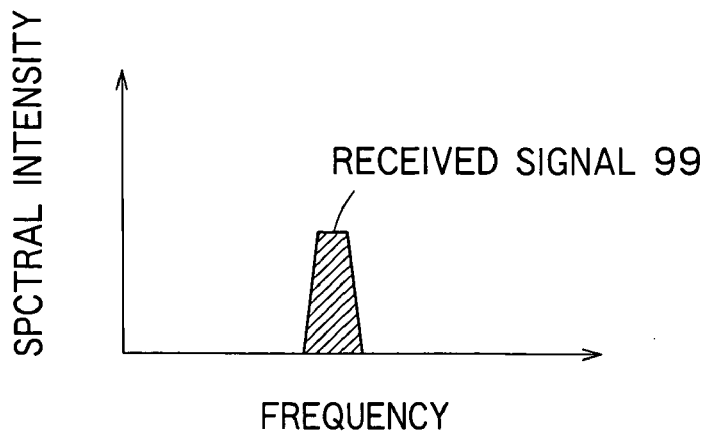
FIG. 14A is a frequency spectrum diagram of the received signal.
Figure 14B:
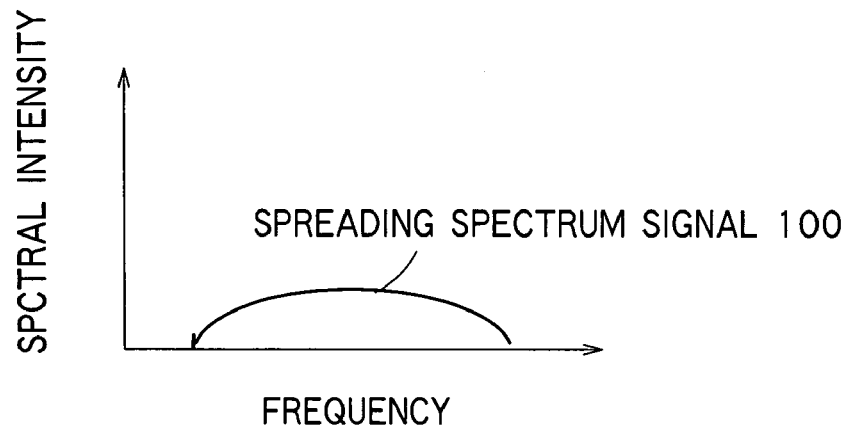
FIG. 14B is a frequency spectrum diagram of a spread spectrum signal.
Figure 14C:
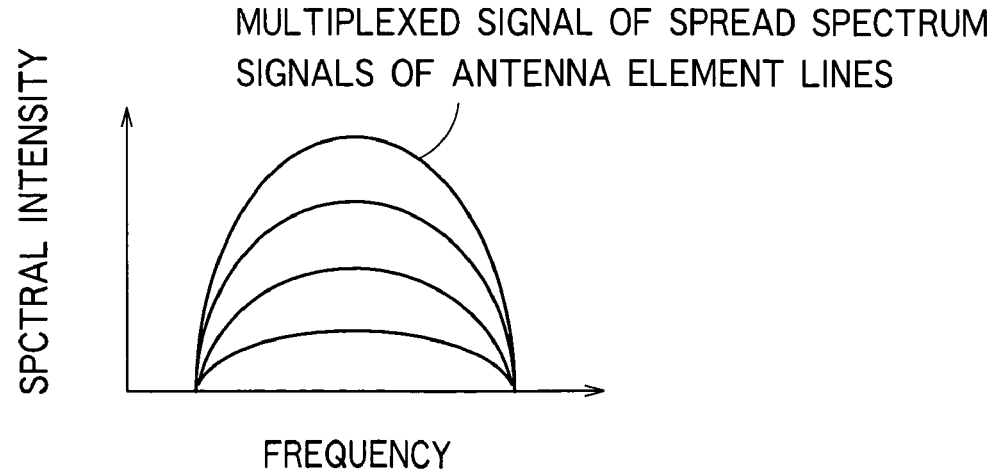
FIG. 14C is a frequency spectrum diagram of a spread spectrum multiple signal.

FIG. 14A is a frequency spectrum diagram of the received signal 99, FIG. 14B is a frequency spectrum diagram of the spread spectrum signal 100, and FIG. 14C is a frequency spectrum diagram of a spread spectrum multiple signal 101. The spread spectrum multiple signal 101 is converted to a optical signal 153 by the electric/optical converter 10, and transmitted to the control station 2 via the optical fiber 3.

The optical/electric converter 11 of the control station 2 converts the optical signal 153 to an electric signal 102. The electric signal 102 is distributed by the number of antenna elements by the divider 12, and the respective signals are inputted to the de-spread spectrum units 57a to 57d. The de-spread spectrum units 57a to 57d perform a signal processing of de-spread spectrum with the same spreading codes as the spreading codes allotted to the respective antenna element lines on the base station 1 side. Received signals 103a to 103d as outputs of the de-spread spectrum units 57a to 57d maintain relative phase information $\phi_a$ to $\phi_d$ and relative intensity information $P_a$ to $P_d$ of the received signals 71a to 71d in the base station 1.

A part of the output signals 103a to 103d of the de-spread spectrum units 33a to 33d is inputted to the beam calculation circuit 16 in order to give the relative phase information $\phi_a$ to $\phi_d$ and the relative intensity information $P_a$ to $P_d$. That is, the beam calculation circuit 16 calculates the arrival direction of the radio signal 70 in the base station 1 based on the relative phase information $\phi_a$ to $\phi_d$ and relative intensity information $P_a$ to $P_d$.

Moreover, the output signals 103a to 103d of the de-spread spectrum units 57a to 57d are inputted to the weighting circuits 17a to 17d, weighted in phase and amplitude by the weight control signal from the beam calculation circuit 16, and subsequently multiplexed by the multiplexer 18 to form the received signal 78.

The beam calculation circuit 16 restrains the unnecessary wave and interference wave with respect to the received signal 78 outputted from the multiplexer 18, and performs weighting control of the weighting circuits 17a to 17d so that the signal-to-interference ratio (SIR) is optimized. The received signal 78 is inputted to the demodulator 19, and the information from the subscriber is extracted.

FIG. 15A is a block diagram showing a detailed constitution of the spread spectrum unit 56, and FIG. 15B is a block diagram showing a detailed constitution of the de-spread spectrum unit 57. As shown in the drawings, the spread spectrum unit 56 and de-spread spectrum unit 57 are substantially similarly constituted, and perform multiplication of the input signal by the diffusion code.

The spread spectrum unit 56 has a multiplier 59 for multiplying the received signal passing through the band pass filters 8a to 8d by a diffusion code 104 from a diffusion code generator 58, and a band pass filter 60 for extracting a desired band signal from an output of the multiplier 59. The signal extracted by the band pass filter 60 forms the spread spectrum signal 100.

On the other hand, the de-spread spectrum unit 57 has a multiplier 62 for multiplying a reverse diffusion code 105 which is the same as the diffusion code 104 by the received signal 102 outputted from the divider 12, and a band pass filter 63 for extracting a desired band from an output of the multiplier 62. The received signal 102 is subjected to de-spread spectrum by the multiplication of the multiplier 63.

When the codes used to the spreading code 104 and the spreading code 105 keep orthogonality for the respective antenna lines, and adequately keep both the codes synchronization, the output of the signal subjected to the spread spectrum with other spreading code becomes zero, and only the desired signal is outputted from the band pass 63.

As described above, for the lines of all the antenna elements 4a to 4d, since transmission is performed in the same frequency band, a delay amount is equal and the relative phase difference is kept. Furthermore, since the relative intensity difference is also kept, on the control station 2 side, the arrival direction of the radio signal 70 can accurately be estimated.

Moreover, with the spread spectrum multiplex system as shown in FIG. 13, different from the sub-carrier wave multiplexing, it is unnecessary to dispose the local oscillators corresponding to the number of antenna elements in the base station 1, and one type of local oscillator may only be disposed.

On the other hand, different spreading codes are necessary for the number of antenna elements, but the diffusion code has a fixed pattern, and the code may be stored in a memory and the like. Therefore, the constitution of the entire base station can be miniaturized.

In order to enhance a multiplex efficiency by spread spectrum with respect to all the antenna elements 4a to 4d, preferably the received signals 71a to 71d do not have a large intensity difference. It is difficult to obtain such condition in mobile communication, but the condition is easily satisfied in high-speed radio communication such as wireless local loop (WLL). In the WLL, the subscriber and base station 1 are disposed so that waves can directly be transmitted/received, waves can directly be seen through, and the received signals 71a to 71d received by the respective antenna elements 4a to 4d have substantially equal power. Therefore, the powers of the spread spectrum signals are equal, and a high diffusion multiplex efficiency can be kept with respect to all the antenna element lines.

Fifth Embodiment

In a fifth embodiment, by adding a transmitter to the fourth embodiment, the spread spectrum multiplex system is also applied to the added transmitter.

Figure 16:
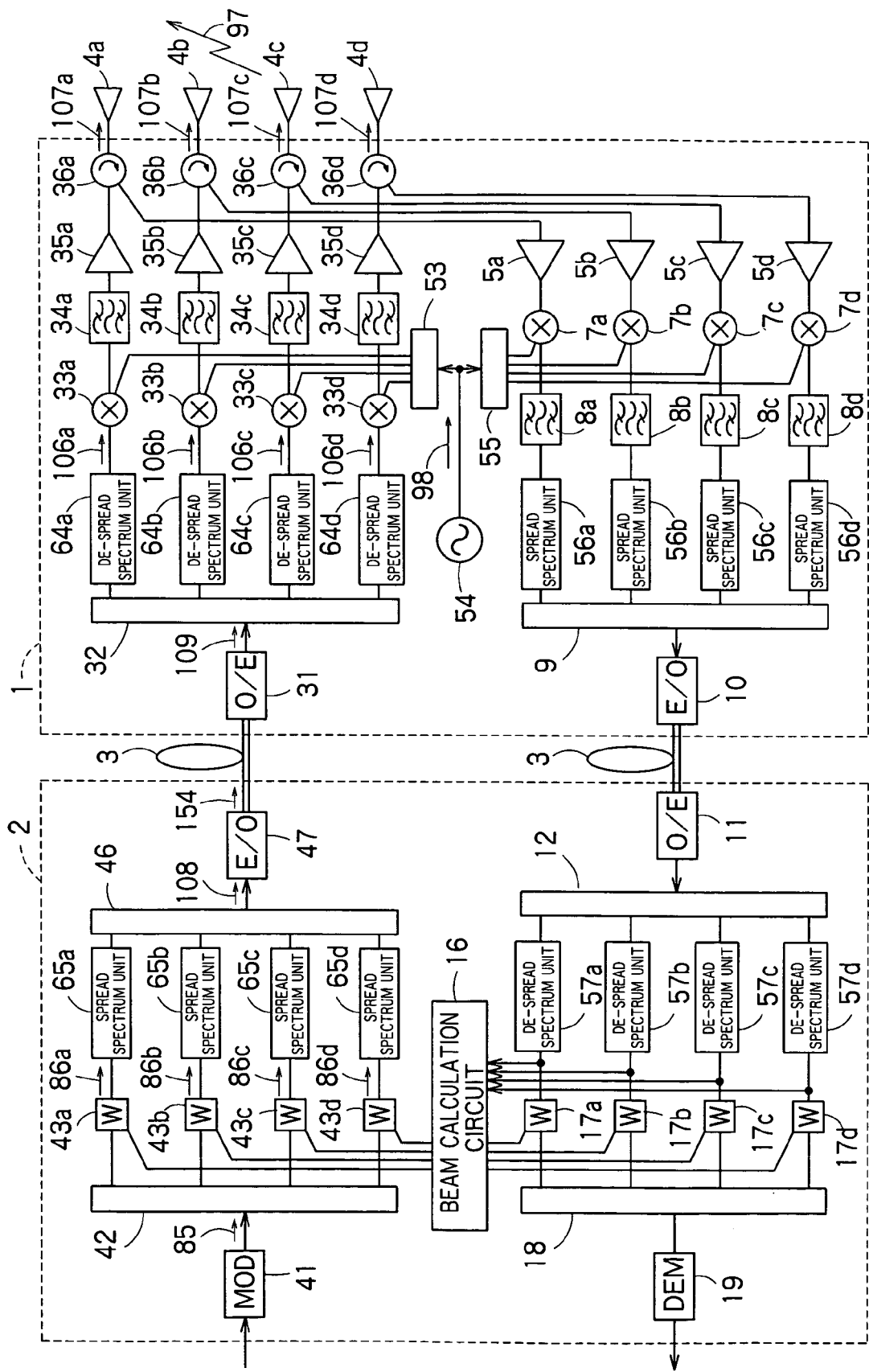
FIG. 16 is a block diagram of a fifth embodiment of the radio communication system according to the present invention.

FIG. 16 is a block diagram of a fifth embodiment of the radio communication system according to the present invention. In FIG. 16, the constituting parts common to FIG. 13 are denoted with the same reference numerals, and different respects will mainly be described hereinafter.

In the base station 1 of FIG. 16, as the transmitter constitution, the optical/electric converter 31, divider 32, de-spread spectrum units 64a to 64d, multipliers (second frequency conversion means) 33a to 33d, power amplifiers 35a to 35d, and circulators 36a to 36d are disposed.

Moreover, in the control station 2 of FIG. 16, as the transmitter constitution, the modulator 41, distributor 42, weighting circuits (second weighting means) 43a to 43d, spread spectrum units 65a to 65d, coupler (addition means) 46, and electric/optical converter 47 are disposed.

The beam calculation circuit 16 calculates the radiation pattern of the radio signal 91 to the subscriber from the base station 1 from the relative phase difference and relative intensity difference of the de-spread spectrum signals 103a to 103d corresponding to received signals 107a to 107d of the base station 1.

The weighting circuits 17a to 17d on the transmitter side add the weight to the phase and intensity of the intermediate frequency signal 85 distributed by the number of antenna elements, and control the radiation pattern. The transmitted signals 86a to 86d with the weights added thereto are subjected to spread spectrum by the spread spectrum units 65a to 65d, and subsequently multiplexed by the coupler 46, and a spread spectrum multiple signal 108 is obtained.

The spread spectrum multiple signal 108 is converted to a optical signal 154 in the electric/optical converter 47, and transmitted to the base station 1 via the optical fiber 3. On the base station 1 side, the optical/electric converter 31 such as PD converts the optical signal 154 to a received signal 109 as the electric signal.

The received signal 109 is branched by the divider 32, and inputted to the respective de-spread spectrum units 64a to 64d. The de-spread spectrum units 64a to 64d use the same reverse spreading codes as those used in the spread spectrum units 65a to 65d to perform de-spread spectrum. The multipliers 33a to 33d convert up the frequency of the signal subjected to the de-spread spectrum to the radio band frequency based on the base station LO signal 98 from the base station local oscillator 54.

Outputs of the multipliers 33a to 33d are inputted to the band pass filters 34a to 34d, and the desired band is extracted. Thereafter, the transmitted signals 107a to 107d to be supplied to the respective antenna elements are obtained via the power amplifiers 35a to 35d and circulators 36a to 36d. Since the transmitted signals 107a to 107d are weighted in amplitude and phase by the beam calculation circuit 16 of the control station 2, the radiation pattern of the radio signal 97 radiated from the antenna elements 4a to 4d is controlled.

As described above, in the fifth embodiment, also during transmission of the transmitted signals to the antenna elements 4a to 4d, since the signal transmission is performed in the spread spectrum multiplex system, constitutions of the transmitter of the control station and the base station can be simplified.

Sixth Embodiment

In a sixth embodiment, similarly as the third embodiment, the transmitter weighting circuits 17a to 17d are disposed on the base station 1 side.

Figure 17:
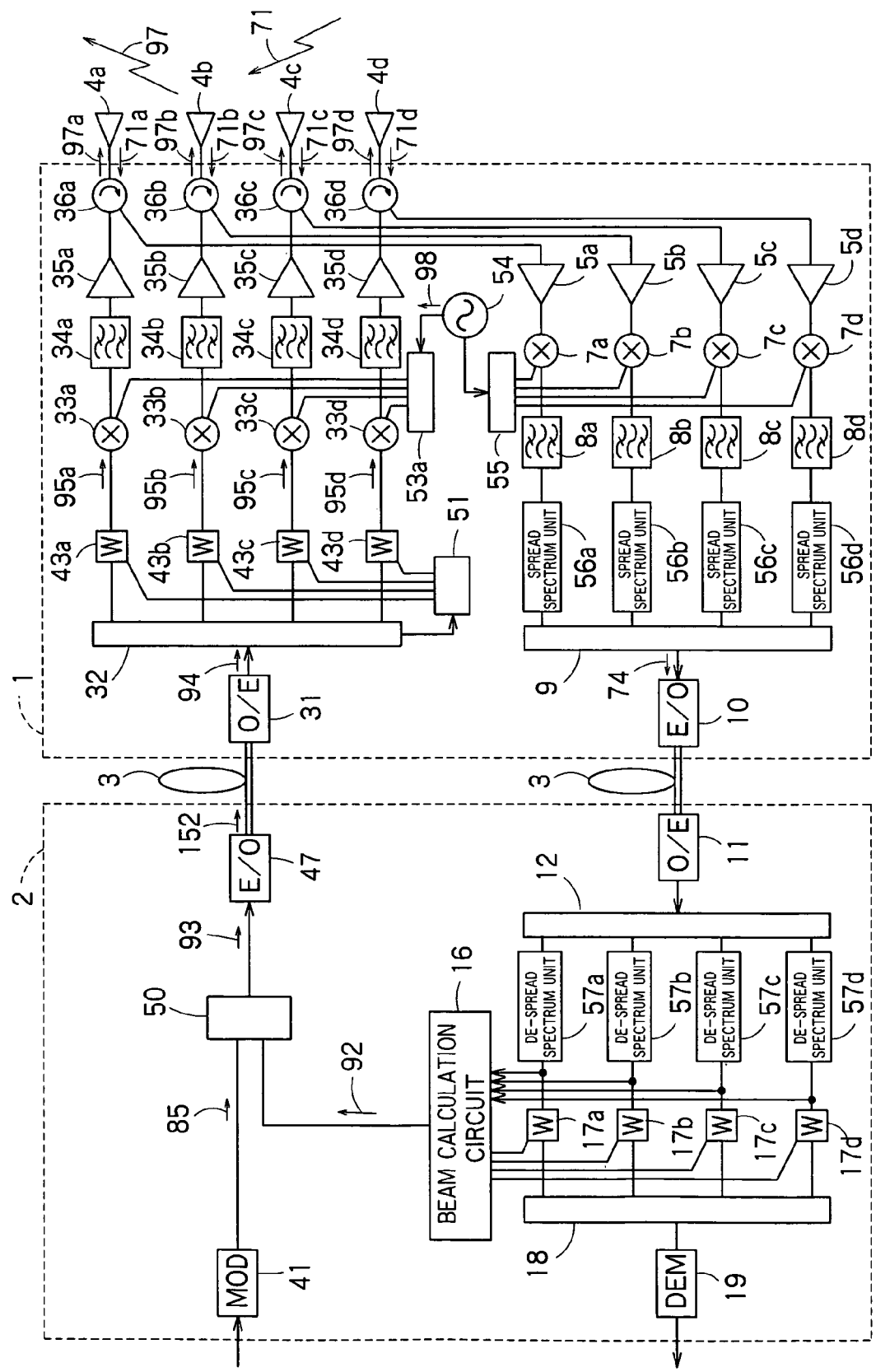
FIG. 17 is a block diagram of a sixth embodiment of the radio communication system according to the present invention.

FIG. 17 is a block diagram of the sixth embodiment of the radio communication system according to the present invention. The receiver constitution of the sixth embodiment is the same as those of the fourth and fifth embodiments, and the same reference numerals are used.

In addition to the constitution of FIG. 16, the base station 1 of FIG. 17 has the weighting circuits 43a to 43d and weight control circuit 51 for performing the weight control. Moreover, the control station 2 of FIG. 17 is constituted by removing the weighting circuits 43a to 43d from the constitution of FIG. 16.

Similarly as the fourth embodiment, the beam calculation circuit 16 estimates the arrival direction of the radio signal 70 based on the phase and amplitude information of the received signals 71a to 71d included in the spread spectrum multiple signal 74 from the base station 1. From the estimated result, the radiation beam of the radio signal 91 transmitted to the subscriber from the base station 1 is controlled by the weighting circuits 43a to 43d disposed on the base station 1. The beam calculation circuit 16 outputs the control signal 92 for controlling the weights of the weighting circuits 43a to 43d on the base station 1 side.

The coupler 50 superposes the weight control signal 92 to the intermediate frequency signal 85 outputted from the modulator 41, and generates the transmitted signal 93. The weight control signal 92 may take any form, but is typically a digital signal, or a signal obtained by converting the frequency of the digital signal to the predetermined frequency band.

The electric/optical converter 47 converts the transmitted signal 93 to the optical signal 152, and transmits the optical signal to the base station 1 side via the optical fiber 3. On the base station 1 side, the optical/electric converter 31 converts the transmitted optical signal 152 to the received signal 94. The received signal 94 is branched by the divider 12, and inputted to the lines to the antenna elements 4a to 4d, and weight control circuit 51.

The weight control circuit 51 controls the weighting circuits 43a to 43d based on the weight control signal 92, adds the weight to the amplitude and phase of the transmitted signal 85, and generates the intermediate frequency transmitted signals 95a to 95d. The transmission side local oscillator 54 generates the base station LO signal 98 as the sinusoidal wave, distributes the signal by the number of antenna elements by a distributor 53a in order to input the signals to the respective multipliers 33a to 33d.

The multipliers 33a to 33d multiply the intermediate frequency transmitted signals 95a to 95d by the base station LO signal 98, and convert the frequency. The outputs of the multipliers 33a to 33d are inputted to the band pass filters 34a to 34d, the desired band is extracted, and the transmitted signals 97a to 97d are obtained via the power amplifiers 35a to 35d and circulators 36a to 36d. The transmitted signals 97a to 97d are inputted to the antenna elements 4a to 4d, and the radiation pattern of the descendent radio signal 97 is changed in accordance with the subscriber's position.

Seventh Embodiment

In the aforementioned first to sixth embodiments, it is assumed that the phase condition of the equation (14) is satisfied with respect to the phase condition of the equations (7) and (20), but even when the condition of the equation (14) is not satisfied, the added phase difference can be set to zero in another method.

For example, the method may have inserting a phase shifter into some place in the line between each antenna element and the weighting circuit, or between the local oscillator and the multiplier of the control station or base station, applying a phase offset to the transmitted signal or the received signal by the inserted phase shifter, and maintaining the relative phase difference between the antenna element lines.

Figure 18:
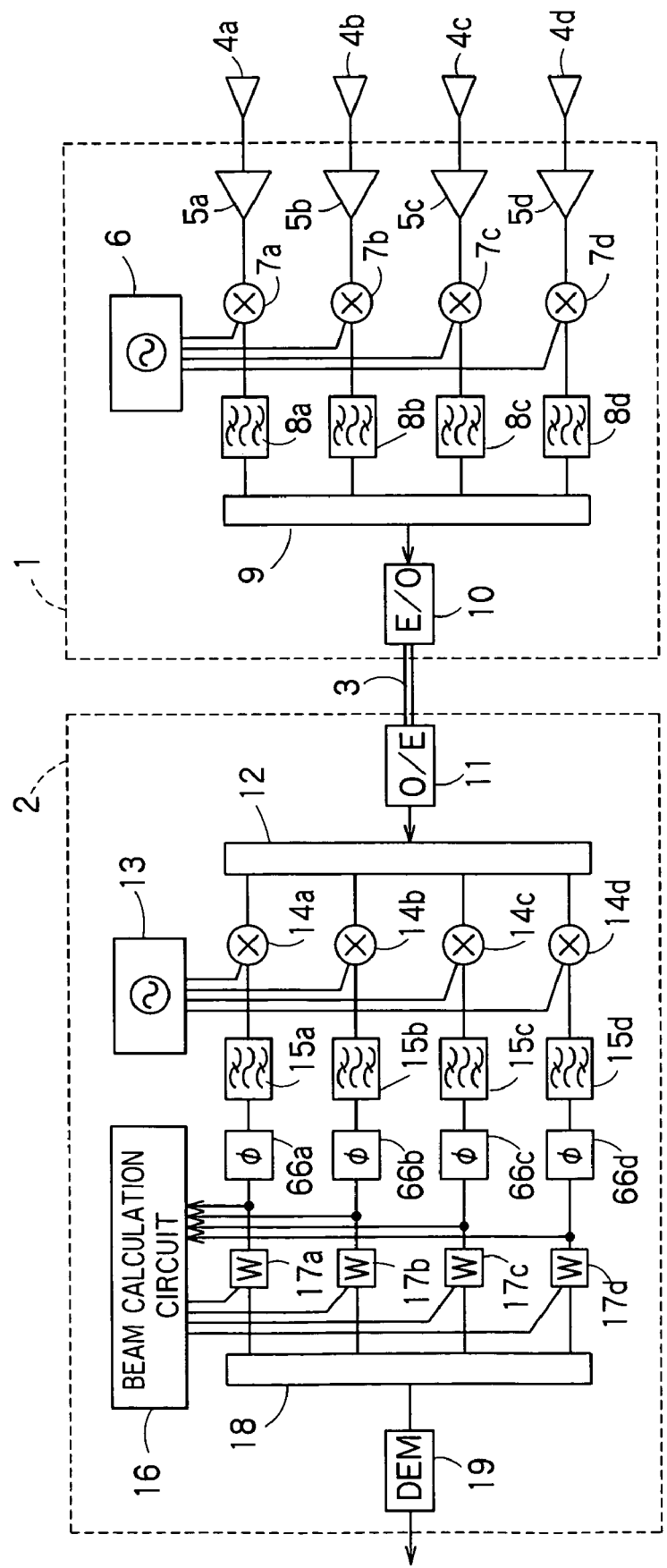
FIG. 18 is a block diagram of a seventh embodiment of the radio communication system according to the present invention.

FIG. 18 is a block diagram of a seventh embodiment of the radio communication system according to the present invention, and shows an example in which phase shifters (phase compensation means) 66a to 66d are disposed for the respective antenna elements 4a to 4d. The control station 2 of FIG. 18 is constituted similarly as FIG. 1 except that the phase shifters 66a to 66d are disposed between the band pass filters 15a to 15d and the weighting circuits 17a to 17d.

By disposing the phase shifters 66a to 66d of FIG. 18, the delay amount of the propagation line of each of the antenna elements 4a to 4d can be compensated, and the respective antenna elements 4a to 4d maintain the received relative phase difference while the signal can be transmitted to the control station 2 from the base station 1.

Additionally, instead of disposing the phase shifters 66a to 66d as shown in FIG. 18, delay and phase differences among the lines of the respective antenna elements 4a to 4d may be added as offsets to the phase weight in the weighting circuits 17a to 17d.

In the actual radio communication system, the delay and phase differences by individual differences are added to micro components such as the amplifier, filter and multiplier. When the delay and phase differences are also taken as the phase offsets into the compensation amounts to the phase shifters 66a to 66d, or the phase weight amounts in the weighting circuits 17a to 17d as described above, it is possible to provide the radio communication system with a higher reliability.

For the relation in frequency of the radio signal, intermediate frequency signal, and LO signal, the equation (6) is used in the first embodiment, the equation (19) is used in the second embodiment, but equation (6a) may be used instead of the equation (6), and equation (19a) may be used instead of the equation (19).

$$\omega_{IF}=\omega_{RF}-\omega_{1a}+\omega_{2a}=\omega_{RF}-\omega_{1b}+\omega_{2b}=\omega_{RF}-\omega_{1c}+\omega_{2c}=\omega_{RF}-\omega_{1d}+\omega_{2d} \quad (6a)$$

$$\omega_{RF}=\omega_{IF}+\omega_{1a}-\omega_{2a}=\omega_{IF}+\omega_{1b}-\omega_{2b}=\omega_{IF}+\omega_{1c}-\omega_{2c}=\omega_{IF}+\omega_{1d}-\omega_{2d} \quad (19a)$$

Specifically, either of plus and minus symbols of the frequencies of the radio signal, intermediate frequency signal, and LO signal may be selected.

In the aforementioned second and third embodiments, an example has been described in which the same base station LO signals 72a to 72d and control station LO signals 76a to 76d are used with respect to the frequency conversion of the reception and transmitted signals in the antennas 4a to 4d. However, for the transmission or received signal system frequency conversion, local oscillators for outputting different LO signals may be disposed on the control station 2 and base station 1.

In the aforementioned embodiments, the intermediate frequency radio signal is weighted, but the LO signal as the output of the local oscillator 6, 13 may be weighted. Additionally, during weighting in the LO signal, since the LO signal frequency differs with each antenna element line in the sub-carrier wave multiplex optical transmission of the first to third embodiments, it is preferable to perform weighting on the state of converting the frequency of the LO signal to the phase. Moreover, in the third and sixth embodiments, the weighting may be performed for the transmitted signal or the received signal of the radio frequency band such as a front stage part of the power amplifiers 35a to 35d or a later stage part of the low noise amplifiers 5a to 5d.

In the aforementioned embodiments, the weighting circuit for controlling the phase and amplitude has been described as an analog signal processing with respect to the radio signal subjected to frequency conversion, but a digital signal processing may be performed.

That is, in the receiver, the received signal is analog/digital converted, and inputted to the weighting circuit as the digital signal. Moreover, the transmitter may be constituted so that the output of the weighting circuit as the digital signal processing is digital/analog converted, and transmitted as the analog signal to the base station side.

The signal synthesis method of the adaptive antenna is diversified. In the present embodiment, the method of performing demodulation after signal synthesis has been described, but the signal synthesis may be performed by another method, for example, of performing delay wave detection before the signal synthesis.

Moreover, in the present embodiment, the transmission path has been described as the optical fiber. However, when a transmission distance is not long, a coaxial cable may be used. In this case, the electric/optical converter and optical/electric converter are unnecessary.

Moreover, the electric/optical conversion method of the electric/optical converter in the control station 2 or the base station 1 includes a method of directly modulating laser and a method of using an external optical modulator to perform modulation. Furthermore, $\omega_{RF}$ used in ITS or WLL to which the adaptive antenna is expected to be applied is in a high frequency band such as 5.8 GHz and 22 GHz.

The band in which direct modulation is possible with a semiconductor laser is of several GHz at most, and the external optical modulator is therefore used in the method of directly converting the high frequency band. However, different from the electric circuit which can be miniaturized by IC formation even with the increase of the circuit elements, the optical circuit cannot be miniaturized. Therefore, the use of the external optical modulator requires a component space, complicates the constitution, and raises cost. In the present embodiment, the intermediate frequency radio signal is subjected to sub-carrier wave multiplexing and optically transmitted in the constitution, the laser direct modulation method can be employed, and the optical transmitter can be simplified in constitution and reduced in cost.

Eighth Embodiment

In an eighth embodiment, during transmission of an antenna transmitted signal to the base station from the control station, the local oscillator output is multiplexed with the antenna transmitted signal and transmitted.

Figure 19:
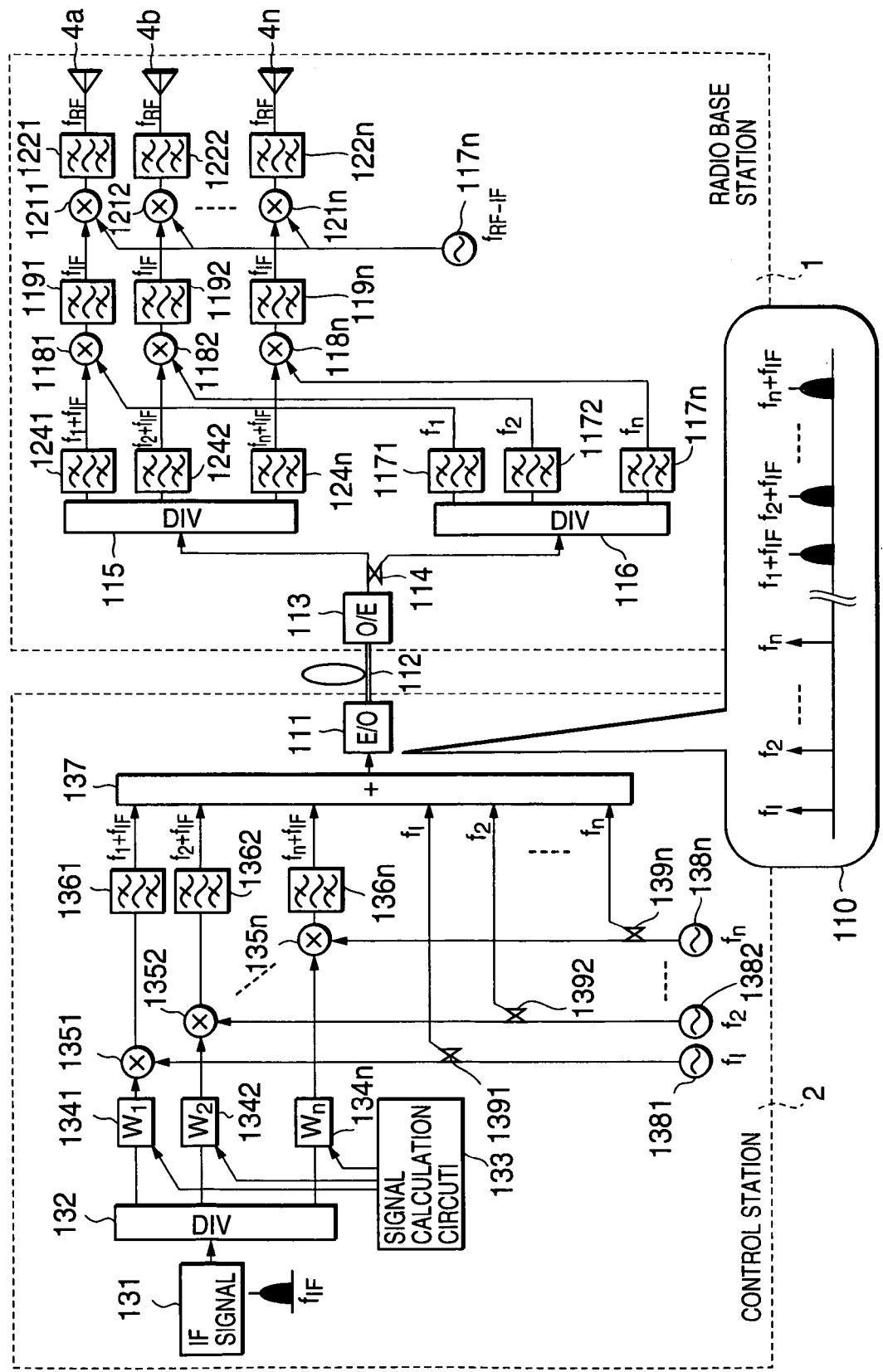
FIG. 19 is a block diagram of an eighth embodiment of the radio communication system according to the present invention.

FIG. 19 is a block diagram of an eighth embodiment of the radio communication system according to the present invention, and shows only the constitution of the transmitter for transmitting the antenna transmitted signal to the base station 1 from the control station 2.

The control station 2 of FIG. 19 has an IF signal generation circuit 131 for generating an intermediate frequency signal (IF signal) for antenna transmission, a distributor 132 for performing branching to provide the same number of IF signals as the number of antenna elements, a signal calculation circuit 133 for calculating a weight coefficient to obtain a desired antenna radiation pattern, local oscillation circuits 138₁ to 138n, couplers 139₁ to 139n for branching the local oscillator output from the local oscillation circuits, weighting circuits 134₁ to 134n for weighting the respective signals branched by the distributor 132 with the weighting coefficient; mixers 135₁ to 135n for converting the frequency of the weighted signals by the local oscillator output branched by the couplers 139₁ to 139n, band pass filters 136₁ to 136n for extracting only the predetermined frequency component, a coupler 137 for multiplexing the extracted frequency component and the other local oscillator output branched by the coupler, and an optical/electric converter 111 for converting the multiplexed signal to the optical signal and transmitting the signal to an optical fiber 112.

The local oscillation circuits 138₁ to 138n output the local oscillator outputs of frequencies f1, f2 to fn, respectively. The band pass filters 136₁ to 136n extract only the signal components of frequencies $(f_1+f_{IF})$, $(f_2+f_{IF})$, ..., $(f_n+f_{IF})$. Here, $f_{IF}$ is a frequency of the IF signal.

The signal multiplexed by the coupler 137 has frequency component shown by a code 110.

The base station 1 of FIG. 19 has an optical/electric converter 113 for converting the optical signal transmitted from the control station 2 via the optical fiber to the electric signal; a coupler 114 for branching a part of the electric signal; distributors 115, 116 for distributing the electric signal to provide the same number of signals as the number of antenna elements, band pass filters $124_1$ to $124n$ for extracting only the signal components of frequencies $(f_1+f_{IF})$, $(f_2+f_{IF})$, ..., $(f_n+f_{IF})$ from outputs of the distributor 115, respectively, band pass filters $117_1$ to $117_n$ for extracting only the local oscillator output components from the outputs of the distributor 116, mixers $118_1$ to $118_n$ for combining the signals extracted by the band pass filters $124_1$ to $124_n$, $117_1$ to $117_n$, band pass filters $119_1$ to $119_n$ for extracting only intermediate frequency components $f_{IF}$, mixers $121_1$ to $121_n$ for combining the signals extracted by the band pass filters $119_1$ to $119_n$ with a local oscillator output $f_{RF-IF}$ outputted from a local oscillation circuit 120, band pass filters $122_1$ to $122_n$ for extracting only antenna transmitted signal components, and antennas $4_1$ to $4_n$.

In the radio communication system of FIG. 19, during generation of a frequency multiple signal for antenna transmission inside the control station 2, since the local oscillator output is also combined, multiplexed, and then transmitted to the base station 1, the number of local oscillation circuits disposed inside the base station 1 can be reduced, and the constitution of the base station 1 can be simplified.

Figure 20:
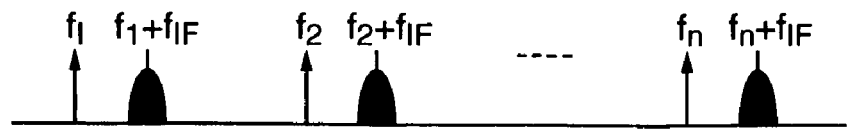
FIG. 20 is a frequency spectrum diagram of respective signals inputted to the coupler in the control station.

Additionally, when the frequencies of the respective signals inputted to the coupler in the control station 2 are arranged in order of $f_1$, $(f_1+f_{IF})$, $f_2$, $(f_2+f_{IF})$, ..., $f_n$, $(f_n+f_{IF})$ as shown in FIG. 20.

Figure 21:
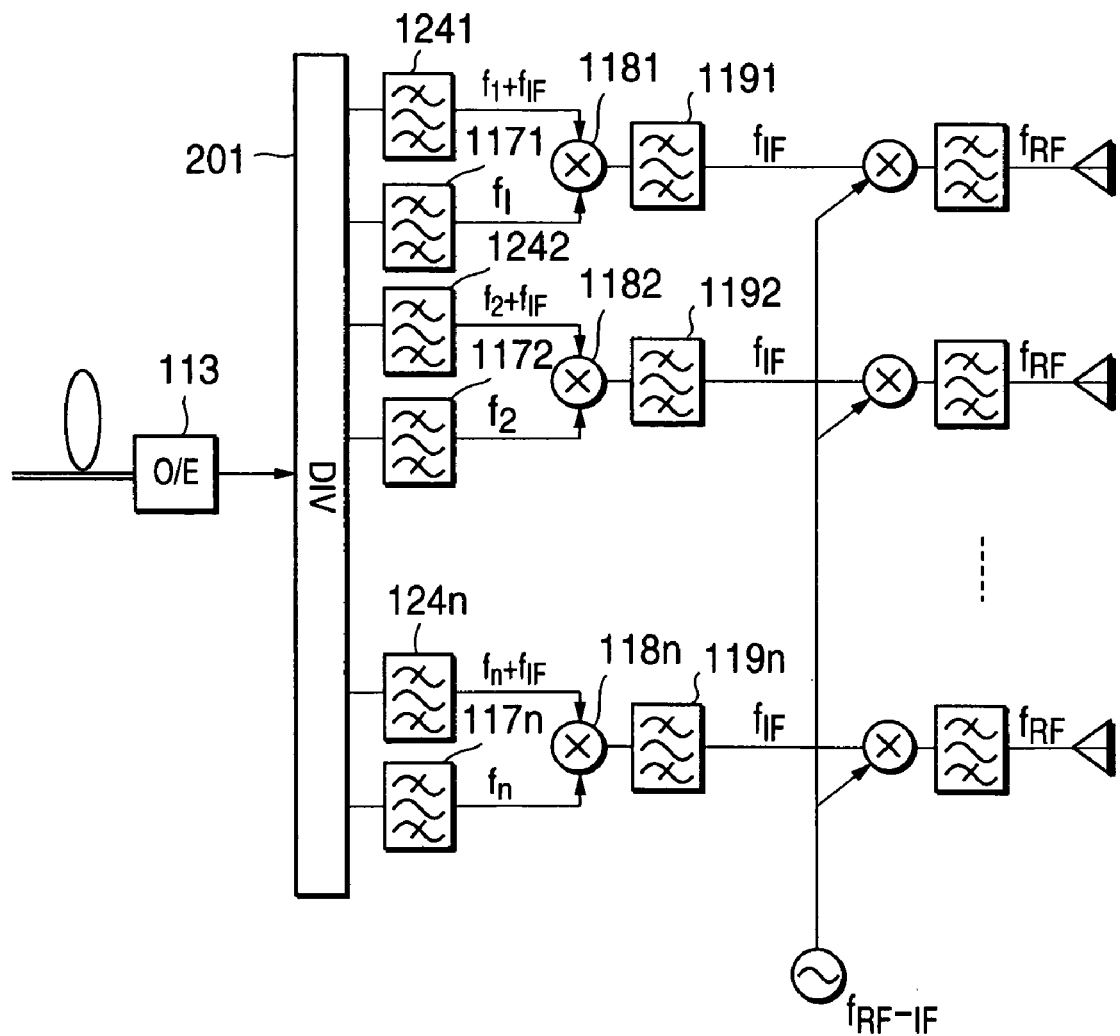
FIG. 21 is a diagram showing a connection relation of a distributor and a band pass filter in the base station.

A connection relation of the distributors 115, 116 in the base station 1 and band pass filters $124_1$ to $124_n$, $117_1$ to $117_n$ may be set as shown in FIG. 21.

A distributor 201 of FIG. 21 is connected to the band pass filter $124_1$ for extracting the signal of frequency $(f_1+f_{IF})$, band pass filter $117_1$ for extracting the signal of frequency $f_1$, band pass filter $124_2$ for extracting the signal of frequency $(f_2+f_{IF})$, band pass filter $117_2$ for extracting the signal of frequency $f_2$, ..., band pass filter $124_n$ for extracting the signal of frequency $(f_n+f_{IF})$, and band pass filter $117_n$ for extracting the signal of frequency $f_n$.

By the constitution of FIG. 21, the number of distributors can be reduced as compared with FIG. 19, and no coupler is necessary.

Ninth Embodiment

A ninth embodiment is a modification example of the eighth embodiment, and a signal obtained by multiplexing the frequency of RF signal in the control station 2 is transmitted to the base station 1.

Figure 22:
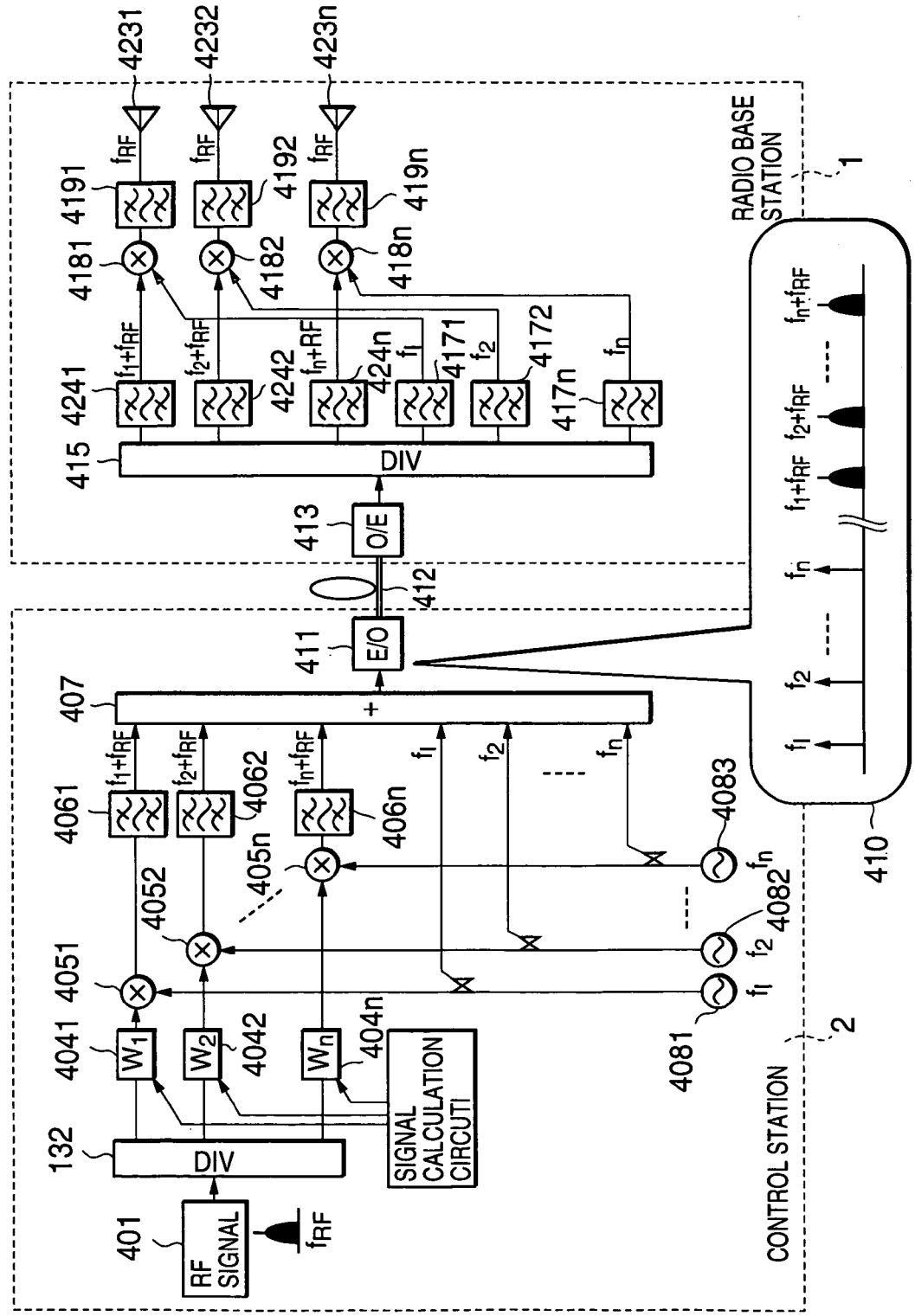
FIG. 22 is a block diagram of a ninth embodiment of the radio communication system according to the present invention.

FIG. 22 is a block diagram of the ninth embodiment of the radio communication system according to the present invention. Since many parts of the system of FIG. 22 are common to FIG. 19, different respects will mainly be described hereinafter.

When the bands of the band pass filter, optical/electric converter, electric/optical converter, and the like are sufficiently obtained, instead of multiplexing the intermediate frequency signal and transmitting the signal to the base station 1 from the control station 2, a radio frequency (RF) signal may be multiplexed and transmitted.

The control station 2 of FIG. 22 is similar to that of FIG. 19 except that the frequency of antenna transmitted signal is different, and has RF signal generation circuit 401, distributor 132, signal calculation circuit 133, weighting circuits $404_1$ to $404_n$, local oscillation circuits $408_1$ to $408_n$, a coupler, mixers $405_1$ to $405_n$, band pass filters $406_1$ to $406y$, coupler 407, and electric/optical converter 411.

Moreover, the base station 1 of FIG. 22 has an optical/electric converter 413, distributor 415, band pass filters $424_1$ to $424_n$ and $417_1$ to $417_n$, mixers $418_1$ to $418_n$, and band pass filters $419_1$ to $419_n$.

As shown in FIG. 22, for the base station 1, since a processing of converting the intermediate frequency signal to the radio signal is unnecessary, the constitution can further be simplified.

Tenth Embodiment

In a tenth embodiment, contrary to the eighth and ninth embodiments, when the radio signal received by the base station 1 is converted to the intermediate frequency signal and transmitted to the control station 2, the intermediate frequency signals and local oscillator outputs for the number of antenna elements are multiplexed and transmitted.

Figure 23:
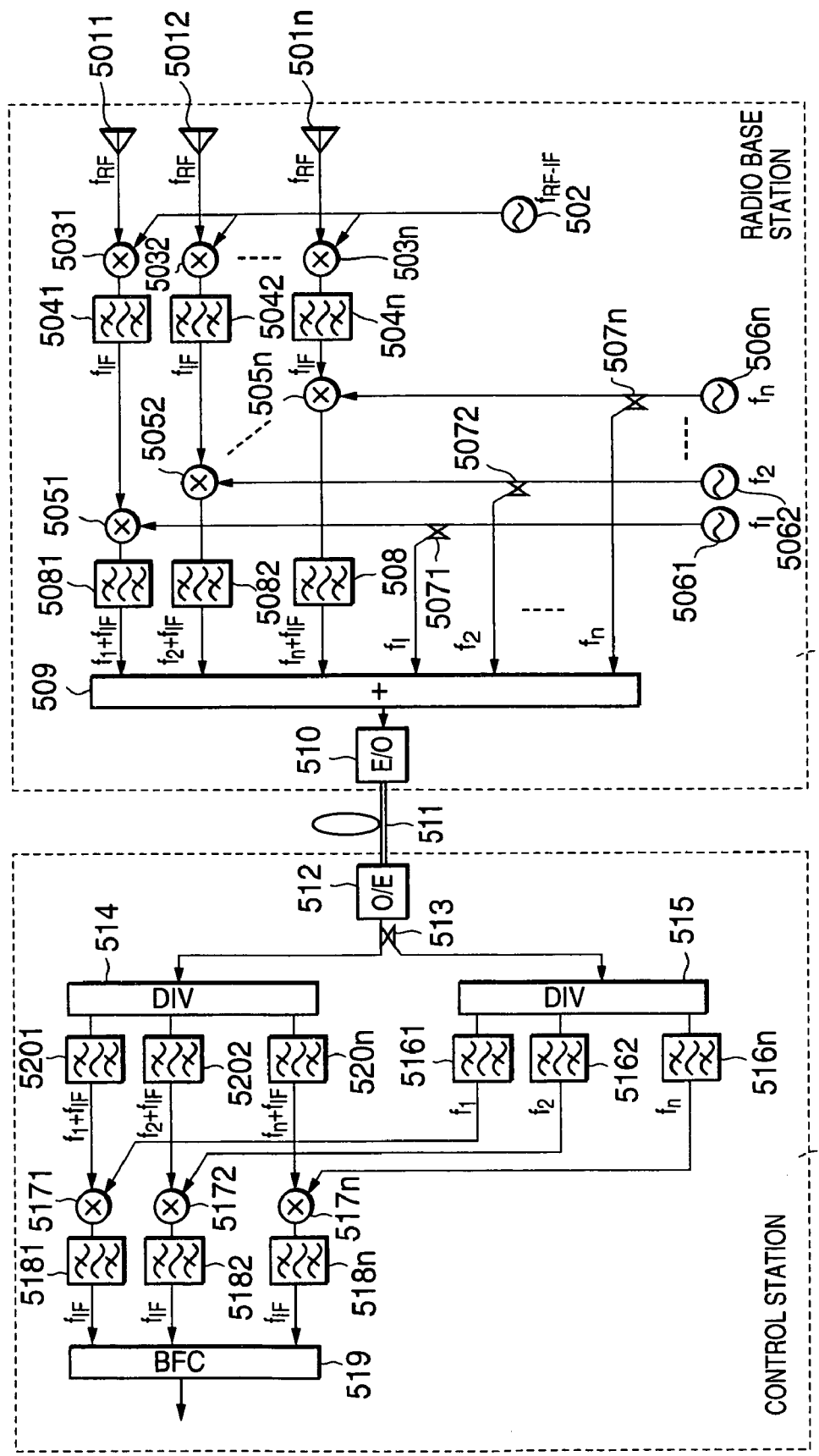
FIG. 23 is a block diagram of a tenth embodiment of the radio communication system according to the present invention.

FIG. 23 is a block diagram of the tenth embodiment of the radio communication system according to the present invention. The base station 1 of FIG. 23 has mixers $503_1$ to $503_n$ for mixing RF signals received by array antenna elements $501_1$ to $501_n$ with the local oscillator output $f_{RF-IF}$ from a local oscillation circuit 502, band pass filters $504_1$ to $504_n$ for extracting intermediate frequency signals $f_{IF}$ from output signals of the mixers $503_1$ to $503_n$, couplers $507_1$ to $507_n$ for branching the output signals of the band pass filters $504_1$ to $504_n$ and the local oscillator output $f_1$, $f_2$, ..., $f_n$, mixers $505_1$ to $505_n$ for mixing one of the branched local oscillator output with the output signal of the band pass filter 5041 to 504n, band pass filters 5081 to 508n for extracting different frequency signals $(f_1+f_{IF})$, $(f_2+f_{IF})$, ..., $(f_n+f_{IF})$ from output signals of the mixers $505_1$ to $505_n$; a coupler 509 for combining output signals of the band pass filters $508_1$ to $508_n$ with another local oscillator outputs branched by the coupler, and an electric/optical converter 510 for converting an output signal of the coupler 509 to the optical signal.

Moreover, the control station 2 of FIG. 23 has an optical/electric converter 512 for converting the optical signal transmitted from the base station 1 via an optical fiber 511 to the electric signal, distributors 514, 515, band pass filters $520_1$ to $520_n$ for extracting the signals of the frequencies $(f_1+f_{IF})$, $(f_2+f_{IF})$, ..., $(f_n+f_{IF})$, band and pass filter $516_1$ to $516_n$ for extracting the signal of the local oscillator output component, mixers $517_1$ to $517_n$ for combining the respective outputs of the band pass filters $520_1$ to $520_n$, $516_1$ to $516_n$, band pass filters $518_1$ to $518_n$ for extracting only IF signals and a beam forming network 519.

By performing the signal processing of the IF signals outputted from the band pass filters $518_1$ to $518_n$ by the beam forming network 519, a desired signal is obtained. In actual, the amplitude and phase of the IF signal inputted to the beam forming network 519 are not necessarily the same as the amplitude and phase received by the antenna because of frequency and phase dispersions of the respective IF signals outputted from the band pass filters $518_1$ to $518_n$. However, by performing calibration beforehand to obtain calibration values in respective branches and using the calibration values to perform the signal processing in the beam forming network 519, dispersions of the frequency and phase can be canceled each other.

As described above, in the radio communication system of FIG. 23, during frequency multiplexing of the IF signal in the base station 1, since the local oscillator output is also combined, multiplexed and then transmitted to the control station 2, the number of local oscillation circuits in the control station 2 can be reduced, and the constitution of the control station 2 can be simplified.

Eleventh Embodiment

An eleventh embodiment is a combination of the eighth and tenth embodiments.

Figure 24:
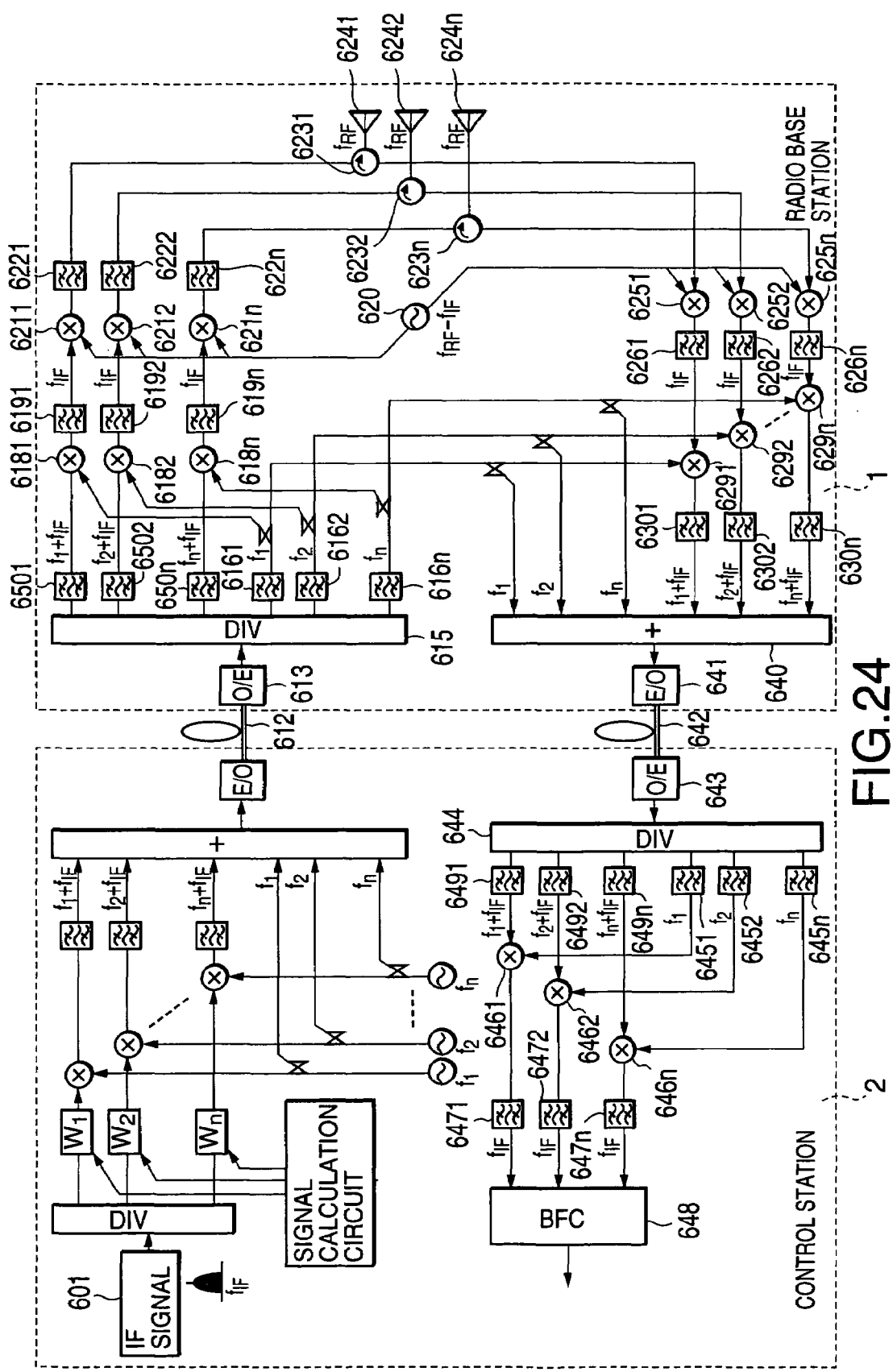
FIG. 24 is a block diagram of an eleventh embodiment of the radio communication system according to the present invention.

FIG. 24 is a block diagram of the eleventh embodiment of the radio communication system according to the present invention. Respects different from FIG. 19 and FIG. 23 will mainly be described hereinafter.

Array antenna constituting elements $624_1$ to $624_n$ are connected to circulators $623_1$ to $623_n$ for switching transmission/reception. The local oscillator output outputted from a local oscillation circuit 620 in the base station 1 is supplied both to transmitter mixers $621_1$ to $621_n$ and receiver mixers $625_1$ to $625_n$. Moreover, local oscillator outputs $f_1$ to $f_n$ multiplexed and transmitted to the base station 1 from the control station 2 are supplied not only to transmitter mixers $618_1$ to $618_n$ but also to receiver mixers $629_1$ to $629_n$.

As described above, in the radio communication system of FIG. 24, since the local oscillator output generated in the base station 1 and the local oscillator output multiplexed and transmitted to the base station 1 from the control station 2 are shared by the transmission and receiver mixers, the constitutions of the base station 1 and control station 2 can be simplified.

Twelfth Embodiment

A twelfth embodiment is a modification example of the eleventh embodiment, and only with respect to the transmitter, the local oscillator output is multiplexed to the antenna transmitted signal and transmitted to the base station 1 from the control station 2.

Figure 25:
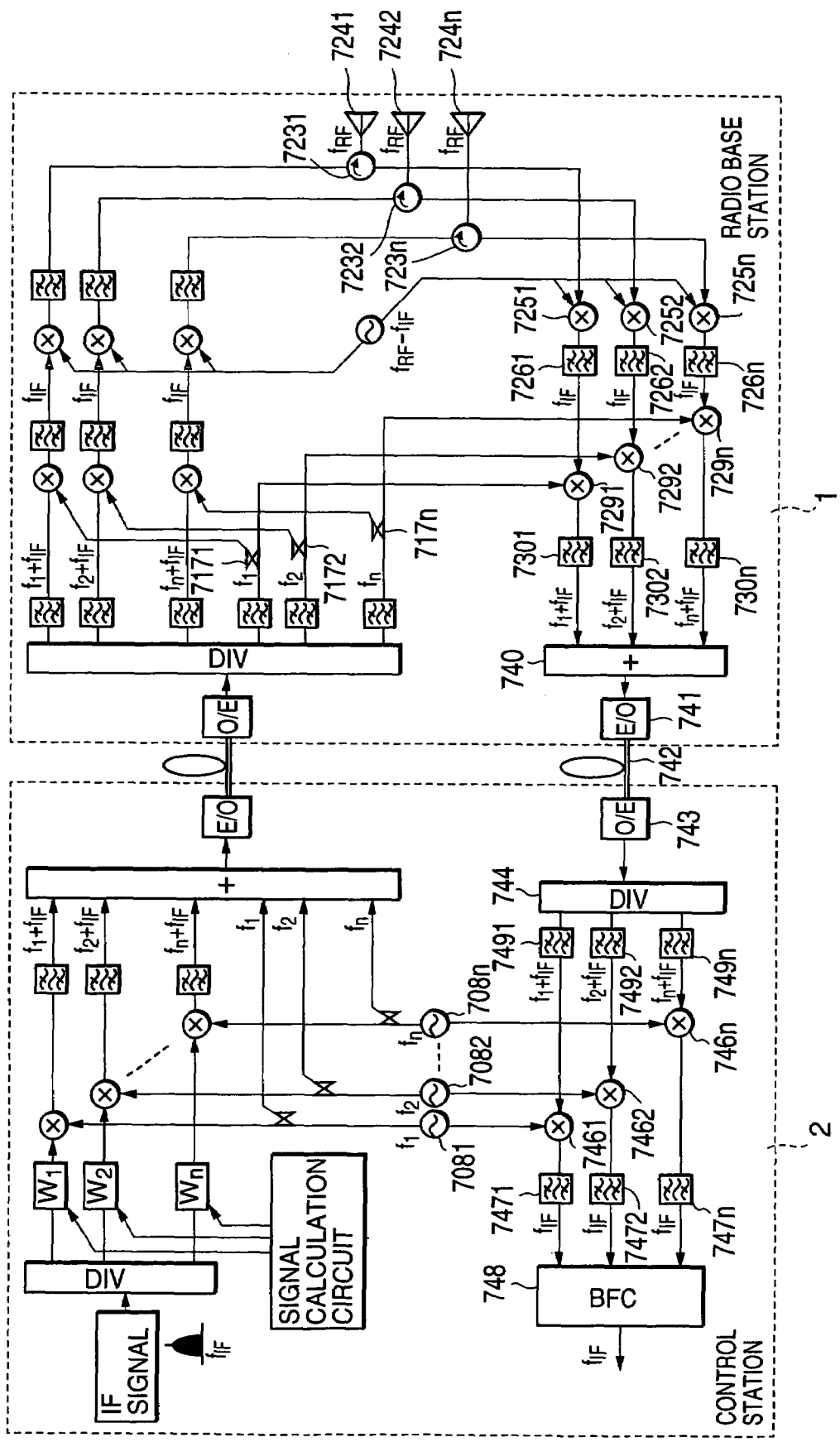
FIG. 25 is a block diagram of a twelfth embodiment of the radio communication system according to the present invention.

FIG. 25 is a block diagram of the twelfth embodiment of the radio communication system according to the present invention. Hereinafter, respects different from FIG. 24 will mainly be described.

The RF signals received by respective array antenna elements $724_1$ to $724_n$ are converted to IF signals by mixers $725_1$ to $725_n$ and band pass filters $726_1$ to $726_n$ in the base station 1, and subsequently converted to different frequency signals by mixers $729_1$ to $729_n$ and band pass filters $730_1$ to $730_n$. Output signals of the band pass filters $730_1$ to $730_n$ are multiplexed by a coupler 740, converted to a optical signal by an electric/optical converter 741 and transmitted via an optical fiber 742.

The optical signal from the base station 1 is converted to the electric signal by an optical/electric converter 743 in the control station 2, and subsequently divided to a plurality of signals by a distributor 744. Band pass filters $749_1$ to $749_n$ extract respective signals of frequency components different from the respective signals divided by the distributor 744.

Mixers $746_1$ to $746_n$ mix the outputs of the band pass filters $749_1$ to $749_n$ with the local oscillator outputs from local oscillation circuits $708_1$ to $708_n$ used in common to the transmitter. Band pass filters $747_1$ to $747_n$ extract only the IF signals from the outputs of the mixers $746_1$ to $746_n$, and a beam forming network 748 performs a signal processing based on the IF signals.

As described above, in the twelfth embodiment, with respect to the receiver, since the multiplexing of the received signal and local oscillator output is not performed, the processing of extracting the local oscillator output on the control station 2 side is unnecessary, and the constitution of the control station 2 can be simplified.

Additionally, in the radio communication system of FIG. 25, the antenna received signal transmitted to the control station 2 from the base station 1 is converted to the IF signal using the local oscillator output utilized in the transmitter, deviations of the frequency and phase possibly occur. The deviations need to be corrected in the beam forming network 748. Specifically, calibration is performed beforehand to obtain the calibration value in each branch, and the correction processing may be performed in the beam forming network based on the calibration value.

Thirteenth Embodiment

In a thirteenth embodiment, the arrival direction of a radio wave can be estimated without taking synchronization of a frequency converter in the base station with the frequency converter in the control station.

Figure 26:
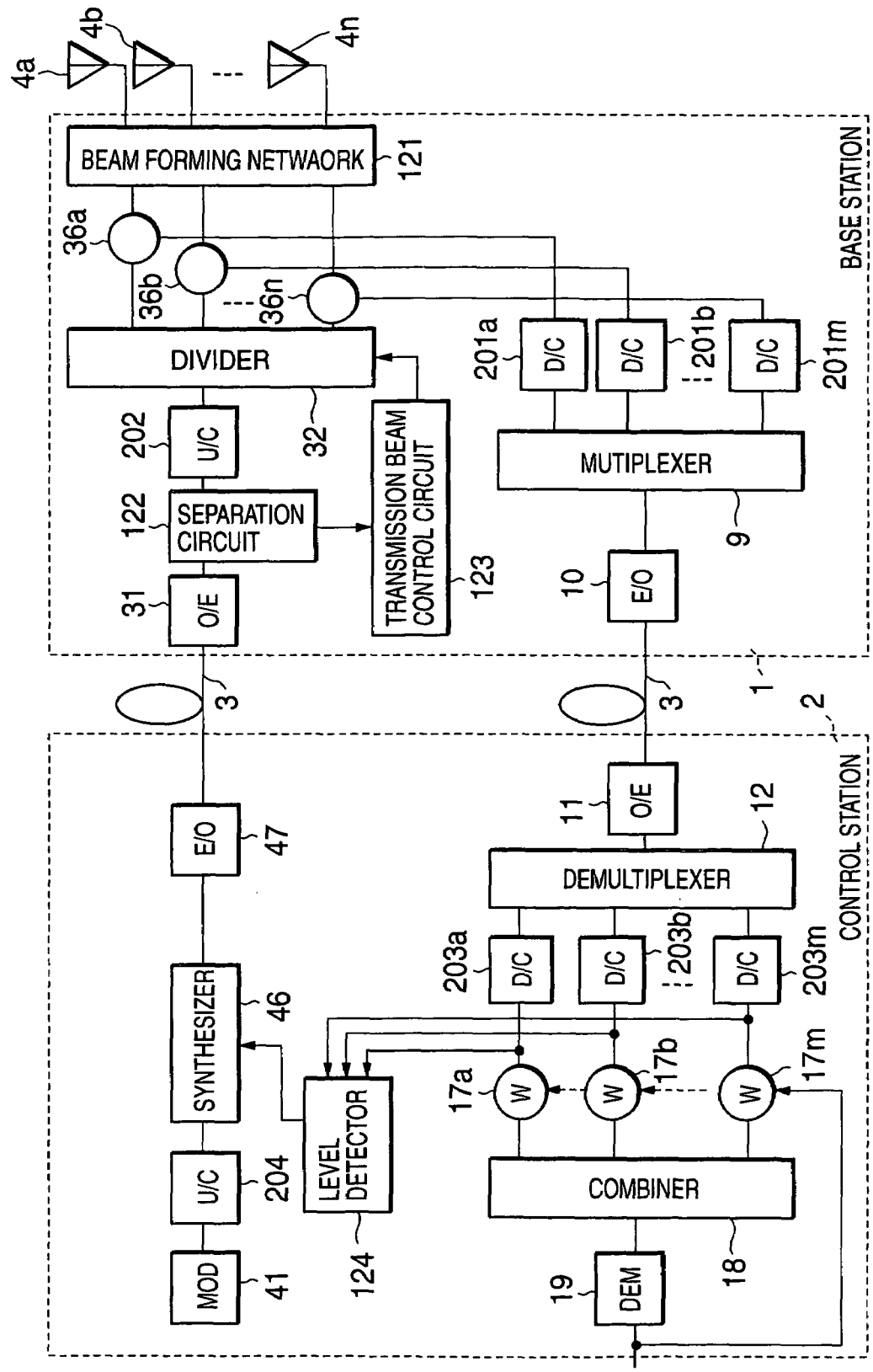
FIG. 26 is a block diagram schematically showing the radio communication system of the present invention.

FIG. 26 is a block diagram schematically showing a constitution of the radio communication system according to the present invention. The base station 1 of FIG. 26, as the receiver constitution, has the array antenna 4 constituted of n element antennas 4a to 4n for performing transmission/reception of radio signals with a radio communication terminal (not shown) so that directivity of a transmission/reception beam can be changed; a beam forming network 121 for combining the signals received by the respective element antennas 4a to 4n and converting the signal to m beam components, circulators 36a to 36m for separating the transmitted/received signal, m pieces of frequency converters (D/C: first frequency conversion means) 201a to 201m for converting the output signals of the beam forming network 121 to respective different frequencies, the combiner (MUX: first frequency multiplexing means) 9 for combining the output signals from the m frequency converters 201a to 201m and performing frequency multiplexing, and the electric/optical converter (E/O: first electric/optical conversion means) 10 for converting the output signals of the combiner 9 to the optical signal.

Moreover, the base station 1 of FIG. 26, as the transmitter constitution, has the optical/electric converter (O/E: first optical/electric conversion means) 31 for converting the optical signal transmitted from the control station 2 to the electric signal as described later, a separation circuit (DIV: separation means) 122 for dividing the output signal of the optical/electric converter 31 to the transmitted signal for the radio communication terminal and the signal for controlling the radiation beam-pattern of the array antenna 4, a frequency converter (U/C: second frequency conversion means) 202 for converting the frequency of the transmitted signal for the radio communication terminal separated by the separation circuit 122 to the radio frequency, a transmission beam control circuit 123 for generating a transmission beam control signal based on the signal separated by the separation circuit 122 for controlling the radiation beam-pattern of the array antenna 4, and the divider (antenna control means) 32 for dividing the output signal of the frequency converter 202 to a plurality of signals in accordance with the radiation beam-pattern of the respective element antennas 4a to 4n based on the transmission beam control signal. The signals divided by the divider 32 are inputted to the beam forming network 121 via the circulators 36a to 36m, and supplied to the element antennas 4a to 4n so that the signal is radiated as the beam provided with a predetermined directivity.

On the other hand, the control station 2 of FIG. 26, as the receiver constitution, has the optical/electric converter (O/E: second optical/electric conversion means) 11 for converting the optical signal transmitted from the base station 1 via the optical fiber 3 to the electric signal, a divider or demultiplexer (demultiplex means) 12 for dividing the converted electric signal to m frequency signals before frequency multiplexing, m pieces of frequency converters (D/C: third frequency conversion means) 203*a* to 203*m* for converting the frequencies of the respective signals divided by the divider 12 to the predetermined same frequency, weighting circuits (W: weighting means) 17*a* to 17*m* for weighting the output signals of the frequency converters 203*a* to 203*m* with respect to phase and signal intensity, a combiner 18 for combining the respective weighted signals and a demodulator (DEM: demodulation means) 19 for demodulating the synthesized signal to obtain transmission information from a mobile unit.

Moreover, the control station 2 of FIG. 26, as the transmitter constitution, has a level detector (level detection means) 124 for detecting a highest level signal among the output signals of the m frequency converters 203*a* to 203*m* or a signal intensity distribution to output a transmission beam control signal, a modulator (MOD) 41 for outputting a transmission base band signal a frequency converter (U/C) 204 for converting the frequency of the base band signal; combiner 46 for multiplexing the output signal of the frequency converter 204 with the transmission beam control signal from the level detector 124, and electric/optical converter (E/O: second electric/optical conversion means) 47 for converting the signal multiplexed by the combiner 46 to the optical signal and transmitting the optical signal to the base station 1 via the optical fiber 3.

An operation of the radio communication system of FIG. 26 will next be described. The radio frequency signal from the radio communication terminal (not shown) is received by the array antenna 4, and subsequently converted to beam components whose peak directions are different from one another by the beam forming network 121. The output signals of the beam forming network 121 are converted to frequencies different from each other, respectively and subjected to frequency multiplexing by the combiner 9. The output signal of the combiner 9 is converted to the optical signal from the electric signal by the electric/optical converter 10, and subsequently transmitted to the control station 2 via the optical fiber 3.

The optical signal transmitted to the control station 2 from the base station 1 is converted to the electric signal by the optical/electric converter 11, divided to m pieces of signals by the divider 12, inputted to the corresponding frequency converters 203*a* to 203*m* and converted to the same frequency. The output signals of the frequency converters 203*a* to 203*m* are weighted optimally, and then combined by the combiner 18, and subsequently demodulated by the demodulator 19.

Here, since the frequency converters 201*a* to 201*m* in the base station 1 are not synchronized with the frequency converters 203*a* to 203*m* in the control station 2, the phase relation among the respective beams formed in the beam forming network 121 in the base station 1 is not held in the control station 2. Therefore, it is difficult to estimate the arrival direction of the received signal from the weight added by the weighting circuits 17*a* to 17*m*.

However, when the respective beams formed by the beam forming network 121 are different, for example, in main beam from one another, and the whole main beam can cover an illuminating area of the base station 1, it is possible to estimate the received signal arrival direction by the amplitude value of each beam.

Specifically, the beams formed by the beam forming network 121 have maximum directivity in respective different directions, and a plurality of beams cover the communication range of the base station 1. Therefore, for any one of the plurality of beams, a mobile station terminal to be communicated exists in a beam width.

Generally, since the beam is formed so that a gain is lowered in the vicinity of a beam maximum radiation direction of another beam, it can be considered that the mobile station terminal exists in the direction of the beam received with a highest electric field intensity.

Therefore, the level detector 124 compares the signal amplitudes of the respective outputs of the frequency converters 203*a* to 203*m* with one another, and determines a highest level signal as the transmission beam. The transmission beam control signal outputted from the level detector 124 includes, for example, information corresponding to beam numbers of the beam forming network 121.

FIG. 27 is diagram showing properties of the beam formed by the beam forming network 121. Supposing that the irradiation area of the base station 1 has an angle of θ1 to θ2, and the area is covered with m beams, the beam forming network 121 combines the received signals in the antenna elements 4*a* to 4*n* so that each of the m beams has a beam width of |θ1−θ2|/m[°] as shown in FIG. 27A. These received signals are outputted from different output terminals of the beam forming network 121. Therefore, m output terminals of the beam forming network 121 has a one-to-one correspondence with m beams of FIG. 27A.

For example, supposing that a radio wave is incident from a θi direction, the power in each output terminal of the beam forming network 121 is as shown in FIG. 27B. As shown in the drawings, the reception power in beam i with the θi direction in a main beam is largest, and beams (i+1), (i−1) have the θi direction in the vicinity of the main beam, and therefore have certain degrees of reception powers although they are lower than the reception power of the beam i. On the other hand, for the other beams, since θi exists in a side lobe area, the reception power is lowered.

Therefore, the arrival direction of the radio wave can be estimated to some degree by the beam having the maximum reception power (maximum signal intensity) and a reception power distribution (signal intensity distribution) of the respective beams. Moreover, in this case, when the beam i is selected as the transmission beam on the base station 1 side, power can efficiently be supplied to the mobile station terminal as a communication destination, and a mobile station terminal sensitivity is enhanced, or there is another merit that noises to the other terminals can be reduced.

On the other hand, a flow of transmitted signal in the system of FIG. 26 is as follows. An output base band signal from the modulator 41 is converted up in the frequency converter 204, frequency-multiplexed with the transmission beam control signal as the output signal of the level detector 124, optically modulated and transmitted to the base station 1.

After the optical signal transmitted to the base station 1 is converted to the electric signal by the optical/electric converter 31, and subsequently divided to the antenna transmitted signal and transmission beam control signal by the separation circuit 122.

The antenna transmitted signal separated by the separation circuit 122 is converted up by the frequency converter 202. Moreover, the transmission beam control signal separated by the separation circuit 122 is inputted to the divider 32 via the transmission beam control circuit 123.

The divider 32 divides the output signal of the frequency converter 202. The divider 32 adjusts the signal intensity of the output signal of the frequency converter based on the output signal of the transmission beam control circuit 123, and outputs the signal to the element antennas 4a to 4n. That is, the divider 32 supplies all the signals to one terminal as a switch, or distributes to some beam terminals at an appropriate distribution ratio based on the output signal of the transmission beam control circuit 123.

The output signal of the divider 32 is inputted to the beam forming network 121 via the circulators 36a to 36m, and the beam signals to the respective element antennas 4a to 4n are formed.

As described above, in the first embodiment, since the intensity maximum value or the intensity distribution of the converted signals is detected in a beam space by the level detector 124 to determine the radiation directivity during transmission, the radio wave arrival direction can be estimated without synchronizing the frequency converters 201a to 201m in the base station 1 with the frequency converters 203a to 203m in the control station 2. Therefore, the synchronization among the frequency converters 201a to 201m, and the frequency converters 203a to 203m in the control station 2 is unnecessary, and the constitution of the control station 2 can be simplified.

Moreover, in the thirteenth embodiment, the beam control signal for transmission control is multiplexed with the modulation signal for transmission (antenna transmitted signal) in the control station 2 and transmitted to the base station 1 so that the transmitted signal is radiated in the radio wave arrival direction estimated based on the received signal, beam formation is performed in the base station 1, it is therefore unnecessary to form and multiplex the beams for the respective element antennas 4a to 4n in the control station 2, and the transmitter constitution can be simplified.

Fourteenth Embodiment

In a fourteenth embodiment, by using the antenna provided with a directional pattern, the beam forming network 121 is omitted and the constitution of the base station 1 is simplified.

Figure 28:
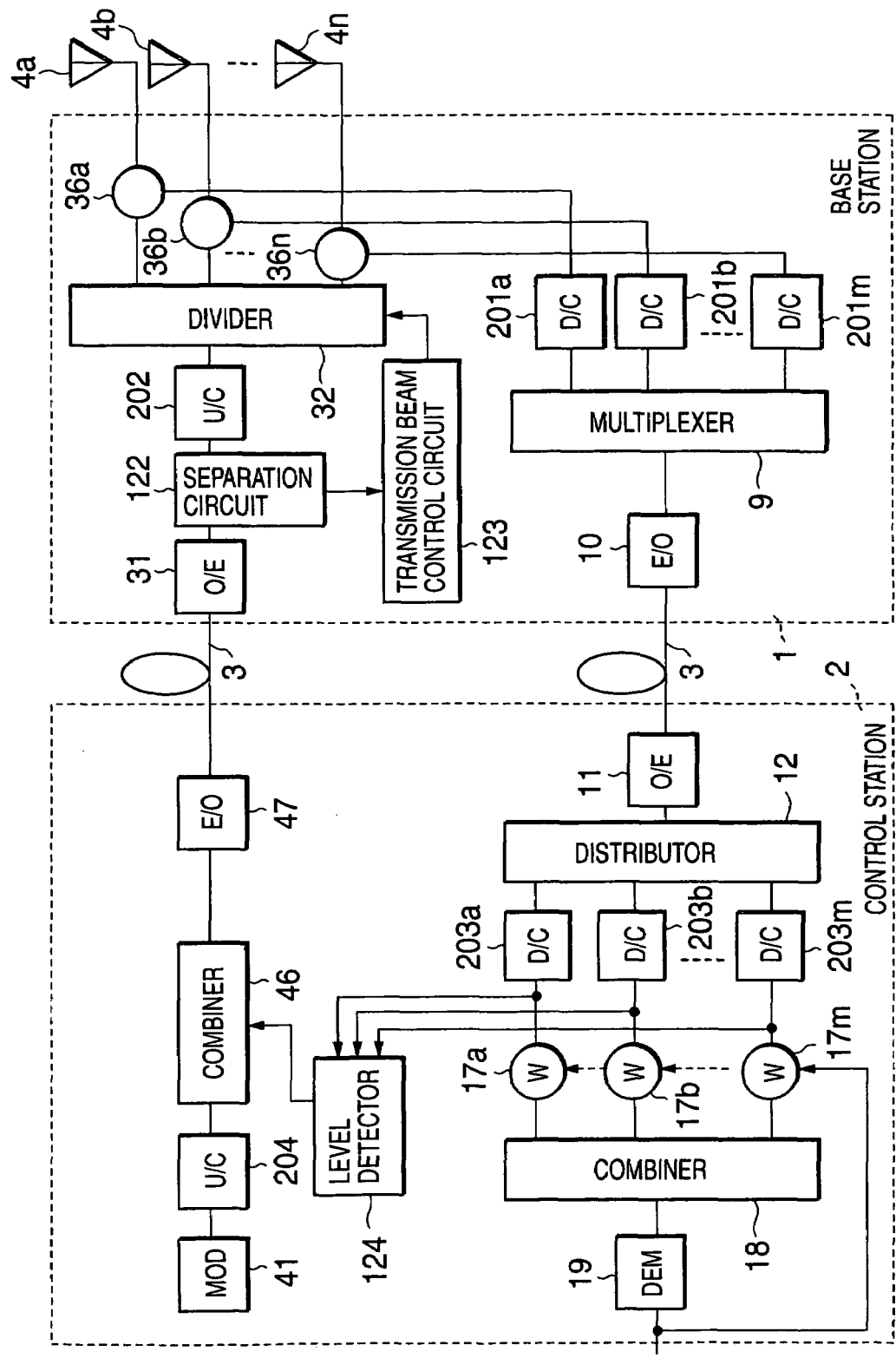
FIG. 28 is a block diagram of a fourteenth embodiment of the radio communication system according to the present invention.

FIG. 28 is a block diagram of a fourteenth embodiment of the radio communication system according to the present invention. In FIG. 28, the constituting parts common to those of FIG. 26 are denoted with the same reference numerals, and different respects will mainly be described hereinafter.

The base station 1 of FIG. 28 is constituted similarly as the base station 1 of FIG. 26, except that a plurality of directional antennas 4a to 4n provided with desired directional patterns different from one another, for example, like a sector antenna are disposed, and the beam forming network 121 of FIG. 26 is omitted. Moreover, the control station 2 of FIG. 28 is constituted similarly as the control station 2 of FIG. 26.

Since the plurality of antennas 4a to 4n of FIG. 28 are different in directivity from one another, by detecting the maximum intensity and intensity distribution of the signals received by the respective antennas 4a to 4n by the level detector 124 in the control station 2, the radio wave arrival direction can correctly be estimated. Therefore, the beam forming network 121 of FIG. 26 is unnecessary, the constitution of the base station 1 can further be simplified, and miniaturization and cost reduction are possible.

Figure 29A:
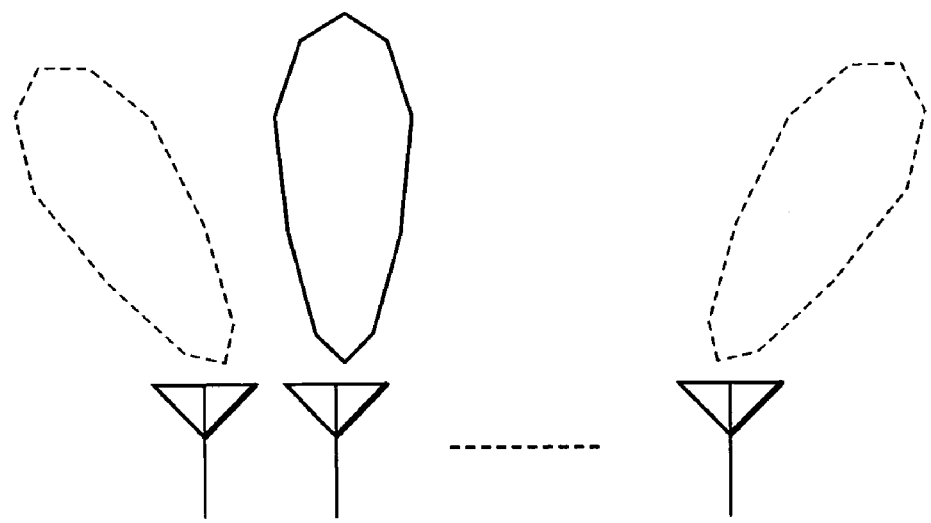
FIG. 29A is a diagram schematically showing beam formation in a directional antenna of FIG. 3.
Figure 29B:
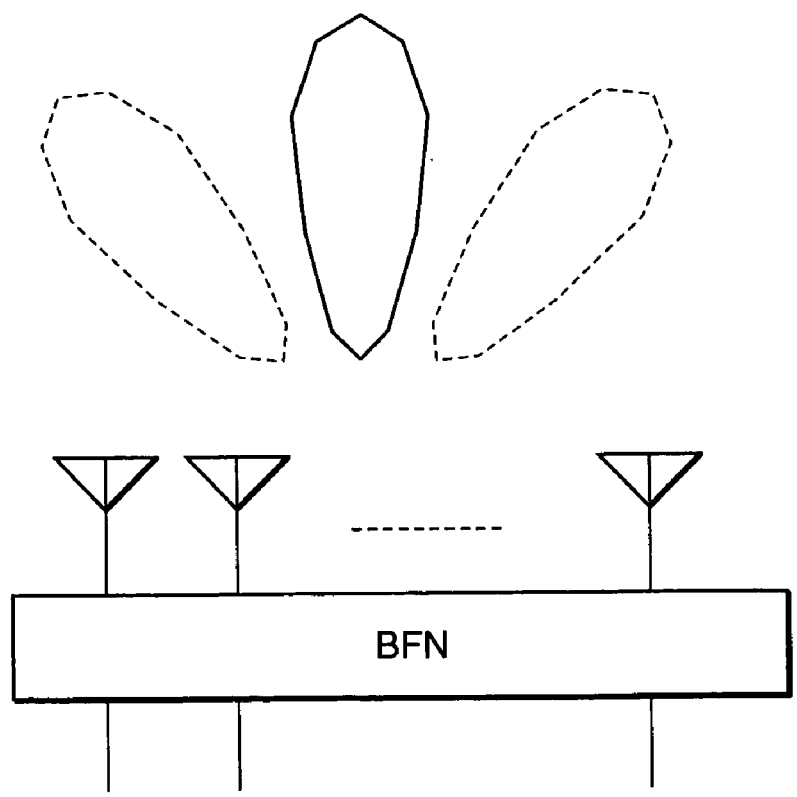
FIG. 29B is a diagram schematically showing the beam formation by the element antenna and beam forming network of FIG. 26.

FIG. 29A is a diagram schematically showing beam forming in the directional antennas 4a to 4n of FIG. 26, and FIG. 29B is a diagram schematically showing beam formation by the element antennas 4a to 4n and beam forming network 121 of FIG. 26.

As shown in FIG. 29B, the beam forming network 121 of FIG. 26 multiplies the signal by a certain composite weight for each of the element antennas 4a to 4n, synthesizes the signal and forms a desired directional pattern, depending on input ports of the inputted signal.

On the other hand, when the directional antennas 4a to 4n as shown in FIG. 28 (e.g., a reflective mirror antenna, a sector beam antenna, and the like) are used, as shown in FIG. 29A, antenna units are different in maximum radiation direction from one another, and have desired directional patterns such as a predetermined beam width and gain. Therefore, the properties equal to those of the first embodiment of the present invention can be obtained without combining the received signals of the respective element antennas 4a to 4n as shown in FIG. 29B.

Therefore, in the fourteenth embodiment of the present invention, it is possible to estimate the radio wave arrival direction from the individual received signal intensities without the beam forming network 121.

Fourteenth Embodiment

In the thirteenth and fourteenth embodiments, the signal received by the antenna is weighted and demodulated in an analog signal state, but in a fifteenth embodiment the signal is converted to a digital signal, weighted in a digital manner and subsequently demodulated.

Figure 30:
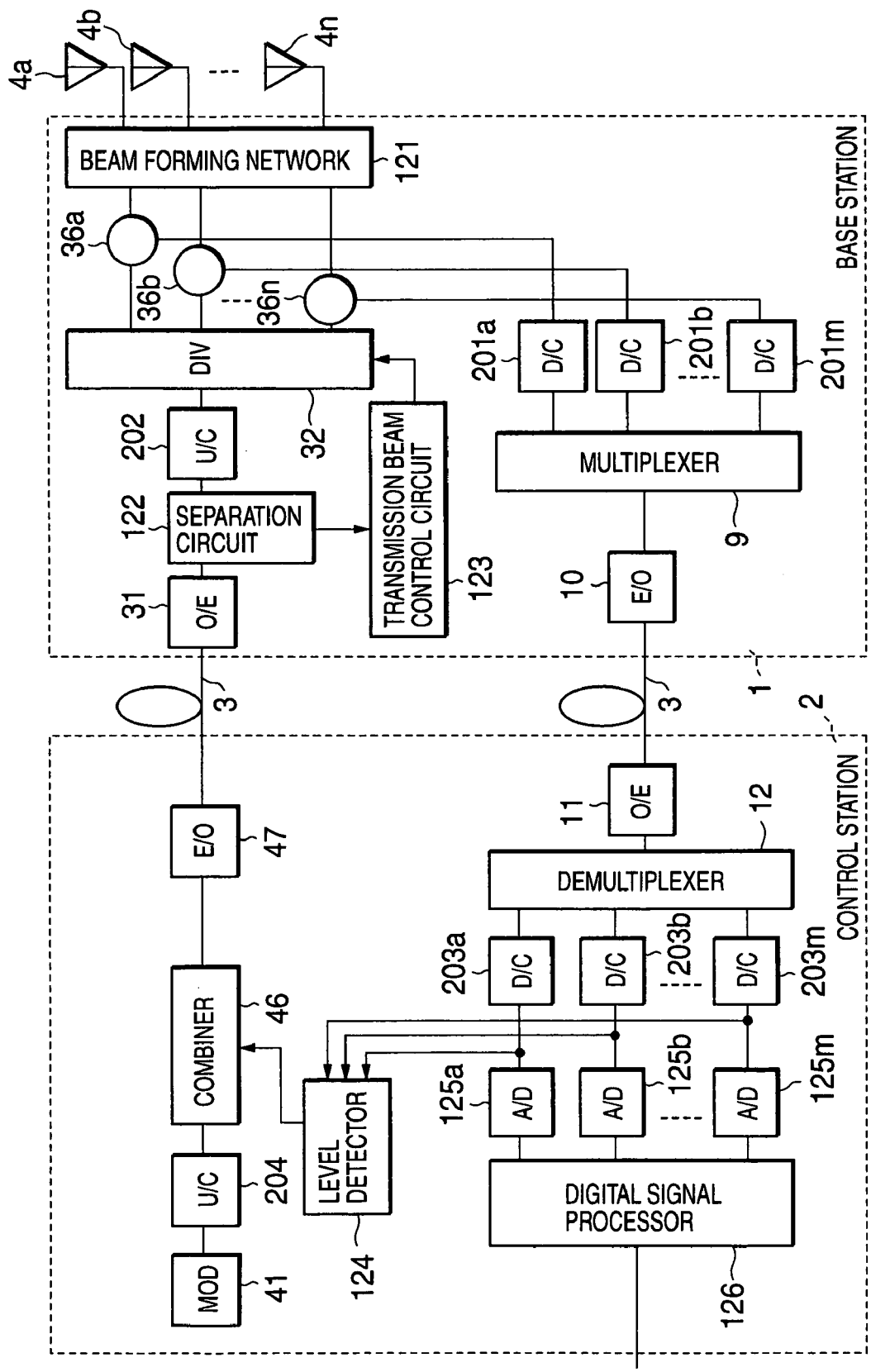
FIG. 30 is a block diagram of a fifteenth embodiment of the radio communication system according to the present invention.

FIG. 30 is a block diagram of the fifteenth embodiment of the radio communication system according to the present invention. In FIG. 30, the constituting part common to FIG. 26 is denoted with the same reference numerals, and different respects will mainly be described hereinafter.

The base station 1 of FIG. 30 is constituted similarly as the base station 1 of FIG. 26. The control station 2 of FIG. 30 has m analog/digital converters (A/D conversion means) 125a to 125m for converting the received signals converted to the same frequency by the frequency converters 203a to 203m to digital signals, and a digital signal processor (digital signal processing means) 126 for subjecting the digital signals to predetermined weighting and synthesis in a digital manner and subsequently performing demodulation.

In the system of FIG. 30, since it is unnecessary to perform analog weighting, integration is facilitated as compared with the first embodiment, and the control station 2 can be miniaturized. Moreover, in the digital signal processor 126, not only phase adjustment but also further complicated/sophisticated controls of the base station 1 such as interference suppression, arrival direction estimation, and delay wave synthesis are possible by changing a digital signal processing algorithm without adding any hardware.

Moreover, in FIG. 30, the output signals of the frequency converters 203a to 203m are inputted to the level detector 124, but the signal resulting from the signal processing by the digital signal processing circuit 126 may be inputted to the level detector 124 to generate a control signal for directivity control.

The level detector 124 of the aforementioned fourteenth and fifteenth embodiments generates the control signal for the radiation beam-pattern control based on the intensity of the received signal transmitted to the control station 2 from the base station 1. However, when the position information of the radio communication terminal is known on a network side, by inputting the position information to the level detector 124, the control signal for the radiation beam-pattern control may be outputted based on the position information and received signal intensity.

Sixteenth Embodiment

In a sixteenth embodiment, the level detector 124 is disposed in the base station 1, and the control signal for the radiation beam-pattern control is generated in the base station 1.

Figure 31:
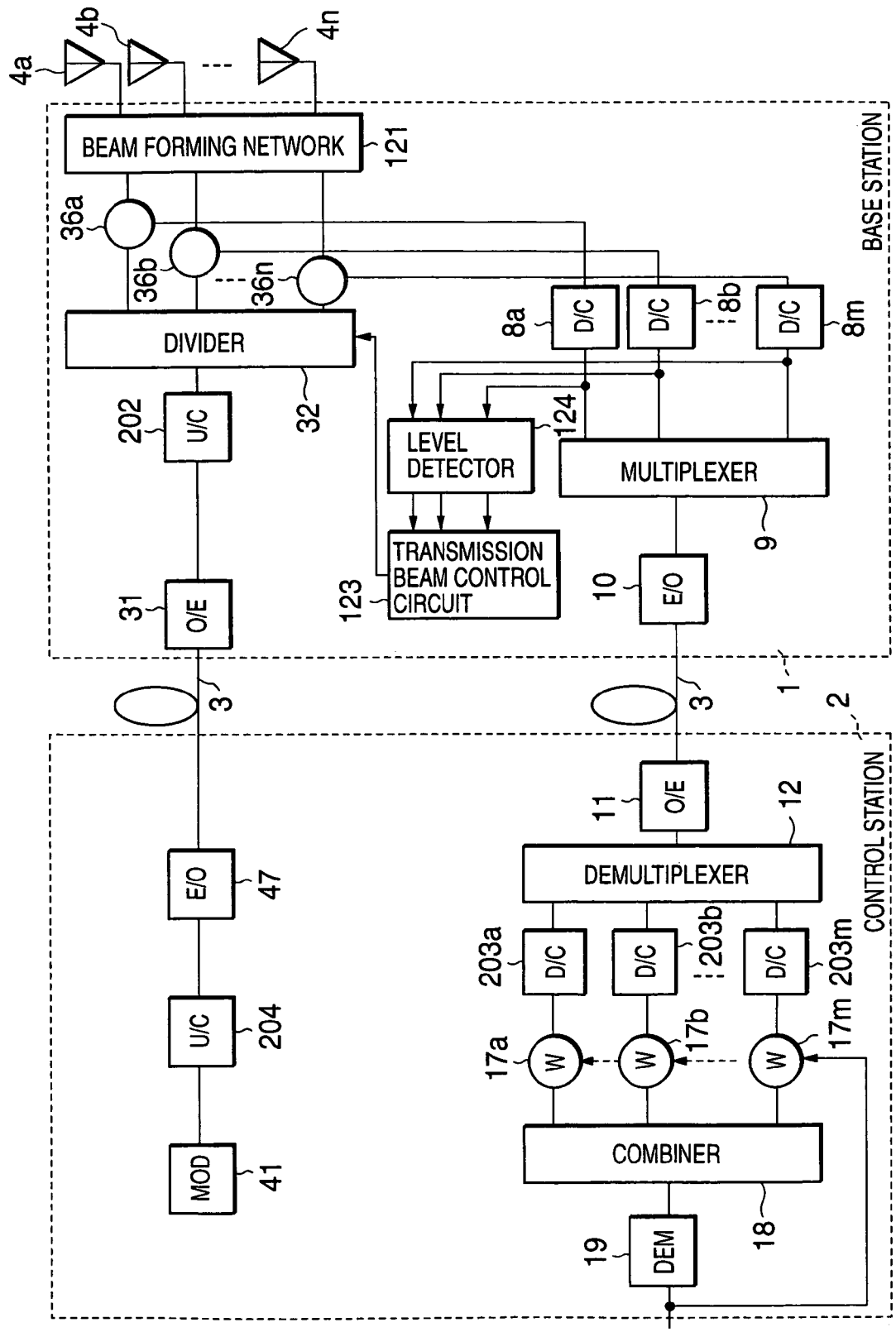
FIG. 31 is a block diagram of a sixteenth embodiment of the radio communication system according to the present invention.

FIG. 31 is a block diagram of the sixteenth embodiment of the radio communication system according to the present invention. In FIG. 31, the constituting part common to FIG. 26 is denoted with the same reference numerals, and different respects will mainly be described hereinafter.

In addition to the constitution of FIG. 26, the base station 1 of FIG. 31 has the level detector 124 for detecting the maximum intensity and intensity distribution of the output signals of the frequency converters 201*a* to 201*m* to generate the control signal for the radiation beam-pattern control. The transmission beam control circuit 123 in the base station 1 generates the beam control signal for antenna transmission based on the control signal from the level detector 124.

On the other hand, the control station 2 of FIG. 31 is constituted by removing the level detector 124 and combiner 46 from the constitution of FIG. 26.

In the system of FIG. 31, since the received signal level detection and transmitting radiation pattern control are performed in the base station 1, it is unnecessary to dispose the level detector 124 and combiner 46 in the control station 2, and the constitution of the control station 2 can be simplified.

Moreover, during transmission of the antenna transmitted signal to the base station 1 from the control station 2, since it is unnecessary to multiplex the transmitted signal with the transmitting radiation pattern control signal in the control station 2, the constitution of the transmitter to the base station 1 from the control station 2 can be simplified.

Seventeenth Embodiment

A seventeenth embodiment is a modification example of the sixteenth embodiment, and during transmission of the received signal to the control station 2 from the base station 1, instead of transmitting all the beams formed by the beam forming network 121, only the beam with a high signal level is selected and transmitted.

Figure 32:
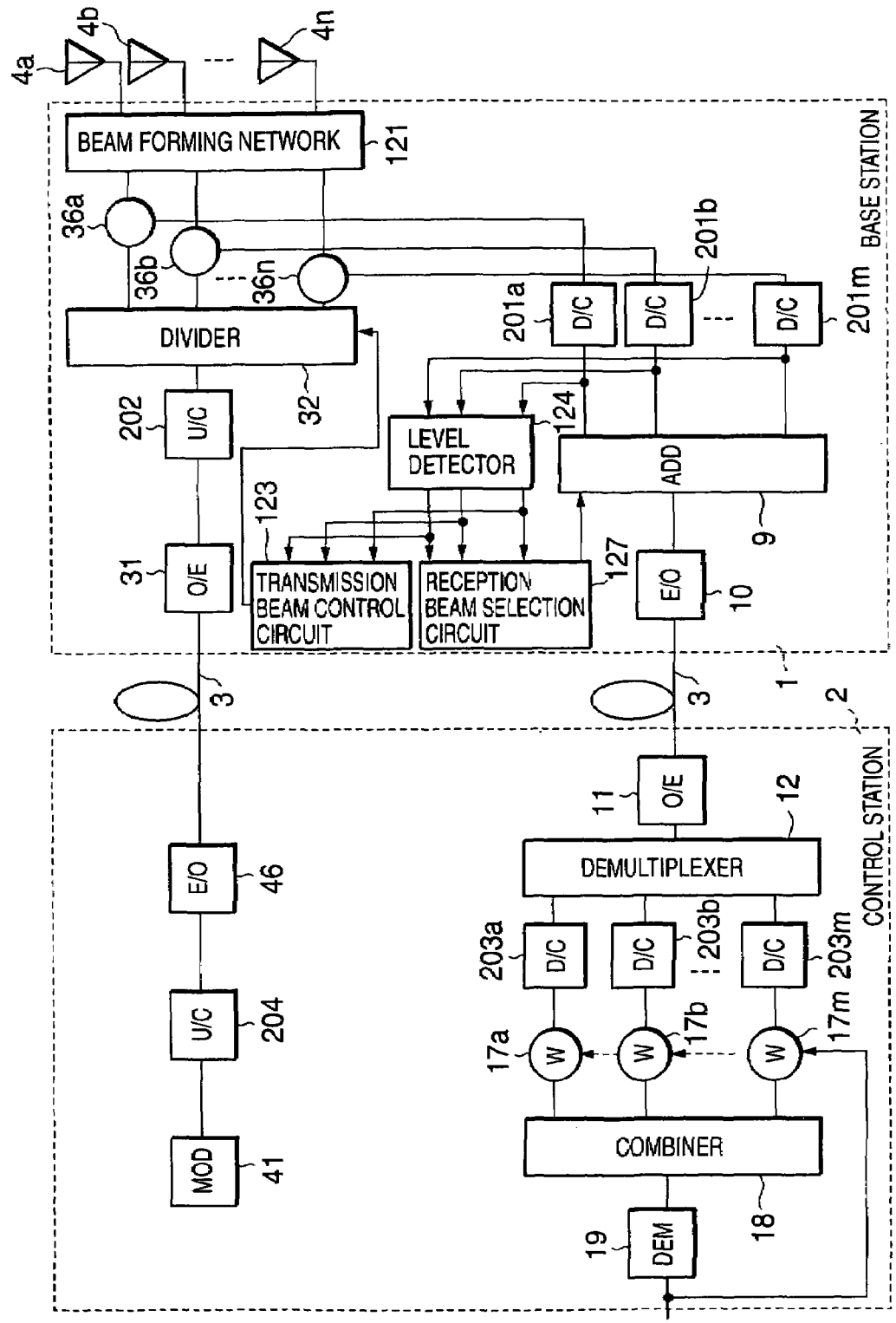
FIG. 32 is a block diagram of a seventeenth embodiment of the radio communication system according to the present invention.

FIG. 32 is a block diagram of the seventeenth embodiment of the radio communication system according to the present invention. In FIG. 32, the constituting part common to FIG. 26 is denoted with the same reference numerals, and different respects will mainly be described hereinafter.

In addition to the constitution of FIG. 26, the base station 1 of FIG. 32 has a reception beam selection circuit (received signal selection means) 127 for selecting only some of output signals of the frequency converters 201*a* to 201*m* based on the beam control signal outputted from the level detector 124. Concretely, the reception beam selection circuit 127 mainly selects some signals with high signal intensities from the signals subjected to the frequency conversion by the frequency converters 201*a* to 201*m*. The combiner 9 multiplexes only the signals selected by the reception beam selection circuit 127. The multiplexed signal is converted to the optical signal by the electric/optical converter 31 and transmitted to the control station 2.

The control station 2 of FIG. 32 is constituted similarly as FIG. 26. However, since the number of signals transmitted from the base station 1 decreases, a weighting processing of the respective signals, a synthesis processing of the respective weighted signals, and the like become easier than those of FIG. 26, and the constitution of the control station 2 can be simplified.

Figure 33:
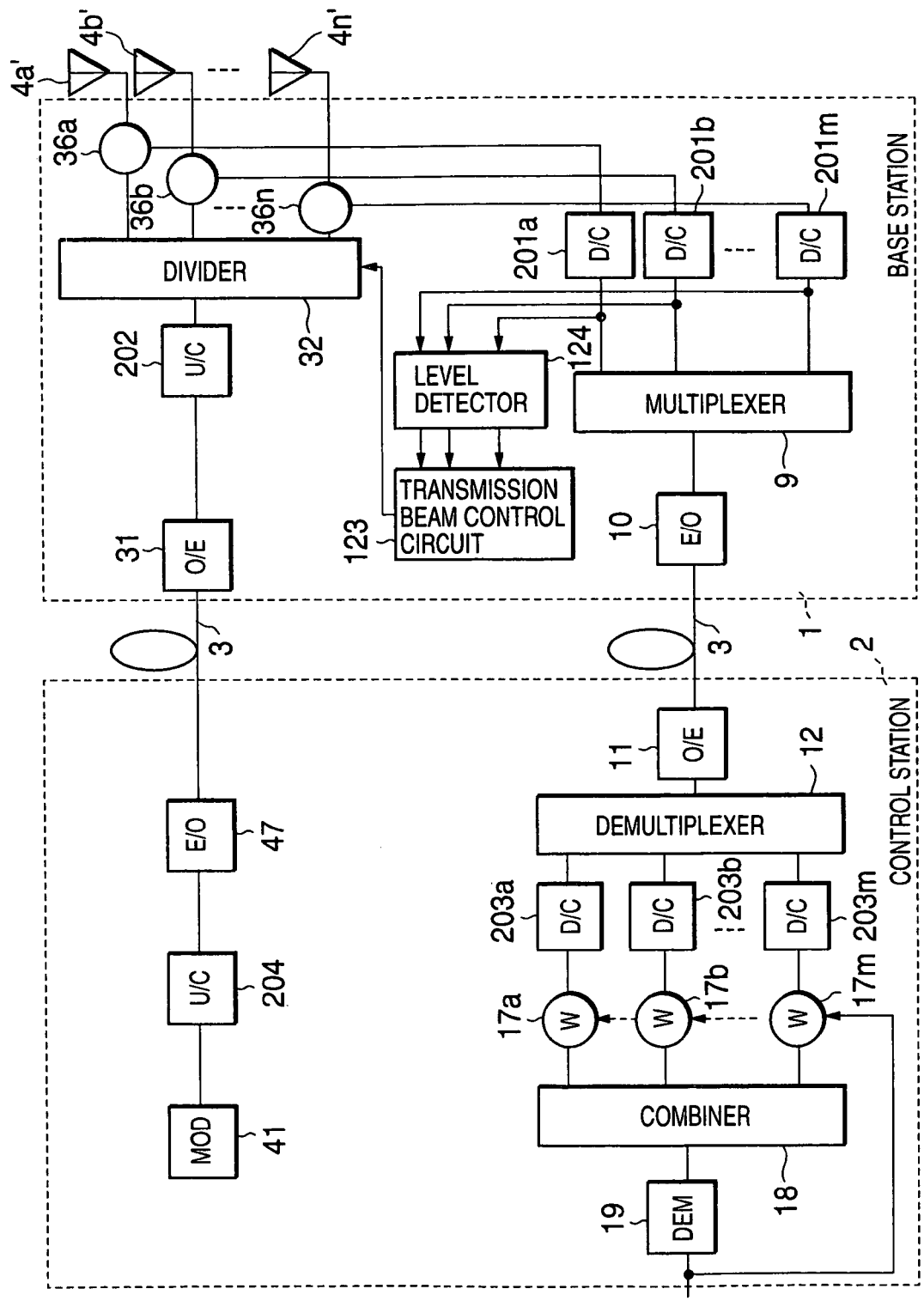
FIG. 33 is a diagram showing that in a circuit of FIG. 31, a directional antenna is connected instead of an array antenna.

For example, FIG. 33 shows an example in which the directional antenna 4*a*' to 4*n*' are connected instead of the array antenna 4 in the circuit of FIG. 31.

In FIGS. 26, 28, 31, 32 and 33, the respective beams in the control station 2 are weighted in an analog manner as described above, but similarly as FIG. 30, by disposing an A/D converter and digital signal processing circuit in the control station 2, and converting the received signal to the digital signal by the A/D converter, the weighting processing, synthesis processing, demodulation processing, and the like may be performed in a digital manner in the digital signal processing circuit.

Similarly as FIG. 28, the directional antenna may be used instead of the array antenna 4, and this obviates the necessity of the beam forming network 121. For example, FIG. 33 shows an example in which the directional antennas 4*a* to 4*n* are connected instead of the array antenna 4 in the circuit of FIG. 31. FIGS. 31 to 33 show an example in which the beam forming network 121 is disposed similarly as FIG. 26.

Moreover, in the fourteenth to seventeenth embodiments, an example has been described in which the array antenna 4 is shared for transmission/reception, and the circulators 36*a* to 36*m* are connected to the ends of the element antennas 4*a* to 4*n*, but the beam forming network 121 is also shared for transmission/reception. However, by separately disposing the transmitting antenna and the receiving antenna, the beam forming network 121 may also be disposed separately for transmission and reception. In this case, no transmission/reception separation circuit is necessary.

Furthermore, in the aforementioned fourteenth to seventeenth embodiments, the radio frequency signals received by the respective element antennas 4*a* to 4*n* are once converted to the intermediate frequency signals, optically modulated and subsequently transmitted to the control station 2. A reason for this is that the electric/optical converter 31 and optical/electric converter 11 can be realized more inexpensively than when the optical modulation is performed with the radio frequency signal. Additionally, the radio frequency signal may optically be modulated and transmitted to the control station 2. Also in this case, it is possible to use the level detector 124 and estimate the radio wave arrival direction.

Moreover, also in the system of FIG. 26 or 29, similarly as FIG. 32, by disposing the reception beam selection circuit 127 in the base station 1, only some of the received signals may be selected, subjected to frequency multiplexing and transmitted to the control station 2.

Eighteenth Embodiment

In an eighteenth embodiment, the phase and amplitude adjustment of the transmitted signal transmitted to the base station from the control station is easily and precisely performed.

Figure 34:
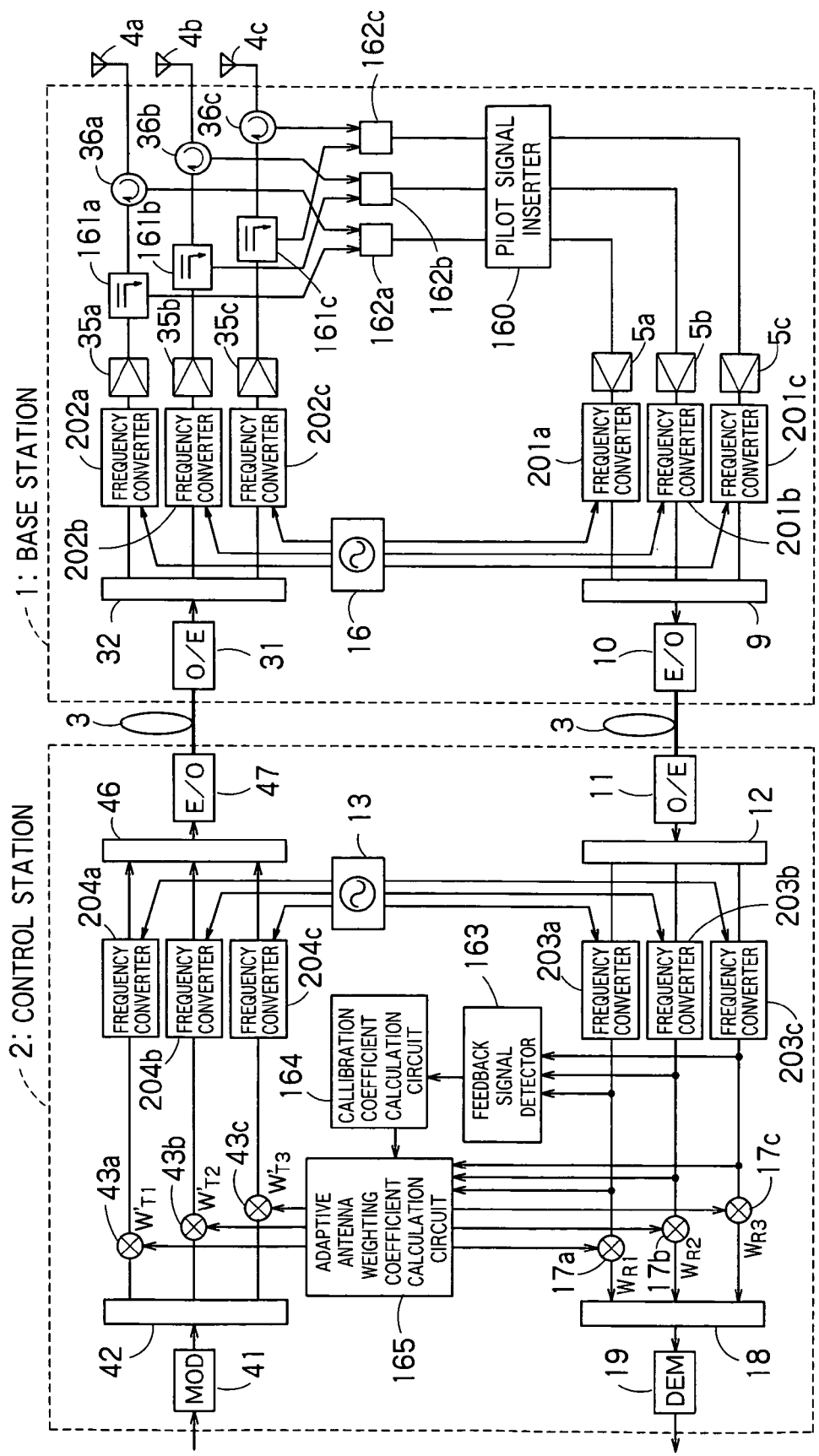
FIG. 34 is a block diagram of an eighteenth embodiment of the radio communication system according to the present invention.

FIG. 34 is a block diagram of the eighteenth embodiment of the radio communication system according to the present invention. A system of FIG. 34 shows an example in which the base station 1 provided with the array antenna 4 is connected to the control station 2 via the optical fiber 3, and sub-carrier multiplexing transmission is performed. The array antenna 4 of FIG. 34 includes three antenna elements 4a to 4c, but the number of antenna elements 4a to 4c is not particularly limited.

The base station 1 of FIG. 34, as the receiver configuration, has circulators 36a to 36c for switching transmission/reception, combiners (combiner means) 162a to 162c for performing synthesis of transmitted/received signals, a pilot signal inserter (pilot signal insertion means) 160 for inserting a pilot signal into a transmitted signal fed back to the control station 2, low noise amplifiers 5a to 5c for amplifying the output signal of the pilot signal inserter 160, frequency converters (first frequency conversion means) 201a to 201c for down-converting the respective output signals of the low noise amplifiers 5a to 5c to different frequency signals, combiner (frequency multiplexing means) 9 for performing sub-carrier multiplexing for the respective frequency signals outputted from the frequency converters 201a to 201c, and electric/optical converter (first electric/optical conversion means) 10 for converting the signal synthesized by the combiner 9 to the optical signal and transmitting the optical signal to the control station 2 via the optical fiber 3.

Moreover, at the transmitter side, the base station 1 of FIG. 34 has optical/electric converter 31 for converting the optical signal transmitted from the control station 2 to the electric signal, divider 32 for dividing the output signal of the optical/electric converter 31 to plural signals with different frequency, frequency converters 202a to 202c for converting the respective frequency signals divided by the divider 32 to radio frequency signals, amplifiers 35a to 35c for amplifying the output signals of the frequency converters 202a to 202c, and couplers 161a to 161c for branching the output signals of the amplifiers 35a to 35c to the circulators 36a to 36c and combiners 162a to 162c.

Additionally, the base station 1 of FIG. 34 has a frequency synthesizer 16 for supplying local oscillator outputs to the frequency converters 201a to 201c, 202a to 202c. The frequency synthesizer 16 has plural local oscillators for generating different frequency signals, or has one local oscillator and a frequency divider for multiplying or dividing the frequency of the local oscillation signal to generate various frequency signals.

On the other hand, at the receiver side, the control station 2 of FIG. 34 has the optical/electric converter (optical/electric conversion means) 11 for converting the optical signal transmitted from the base station 1 to the electric signal, distributor (demultiplex means) 12 for dividing the output signal of the optical/electric converter 11 to plural sub-carrier signals, frequency converters (third frequency conversion means) 14a to 14c for converting the respective distributor outputs to the same frequency, feedback signal detector (feedback means) 163 for detecting transmitted feedback signal from the output signals of the frequency converters 14a to 14c, calibration coefficient calculation circuit (comparison means) 164 for calculating the calibration coefficient for transmission by using the feedback signal, adaptive antenna weighting coefficient calculation circuit (weighting coefficient calculation means) 165 for calculating the weighting coefficients for transmission/reception taking the calibration coefficient, multipliers (first weighting means) 17a to 17c for weighting the received signal based on the calculated weighting coefficient, combiner 18 for synthesizing the respective output signals of the multipliers 17a to 17c, and demodulator 19 for demodulating the signal synthesized by the combiner 18.

Moreover, the control station 2, as the transmitter constitution, has the modulator 41 for generating the modulation signal for transmission, distributor 42 for dividing the modulation signal to a plurality of signals, multipliers (second weighting means) 43a to 43c for weighting the divided modulation signals based on the weighting coefficient, frequency converters 204a to 204c for converting the output signals of the multipliers 43a to 43c to different frequency signals, combiner 46 for performing sub-carrier multiplex for the output signals of the frequency converters 204a to 204c, and electric/optical converter 47 for converting the signal multiplexed by the combiner 46 to the optical signal and transmitting the optical signal to the base station 1 via the optical fiber 3.

Additionally, the control station 2 of FIG. 34 has frequency synthesizer 13 for supplying local oscillator outputs to the frequency converters 14a to 14c, 204a to 204c, respectively. The frequency synthesizer 13 has plural local oscillators for generating different frequency signals, or has one local oscillator, and a frequency divider for multiplying or dividing the local oscillator output to generate various frequency signals. In the present embodiment, it is supposed that the frequency synthesizer 16 in the base station 1 is synchronized in frequency and phase with the frequency synthesizer 13 in the control station 2.

In the base station 1 of FIG. 34, the couplers 161a to 161c, the combiners 162a to 162c, pilot signal inserter 160 correspond to feedback means, and the frequency converters 201a to 201c, combiner 9, and electric/optical converter 10 correspond to transmission means. Moreover, in the control station 2 of FIG. 34, the weighting coefficient calculation circuit 165 and multipliers 17a to 17c, 43a to 43c correspond to compensation means, and the feedback signal detector 163 corresponds to first and second detection means.

The base station 1 of FIG. 34 returns the transmitted signals from the control station 2 back to the control station 2 via the receiver circuits in the base station 1 before radiation from the array antenna 4. Moreover, the control station 2 compares two signals among the transmitted signals of the respective branches fedback with the inserted pilot signals. In this case, since an absolute phase and an absolute amplitude of the pilot signal are known in the control station 2 in advance, the pilot signal are used to estimate phase/amplitude fluctuation amount of each branch in the receiver from the base station to the control station. It is also possible to perform adjustment of each branch of the transmitter, by subtracting the phase/amplitude fluctuation amount of the receiver estimated by the pilot signal.

An operation of the radio communication system of FIG. 34 will be described hereinafter. The signals received by the antenna elements 4a to 4c and the transmitted signal from the control station 2 are combined by the combiners 162a to 162c, and provided with the pilot signal by the pilot signal inserter 160. Thereafter, the signals are inputted to the frequency converters 201a to 201c via the low noise amplifiers 5a to 5c, and converted to different frequencies for the respective branches corresponding to the respective antenna elements 4a to 4c. In this case, the frequency is preferably converted to an intermediate frequency in accordance with the frequency properties, and the like of the optical fiber 3 and optical source. By the conversion to the intermediate frequency, the constitution of the optical transmitter can be simplified. The output signals of the frequency converters 201a to 201c are subjected to frequency multiplexing by the combiner 9, converted to the optical signal by the electric/optical converter 10 and transmitted to the control station 1.

FIG. 35 is a frequency spectrum diagram of the signal subjected to sub-carrier frequency multiplexing by the combiner 9. FIG. 35 shows an example of a frequency divide duplex (FDD) system that transmitted/received signals are assigned to the frequencies different from each other. As shown in FIG. 35, the received signal in the array antenna 4, pilot signal, and transmitted signal from the control station 2 are assigned at different frequency intervals, and these are assigned as a group to sub-carriers f1 to f3. Additionally, band-pass filters (not shown) in the frequency converters 201a to 201c need to be provided with bandwidth in which the signal groups of the respective sub-carriers can pass.

Furthermore, when the pilot signal is subjected to frequency multiplexing and inserted, it is necessary to allocate the neighbor frequency band to the pilot signal so closely that phase/amplitude fluctuation amount due to difference of the frequency property does not change.

The optical signal transmitted to the control station 2 is again converted to the electric signal by optical/electric converter 11, and subsequently divided to a plurality of branch signals by the divider 12. These branch signals are converted to the same frequency signals by the frequency converters 14a to 14c, and inputted to the feedback signal detector 163 and multipliers 17a to 17c.

The feedback signal detector 163 extracts the transmitted signals transmitted by the control station 2, and pilot signal.

The calibration coefficient calculation circuit 164 uses the transmitted signal of either one of the branches as a reference among the respective branch transmitted signals extracted by the feedback signal detector 163, and detects the relative phase difference and relative amplitude difference in the other branches. Based on the detected result, the circuit 164 detects consistent signal distortion in the transmitter/receivers. Furthermore, the circuit 164 detects calibration coefficients of each branch of the transmitter by subtracting phase/amplitude fluctuation amount of the receiver estimated from the distortion of the pilot signal.

The weighting coefficient calculation circuit 165 calculates the weighting coefficients with respect to the transmission and received signals by using the output signals of the frequency converters 14a to 14c, the calibration coefficients calculated by the calibration coefficient calculation circuit 164, and the transmission/reception weight calculated for beam control.

The multipliers 17a to 17c multiply the output signals of the frequency converters 14a to 14c by the weighting coefficient calculated at the weighting coefficient calculation circuit 165 to perform weighting of the received signal. The weighted received signal is inputted to the demodulator 19 and demodulated.

On the other hand, the transmitted signal modulated by the modulator 41 in the control station 2 is multiplied by the weighting coefficient calculated by the weighting coefficient calculation circuit 165 by the multipliers 43a to 43c, and weighted. The weighted transmitted signals are converted to different frequency signals by the frequency converters 204a to 204c, and subsequently subjected to sub-carrier frequency multiplexing by the combiner 46.

The transmitted signal subjected to the sub-carrier frequency multiplexing is converted to the optical signal by the electric/optical converter 47, and subsequently transmitted to the base station 1 via the optical fiber 3.

The optical signal transmitted to the base station 1 is divided to a plurality of branch signals by the divider 32, and the respective branch signals are inputted to the frequency converters 202a to 202c and converted up to the radio frequency signal.

The respective output signals of the frequency converters 202a to 202c are inputted to the amplifiers 35a to 35c, amplified and subsequently inputted to the antenna elements 4a to 4c via the couplers 161a to 161c and circulators 36a to 36c.

The detailed constitution and operation of the feedback signal detector 163, calibration coefficient calculation circuit 164, and weighting coefficient calculation circuit 165 of FIG. 34 will next be described.

The feedback signal detector 163 extracts the transmitted signal of each branch and the pilot signal from the sub-carrier shown in FIG. 36. When the pilot signal is subjected to frequency multiplexing with the fedback transmitted signal, a specific narrow band-pass filter is necessary.

As shown in detail in FIG. 36, the calibration coefficient calculation circuit 164 has a phase difference detector 166, amplitude ratio detector 167, and calculator 168.

Any two branches of signals among the respective output signals of the frequency converters 14a to 14c are inputted to both the phase difference detector 166 and the amplitude ratio detector 167. The phase difference detector 166 detects a phase difference between the output signals, and the amplitude ratio detector 167 detects an amplitude deviation between the output signals.

Especially, when detecting the relative phase difference/ amplitude fluctuation amount of each branch, for example, the feedback signal of the first branch is always inputted from the input part 1, and another feedback signals are inputted from the input part 2.

When a first branch is used as a reference, the relative phase difference of a k-th branch is θ1k, and the relative amplitude ratio is A1k, the calculator 168 calculates calibration coefficients C1 to C3 based on the following equations (23) to (25).

$$C_1 = 1 \quad (23)$$

$$C_2 = \frac{1}{A_{12}} e^{-j\theta_{12}} \quad (24)$$

$$C_3 = \frac{1}{A_{13}} e^{-j\theta_{13}} \quad (25)$$

Figure 37:
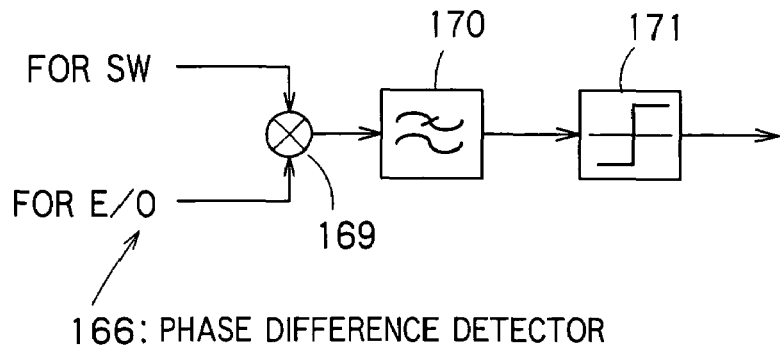
FIG. 37 is a block diagram showing a detailed constitution of a phase difference detector.

As shown in detail in FIG. 37, the phase difference detector 166 of FIG. 36 has a multiplier 169, low pass filter 170, and phase identifier 171. After the feedback signals of i number branch and j number branch is multiplied by the multiplier 169, high frequency components are removed by the low pass filter 170, so that deviation components can be obtained in proportion to $\cos\theta_{ij}$.

Figure 38:
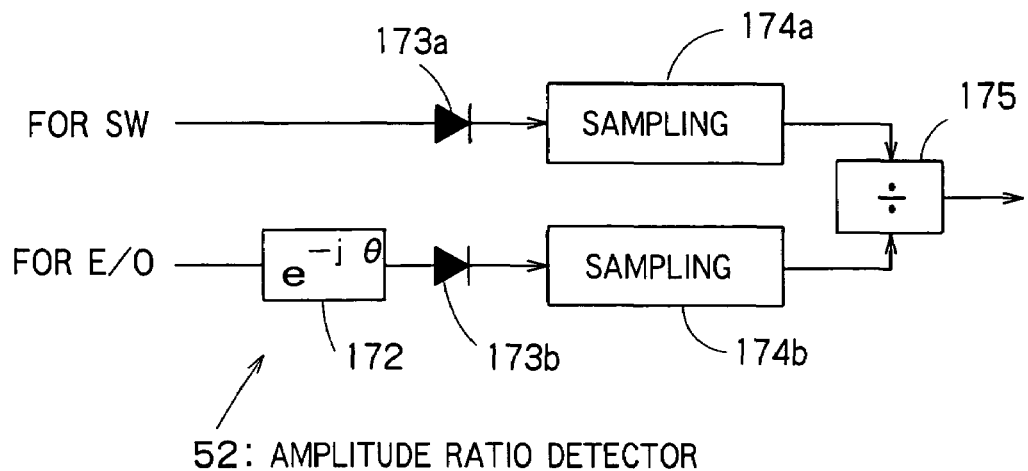
FIG. 38 is a block diagram showing a detailed constitution of an amplitude ratio detector.

As shown in detail in FIG. 38, the amplitude ratio detector 167 of FIG. 36 has a phase compensator 172, diodes 173a, 173b, sampling units 174a, 174b, and divider 175. The phase compensator 172 corrects the phase difference of one of the inputted two transmitted signals to input the same phase. The output of the phase compensator 172 and the other feedback signal are inputted to the diodes 173a, 173b, respectively, and envelope components are extracted. These envelope components are sampled by the sampling units 174a, 174b, and a sampling output ratio is obtained by the divider 175, By performing the same process relating to the pilot signal, it is possible to estimate the absolute phase fluctuation amount $\phi k$ and the absolute amplitude fluctuation amount Bk of each branch of the receiver. In this case, known sequence of the pilot signal is inputted to the input port 1 of the calibration coefficient calculation circuit of FIG. 37, and the fedback pilot signal is inputted to the input port 2. Therefore, the relative phase fluctuation amount of only the transmitter is given by $\theta'1k=\theta1k-\phi k$. The relative amplitude fluctuation amount of only the transmitter is given by $A'1k=A1k/B1k$.

Therefore, calibration coefficient CT of the transmitter to be compensated is as in equations (26) to (28).

$$C_{T1}=1 \quad (26)$$

$$C_{T2} = \frac{1}{A'_{12}} e^{-j\theta'_{12}} \quad (27)$$

$$C_{T3} = \frac{1}{A'_{13}} e^{-j\theta'_{13}} \quad (28)$$

The weighting coefficient calculation circuit 165 calculates the weighting coefficients w'T1 to w'T3 including the calibration value of the transmitter by using the relative output signals of the calibration coefficients obtained by the calibration coefficient calculation circuit 164 and the relative output signals of the frequency converters 14a to 14c. When the transmission weight to form a desired antenna pattern is WT1 to WT3, by the equations (26) to (28), the transmission weighting coefficient including the calibration value weighted by the multipliers 43a to 43c, the weighting coefficient is obtained by equation (29).

$$wTk=w'Tk \cdot CTk \ (k=1,2,3) \quad (29)$$

By weighting as shown in the aforementioned equations (26) to (29), a desired transmitting beam pattern is obtained at an antenna end.

Similarly, calibration coefficient CRi of the receiver is represented by the following equations (30) to (32).

$$C_{R1} = \frac{1}{B_1} e^{-j\phi_1} \quad (30)$$

$$C_{R2} = \frac{1}{B_2} e^{-j\phi_2} \quad (31)$$

$$C_{R3} = \frac{1}{B_3} e^{-j\phi_3} \quad (32)$$

The calibration coefficient calculation circuit 164 of FIG. 34 calculates the transmitter calibration coefficient based on the aforementioned equations (26) to (29), and calculates the receiver calibration coefficient based on the aforementioned equations (30) to (32). Moreover, the weighting coefficient calculation circuit 165 calculates the weighting coefficient with respect to the transmitted signal based on the aforementioned equation (29), and similarly calculates the weighting coefficient with respect to the received signal.

Figure 39:
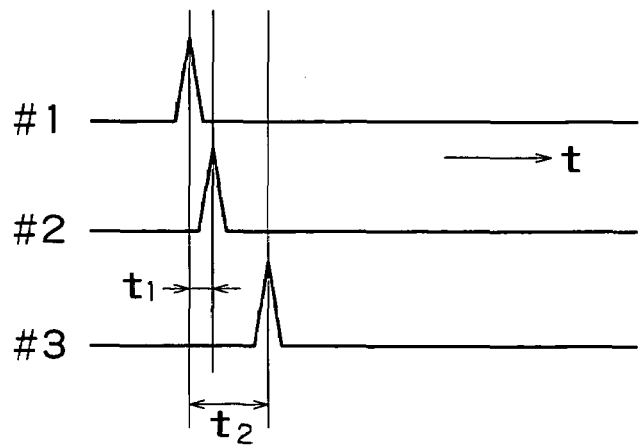
FIG. 39 is a diagram showing a signal intensity of a pilot signal.

The pilot signal inserted by the pilot signal inserter 160 will next be described. The pilot signal consists, for example, of PN (pseudo random noise) sequence, and its sequence pattern is known between the control station 2 and the base station 1. Moreover, the pilot signal can be inserted by time division multiplex, besides being inserted to the fedback transmitted signal by the frequency division multiplex. In this case, because the pilot signal and the feedback signal pass the receiver having the same frequency property, it is possible to more precisely detect distortion of the receiver. Even in either case, it is necessary to insert the pilot signal with equal amplitude simultaneously at each branch When the PN sequence is simultaneously inserted as the pilot signal, by performing a correlation processing of PN sequence length, a strongly impulsive correlation output which indicates delay timing and correlation strength is obtained from the pilot signal of each branch introduced by the feedback signal detector 163, as shown in FIG. 39. By the correlation output, reaching delay time differences t1, t2 among the branches in the receiver can be observed, and fluctuation phase difference $\phi k$ can be estimated. Moreover, by detecting peak values, relative amplitude ratio Bk among the branches of the receiver can be estimated.

In the aforementioned embodiment, the pilot signal of the PN sequence is used, but only a sinusoidal carrier wave may be fed back as the pilot signal. In this case, the feedback signal detector 163 of the control station 2 can estimate a relative phase fluctuation amount $\phi k$ and relative amplitude fluctuation amount Bk by the multiplier and low pass filter similarly as the aforementioned constitution of the phase difference detector.

In this manner, in the eighteenth embodiment, since the feedback signal of the transmitted signal, the received signal in the array antenna 4, and the pilot signal are multiplexed and transmitted to the control station 2 from the base station 1, the relative phase difference and relative amplitude fluctuation amount can be detected by using the pilot signal in the control station 2. Moreover, the use of the pilot signal can establish synchronization of the respective local oscillator outputs from the frequency synthesizers 16 and 13, and synchronization of the respective branch signals transmitted between the base station 1 and the control station 2.

Moreover, in the eighteenth embodiment, since the relative phase difference and relative amplitude fluctuation amount can be detected using the phase difference detector 166 and amplitude ratio detector 167 simply constituted as shown in FIGS. 38 and 39, the system constitution can be simplified, and it is possible to reduce cost. Moreover, transmission beam control can precisely be performed in the adaptive antenna, moving of a terminal station can be followed by a high gain and narrow beam, the coverage by one base station 1 can be enlarged, and the probability of loss by busy channel of hand-off destination base station 1 can be minimized.

Furthermore, since null control which is more sensitive angularly than main beam control can precisely be controlled, interference with the terminal station in communication with the adjacent base station 1 or another base station 1 can be suppressed, communication quality can be improved, and the entire system capacity can be enhanced.

Additionally, in the aforementioned eighteenth embodiment, as shown in FIG. 35, the method of subjecting the transmitted signal and pilot signal to frequency multiplexing has been described, but a method of multiplexing the transmitted signal and pilot signal in time division for feedback to the control station 2 may be employed.

By employing this method, the pass band width of the frequency converter can be narrowed, and estimation error by the slight influence of frequency properties of the respective components can be prevented from occurring.

Moreover, since it is easy to separate the multiplexed received signal, transmitted signal and pilot signal after reception, calibration can be performed even during communication, and no disadvantage of interruption of communication by calibration occurs.

Nineteenth Embodiment

In a nineteenth embodiment, the absolute phase fluctuation amount and the absolute amplitude fluctuation amount in the transmitted signal system is detected.

Figure 40:
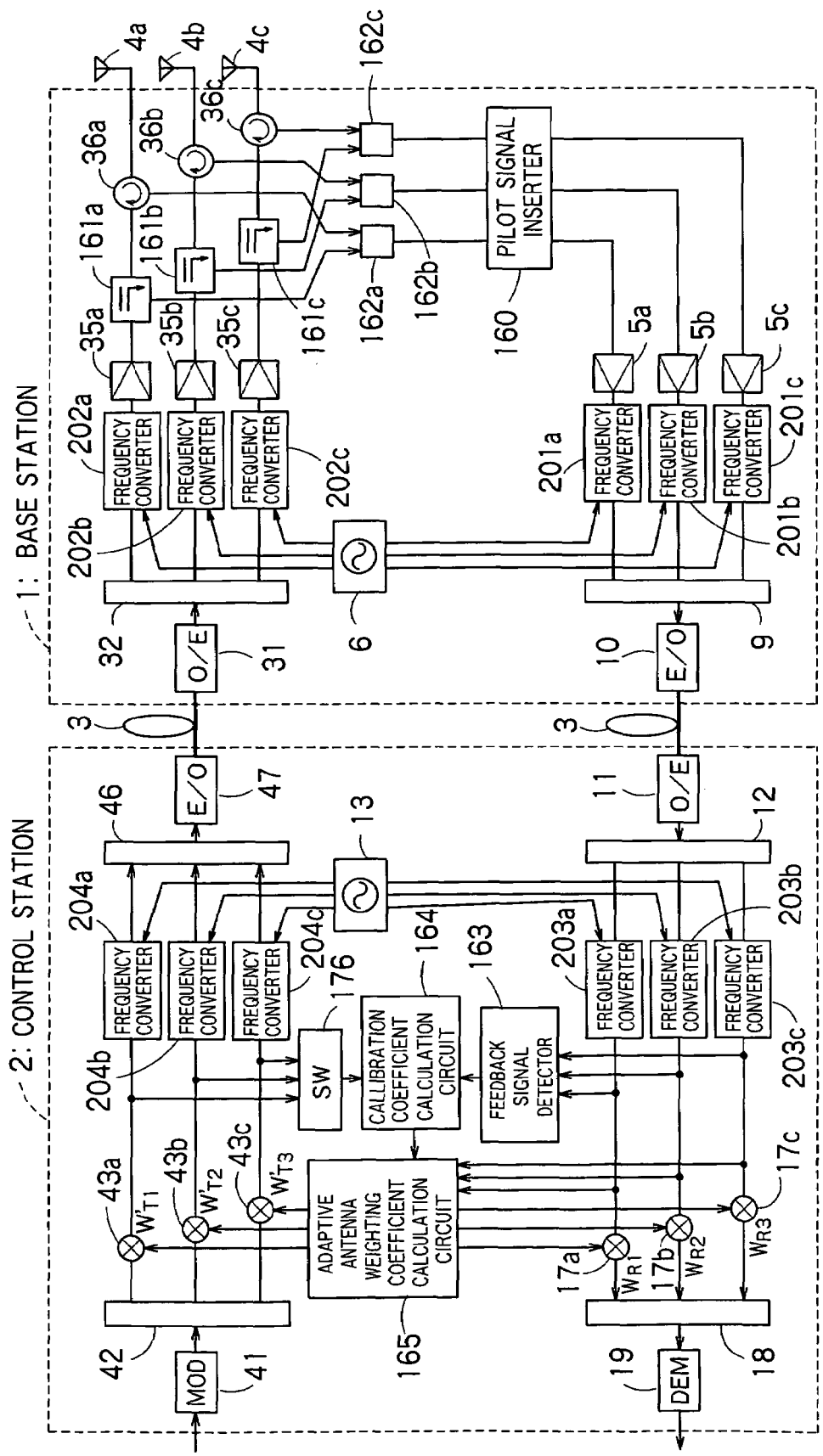
FIG. 40 is a block diagram of a nineteenth embodiment of the radio communication system according to the present invention.

FIG. 40 is a block diagram of the nineteenth embodiment of the radio communication system according to the present invention. In FIG. 40, the constituting parts common to FIG. 34 are denoted with the same reference numerals, and different respects will mainly be described hereinafter.

The base station 1 of FIG. 40 is constituted similarly as the base station 1 of FIG. 34. In addition to the constitution of FIG. 34, the control station 2 of FIG. 40 has a switch (control station switch means) 176 for selecting either one of weighted transmitted signals. The calibration coefficient calculation circuit 164 of FIG. 40 detects absolute values of the absolute phase/amplitude fluctuation amount of the transmitter included to the transmitted signal by using the transmitted signal selected by the switch 176 and the output of the feedback signal detector 163 corresponding to the same branch.

The output $C_{Tk}$ of the calibration coefficient calculation circuit 164 of FIG. 40 is obtained in equation (33).

$$C_{Tk} = \frac{B_k}{A_k} e^{-j(\theta_k - \phi_k)} (k = 1, 2, 3) \tag{33}$$

Here, θk and Ak represent the phase fluctuation amount and the amplitude fluctuation amount of the feedback transmitted signal (the signal is subjected to distortion of the transmitter/receivers) of k number branch, respectively. φk and Bk represent phase fluctuation amount and amplitude fluctuation amount of the receiver of k number branch obtained by the pilot signal.

The weighting coefficient calculation circuit 165 of FIG. 40 calculates weighting coefficient wTk of the transmitted signal based on the following equation (34).

$$wTk = w'Tk \cdot CTk \ (k=1,2,3) \tag{34}$$

In the radio communication system provided with the adaptive antenna, when the relative phase and relative amplitude fluctuation amount of the transmitted signal are known, a transmitted beam pattern can be correctively formed. However, when it is necessary to know the absolute phase fluctuation amount and absolute amplitude fluctuation amount of each transmission branch for other purposes, the aforementioned nineteenth embodiment is effective.

Moreover, the nineteenth embodiment is effective when a delay time until returning of the transmitted signal via the feedback transmission path, that is, phase rotation is sufficiently short as compared with one symbol length of the signal.

Twentieth Embodiment

In a twentieth embodiment, the absolute phase fluctuation amount and absolute amplitude fluctuation amount can be detected without any pilot signal.

Figure 41:
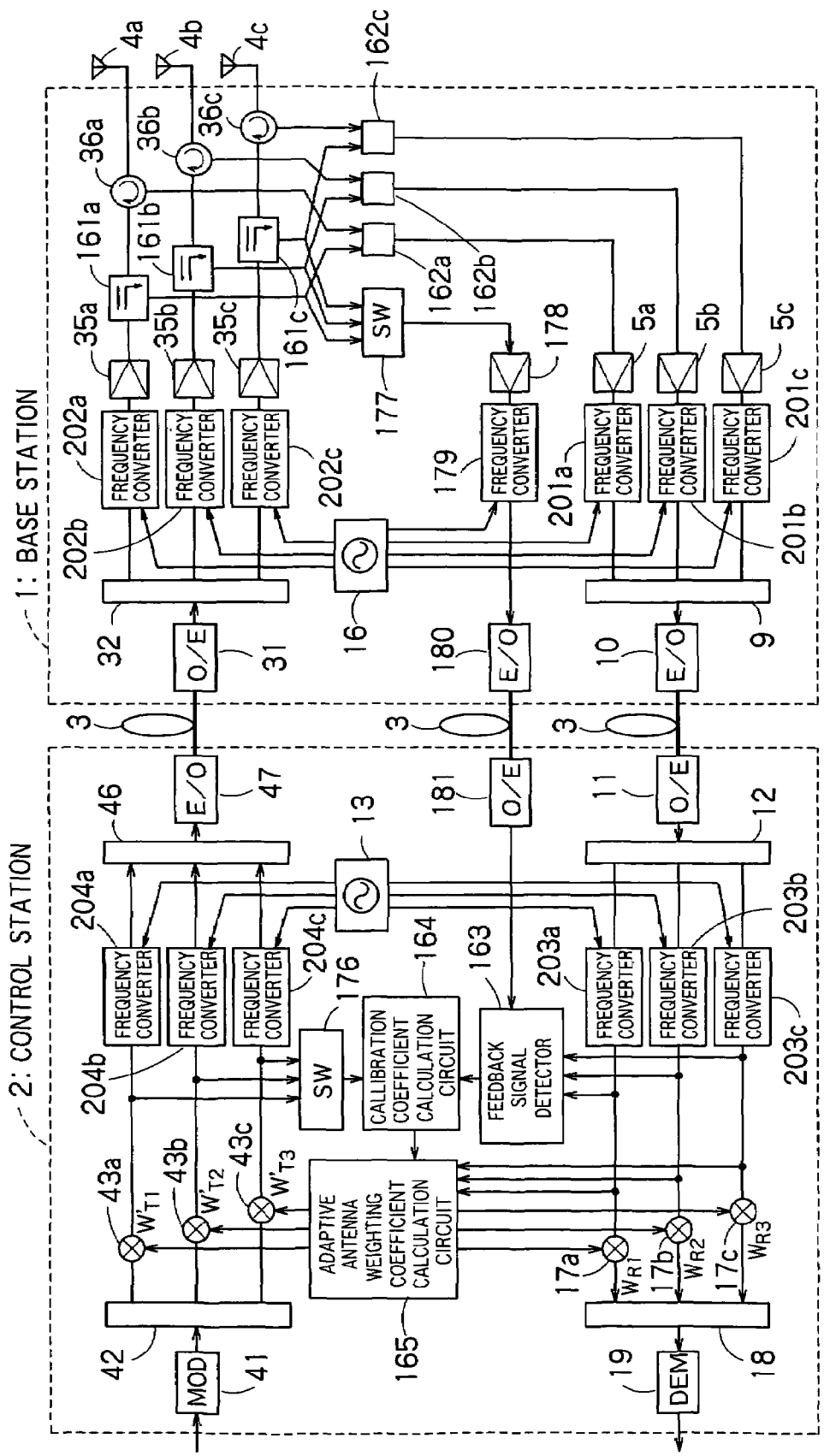
FIG. 41 is a block diagram of a twentieth embodiment of the radio communication system according to the present invention.

FIG. 41 is a block diagram of the twentieth embodiment of the radio communication system according to the present invention. In FIG. 41, the constituting parts common to FIG. 40 are denoted with the same reference numerals, and different respects will mainly be described hereinafter.

The radio communication system of FIG. 41 is characterized in that no pilot signal is inserted, and instead there is provided an exclusive feedback path for calibration to send the transmitted signal from the control station 2 to the base station 1 back to the control station 2.

The base station 1 of FIG. 41 has a switch (base station switch means) 177 for selecting either one of the transmitted signals from the control station 2, amplifier 178 for amplifying the signal selected by the switch 177, frequency converter (second frequency conversion means) 179 for converting the frequency of the signal amplified by the amplifier 178, and electric/optical converter (second electric/optical conversion means) 180 for converting the output signal of the frequency converter 179 to the optical signal.

Moreover, the control station 2 of FIG. 41 has an optical/electric converter (second optical/electric conversion means) 181 for converting the feedback signal of the transmitted signal transmitted from the base station 1 to the electric signal. The output signal of the optical/electric converter 181 is inputted to the feedback signal detector 163.

In the radio communication system of FIG. 41, by successively switching the switch 177 in the base station 1 and the switch 176 in the control station 2, the transmitter is calibrated by each branch. Additionally, both the control station 2 and the base station 1 identify the branch corresponding to the antenna element being calibrated.

Moreover, in the radio communication system of FIG. 41, the phase/amplitude fluctuation amount of each transmission branch are different from one another, but the phase/amplitude fluctuation amount of the exclusive feedback path are constantly common, and the calibration coefficient of each branch obtained by the calibration coefficient calculation circuit 164 is therefore obtained as the relative value among the branches. Generally, in the system provided with the adaptive antenna, when the relative phase and amplitude are constant, the antenna pattern is univocally determined, so that calibration can correctly be performed even when neither absolute phase nor amplitude fluctuation amount is known.

Moreover, for the calibration of the receiver in the radio communication system of FIG. 41, by establishing the transmitter calibration, subsequently feeding the transmitted signal back to the control station 2 via the receiver in the base station 1, and comparing the transmitted signal with the weighted signal with the weighting coefficients including the transmitter calibration value in the control station 2, the calibration coefficients of the receiver can be obtained.

As described above, in the twentieth embodiment, since the relative phase difference and relative amplitude fluctuation amount can be detected without using the pilot signal, the processing of inserting the pilot signal and performing multiplexing in the base station 1 is unnecessary, and the processing of separating and extracting the pilot signal in the control station 2 is also unnecessary. Therefore, the system constitution can be simplified.

Twenty First Embodiment

In the aforementioned eighteenth to twentieth embodiments, an example has been described in which the weighting coefficient calculation circuit 165 generates the weighting coefficient including the calibration coefficient with respect to the transmitted signal and performs the weighting of the transmitted signal, but separately from the weighting of the transmitted signal by the transmission weight, the weighting for compensating the transmitter distortion by the calibration coefficients may be performed.

Figure 42:
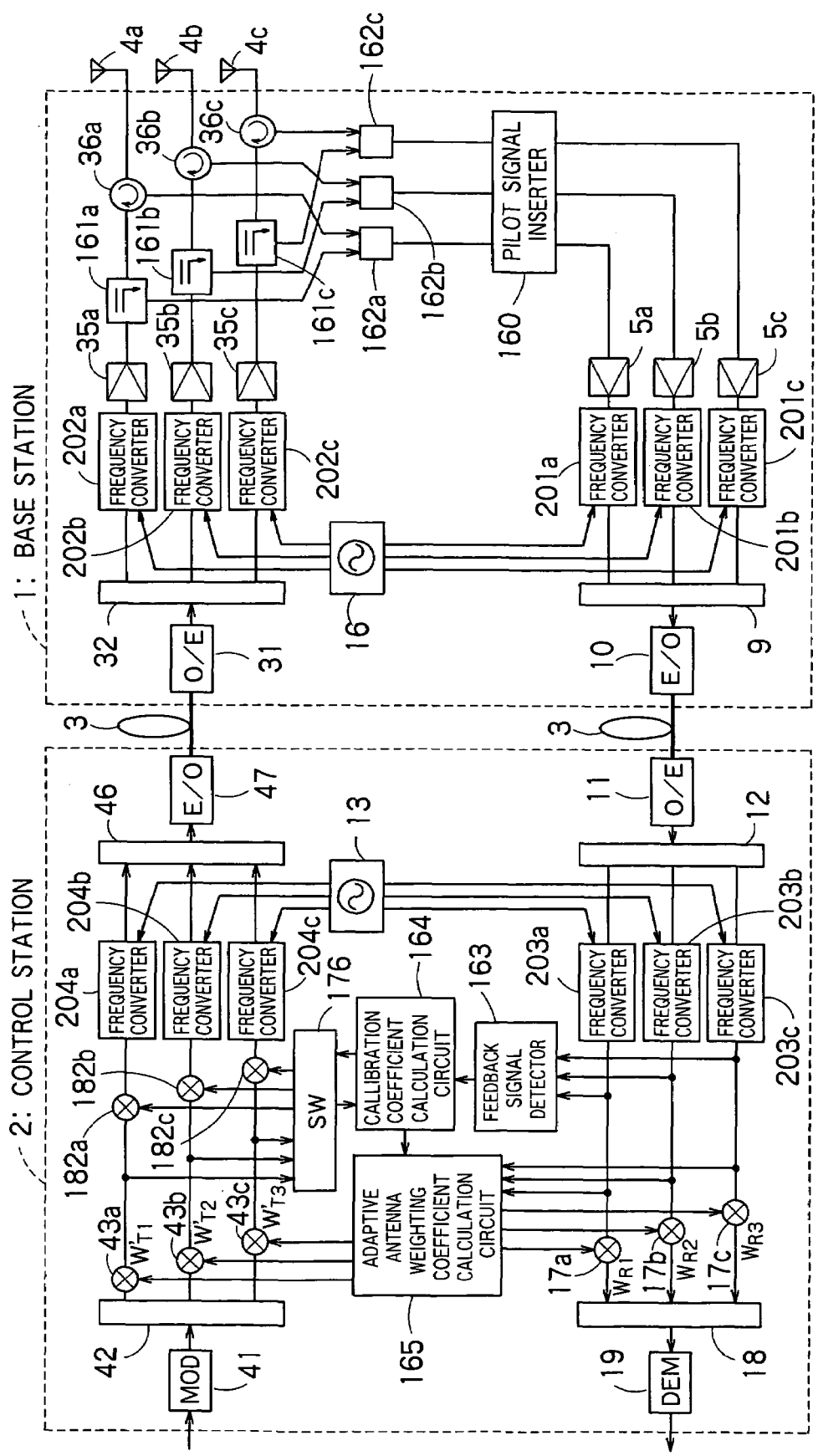
FIG. 42 is a block diagram of a twenty first embodiment of the radio communication system according to the present invention.

FIG. 42 is a block diagram of a twenty first embodiment of the radio communication system according to the present invention. In FIG. 42, the constituting parts common to FIG. 40 are denoted with the same reference numerals, and different respects will mainly be described hereinafter.

The base station 1 of FIG. 42 is constituted similarly as FIG. 40. Moreover, the calibration coefficient calculation circuit 164 in the control station 2 of FIG. 42 performs the processing similar to that of FIG. 40, but the processing result is supplied not to the weighting coefficient calculation circuit 165 but to multipliers (third weighting means) 182a to 182c newly disposed on the transmitter.

Moreover, the weighting coefficient calculation circuit 165 calculates transmission and reception weights without considering the calibration coefficient calculated by the calibration coefficient calculation circuit 164. The multipliers 43a to 43c perform the weighting of the transmitted signal based on the transmission weights. Moreover, the newly added multipliers 182a to 182c further perform the weighting by the calibration coefficients.

Additionally, also with respect to the aforementioned radio communication system of FIG. 41, similarly as FIG. 42, the weighting by the transmission weights may be performed separately from the weighting by the calibration coefficients.

Figure 43:
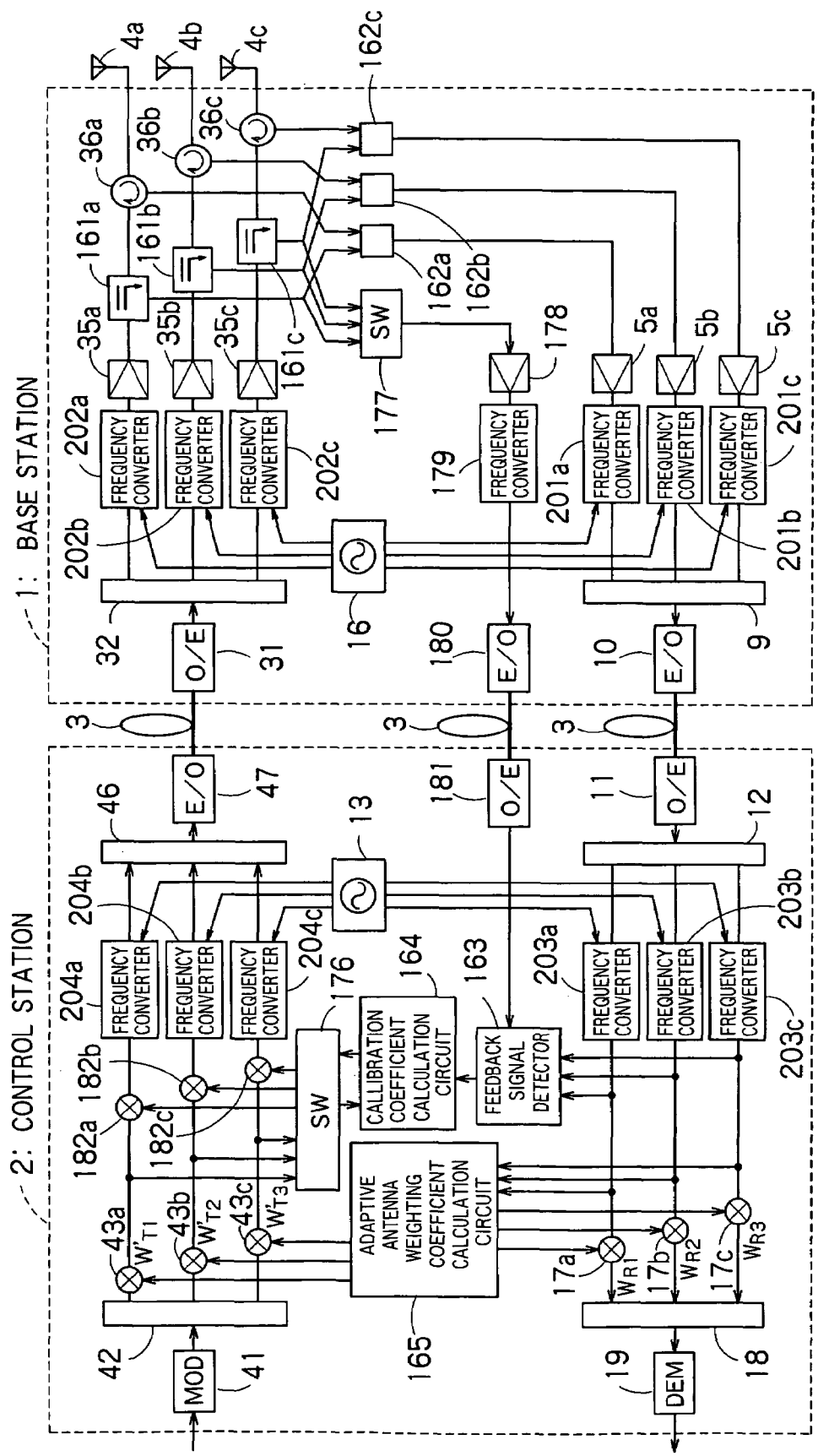

FIG. 43 is a block diagram of the radio communication system obtained by modifying FIG. 41. The base station 1 of FIG. 43 is constituted similarly as FIG. 41. Moreover, the weighting coefficient calculation circuit 165 in the control station 2 of FIG. 43 calculates the transmission and reception weights without considering the calibration coefficients calculated by the calibration coefficient calculation circuit 164. The multipliers 43a to 43c perform the weighting of the transmitted signal based on the transmission weights. Moreover, the newly added multipliers 182a to 182c further perform the weighting of the weighted transmitted signal based on the calibration coefficients.

As described above, in the twenty first embodiment, since the weighting by the transmission weight is performed separately from the calibration by the calibration coefficients, it is also possible to perform only either one.

In the aforementioned eighteenth to twenty first embodiments, an example has been described in which the sub-carrier multiplexing (SCM) method is used as the transmission method in ROF, but even with the transmission methods other than the SCM, such as a waveform division multiplexing transmission method, a method of allotting plural optical fibers to separate branches, a time division multiplexing transmission method, and a code division multiplexing method, the similar system can be constructed. That is, the present calibration method does not depend on transmission method when transmitting the optical fiber.

In the above-mentioned the eighteenth to twenty first embodiments, although examples of transferring the transmitted/received signal by FDD has been described, the same effect is obtained by the same constitution even in case of performing a time division duplex (TDD).

Moreover, in the aforementioned eighteenth to twenty first embodiments, the transmission optical fiber cable may be disposed separately from the reception optical fiber cable, but time division duplex (TDD) or frequency division duplex (FDD) of the transmitted/received signal is performed, so that the transmission/reception may be performed with one optical fiber.

Furthermore, in the aforementioned eighteenth to twenty first embodiments, an example in which the optical fiber is used as a wire communication medium for connecting the base station 1 to the control station 2 has been described, but even with a system in which a coaxial cable, Ethernet cable, or the like is used, the similar calibration processing can be obtained, and the similar effect is obtained.

What is claimed is:

1. A radio communication system comprising a base station for performing radio communication with a radio communication terminal; and a control station connected to the base station via an optical transmission line, said base station comprising:
a variable direction array antenna which comprises a plurality of antenna elements and which can change directivity in accordance with a position of said radio communication terminal;
a base station side frequency conversion unit configured to subject received signals received from said radio communication terminal via said plurality of antenna elements to frequency conversion to different bands;
a sub-carrier multiplexing signal generation unit configured to combine a plurality of signals subjected to the frequency conversion by said base station side frequency conversion unit to generate a sub-carrier multiplexing signal; and
a base station side transmission means configured to transmit optical signals generated by conducting optical modulation with respect to said sub-carrier multiplexing signal to said control station via said optical transmission line, said control station comprising:
a first optical/electric conversion unit configured to convert the optical signal transmitted from said base station into an electric signal;
a first branching unit configured to branch the electric signal to the signals received by the plurality of antennas;
control station side frequency conversion unit configured to perform the frequency conversion to obtain the signals of the same frequency band for each of the branched signals;
a beam calculation unit configured to obtain a weighting coefficient to control directivity of said plurality of antenna elements;
a weighting unit configured to perform weighting with respect to the branched signals of which frequencies have been converted by said control station side frequency conversion unit based on said weighting coefficient;
a combiner unit configured to combine the weighted signals; and
a received signal generation unit configured to demodulate the combined signals to generate a received signal.

2. The radio communication system according to claim 1 wherein said base station further comprises:
a first local oscillator for supplying a first reference signal as a frequency conversion reference to said base station side frequency conversion unit,
said control station further comprises:
a second local oscillator for supplying a second reference signal as the frequency conversion reference to said control station side frequency conversion unit, and
said second local oscillator outputs said second reference signal which has a predetermined phase relation with said first reference signal so that said control station side frequency conversion unit output the signal maintaining a relative phase difference among the respective received signals of said plurality of antenna elements.

3. The radio communication system according to claim 1 wherein said base station comprises:
   a reference signal generation unit configured to generate a reference signal; and
   a reference signal transmission unit configured to directly transmit the generated reference signal for superposing the reference signal to said sub-carrier multiplexing signal and transmitting the signal to said control station, and
   said base station side frequency conversion unit and said control station side frequency conversion unit perform the frequency conversion based on the same reference signal generated by said reference signal generation unit.

4. The radio communication system according to claim 1 wherein said control station comprises:
   an addition unit configured to superpose a signal correlated with the transmitted signal transmitted to said radio communication terminal from said variable direction antenna and a signal correlated with said weighting coefficient; and
   control station side transmission means configured to transmit the signal superposed by said addition means to said base station,
   said base station comprises:
   a second branching unit configured to branch the signal converted with the transmitted signal included in the signal transmitted from the control station to a number equal to a number of said antenna elements, and detect a weighting control signal correlated with the weighting coefficient; and
   a base station side weighting unit configured to weight the signals correlated with said transmitted signal branched by said second branching unit based on the weighting control signal;
   wherein said antenna elements transmit the respective signals subjected to the base station side weighting unit to said radio communication terminals.

5. The radio communication system according to claim 1 wherein
   said base station comprises:
   a second optical/electric conversion unit configured to convert an optical signal transmitted from said control station via said transmission line to an electric signal;
   a separation unit configured to separate the electric signal converted by the second optical/electric conversion means to the transmitted signal for said radio communication terminal and a beam control signal for controlling the radiation beam-pattern of said variable direction antenna;
   an antenna control unit configured to control the radiation beam-pattern of a transmission/reception beam of said variable direction antenna based on said beam control signal;
   a base station side transmission frequency conversion unit configured to convert the transmitted signals for said radio communication terminal separated by said separation unit to a radio frequency signal and supply the radio frequency signal to said base station side transmission unit, and
   a radio transmission control unit which transmits transmission signals for said radio communication terminal via the variable direction antenna to said radio communication terminal
   said control station comprises:
   a level detection unit configured to detect a maximum intensity and/or an intensity distribution of the signals subjected to the frequency conversion by said control station side frequency conversion unit, and generating said beam control signal based on the detection result;
   a control station side frequency multiplexing unit configured to multiplex the transmitted signal for said radio communication terminal and said beam control signal; and
   an second electric/optical conversion unit configured to optically modulate the signal multiplexed by said control station side frequency multiplexing unit to generate said optical signal, and the first optical signal to said base station via said optical transmission line.

6. The radio communication system according to claim 1 wherein
   said base station comprises:
   a second optical/electric conversion unit configured to convert an optical signal transmitted from said control station via said transmission line to an electric signal;
   a separation unit configured to separate the electric signal converted by the second optical/electric conversion unit to the transmitted signal for said radio communication terminal and a beam control signal for controlling the radiation beam pattern of said variable direction antenna; and
   received signal selection unit configured to select some signals from signals correlated with the respective received signals received from said radio communication terminal via said plurality of antenna elements based on said beam control signal, and
   said sub-carrier multiplexing signal generation unit multiplexes only the signals selected by said received signal selection means.

7. The radio communication system according to claim 1 wherein
   said base station comprises the variable direction antenna constituted of first to n-th antenna elements (n is a positive integer),
   at least one of said base station and said control station comprises a phase compensation unit configured to compensate a phase fluctuation amount generated by a signal propagation path between said base station and said control station, and a signal processing on the side of said base station and said control station, and
   said phase compensation unit establishes a relation $\phi_1 + 2m_1\pi = \phi_2 + 2m_2\pi = \phi_3 + 2m_3\pi = \ldots = \phi_n + 2m_n\pi$ ($m_1, \ldots, m_n$ are integers)

in respective phase change amounts $\phi_1$ to $\phi_n$ in blocks of said antenna elements disposed on said base station and said weighting unit disposed on said control station with respect to the received signal of said variable direction antenna.

8. The radio communication system according to claim 1, wherein said base station side frequency conversion unit generates a frequency-converted signal obtained by converting the signals weighed by said weighting unit to frequencies different from each other based on a plurality of local oscillation signals with frequencies different from each other, and
   said sub-carrier multiplexing signal generation unit generates the sub-carrier multiplexing signal obtained by multiplexing the frequency-convened signal and the plurality of local oscillation signals.

9. A radio communication system comprising a base station including a variable direction array antenna which has a plurality of antenna elements and which can change directivity in accordance with a position of a radio communication terminal; and a control station connected to the base station via an optical transmission line, said control station comprising:
a control station side branching unit configured to branch a signal correlated with a transmitted signal transmitted to said radio communication terminal from said variable direction antenna for said plurality of antenna elements;
a weighting unit configured to weight based on a weight control signal with respect to the signals of the respective antenna elements relating to the transmitted signal transmitted from said variable direction antenna to said radio communication terminal;
a control station side frequency conversion unit configured to convert frequencies of the signals weighted by said weighting unit to respective different bands;
a sub-carrier multiplexing signal generation unit configured to combine the respective signals converted to the different bands subjected to the frequency conversion by said control station side frequency conversion unit to generate a sub-carrier multiplexing signal; and
a transmission unit configured to transmit optical signals generated by conducting optical modulation with respect to said sub-carrier multiplexing signal to said base station via said optical transmission line, said base station comprising:
a base station side branching unit configured to convert the optical signals transmitted from said base station via said optical transmission line to electric signals, and branch the electric signals for said plurality of antenna elements; and
a base station side frequency conversion unit configured to subject the respective signals branched by said base station side branching unit to the signals of the same frequency band,
wherein said plurality of antenna elements transmit the respective signals subjected to the frequency conversion by said base station side frequency conversion unit to said radio communication terminal.

10. The radio communication system according to claim 9 wherein said base station further comprises:
a first local oscillator for supplying a first reference signal as a frequency conversion reference to said base station side frequency conversion unit,
said control station further comprises:
a second local oscillator for supplying a second reference signal as the frequency conversion reference to said control station side frequency conversion unit, and said second local oscillator outputs said second reference signal which has a predetermined phase relation with said first reference signal so that said control station side frequency conversion unit output the signal maintaining a relative phase difference among the respective received signals of said plurality of antenna elements.

11. The radio communication system according to claim 9 wherein said control station comprises:
a reference signal generation unit configured to generate a reference signal; and
a reference signal transmission unit configured to directly transmit the generated reference signal for superposing the reference signal to said sub-carrier multiplexing signal and transmitting the signal to said base station, and
said base station side frequency conversion unit and said control station side frequency conversion unit perform the frequency conversion based on the same reference signal generated by said reference signal generation unit.

12. The radio communication system according to claim 9 wherein
said base station comprises the variable direction antenna constituted of first to n-th antenna elements (n is a positive integer),
at least one of said base station and said control station comprises phase compensation unit configured to compensate a phase fluctuation amount generated by a signal propagation path between said base station and said control station, and a signal processing on the side of said base station and said control station, and
said phase compensation unit establishes a relation $$\phi_1+2m_1\pi=\phi_2+2m_2\pi=\phi_3+2m_3\pi=\ldots=\phi_n+2m_n\pi \text{ (m}_1,\ldots,\text{m}_n \text{ are integers)}$$

in respective phase change amounts $\phi_1$ to $\phi_n$ in blocks of said antenna elements disposed on said base station and said weighting unit disposed on said control station with respect to the transmitted signal to said variable direction antenna.

13. The radio communication system according to claim 9,
wherein said control station side frequency conversion unit generates a frequency-converted signal obtained by converting the signals weighed by said weighting unit to frequencies different from each other based on a plurality of local oscillation signals with frequencies different from each other, and
said sub-carrier multiplexing signal generation unit generates the sub-carrier multiplexing signal obtained by multiplexing the frequency-converted signal and the plurality of local oscillation signals.

* * * * *